US009652924B2

(12) United States Patent
Yasaka et al.

(10) Patent No.: US 9,652,924 B2
(45) Date of Patent: May 16, 2017

(54) PRODUCT DISCHARGING DEVICE

(71) Applicant: FUJI ELECTRIC CO., LTD., Kawasaki-shi, Kanagawa (JP)

(72) Inventors: Yoshio Yasaka, Yokkaichi (JP); Michihiko Makino, Yokkaichi (JP); Norio Nakajima, Yokkaichi (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/016,972

(22) Filed: Feb. 5, 2016

(65) Prior Publication Data

US 2016/0155286 A1 Jun. 2, 2016

Related U.S. Application Data

(63) Continuation of application No. PCT/JP2015/050382, filed on Jan. 8, 2015.

(30) Foreign Application Priority Data

Jan. 10, 2014 (JP) ................................ 2014-003754
Jan. 10, 2014 (JP) ................................ 2014-003766
(Continued)

(51) Int. Cl.
*G07F 11/00* (2006.01)
*B65H 1/00* (2006.01)
(Continued)

(52) U.S. Cl.
CPC ................ *G07F 11/24* (2013.01); *G07F 9/02* (2013.01); *G07F 11/34* (2013.01)

(58) Field of Classification Search
CPC .......... G07F 11/06; G07F 11/50; G07F 11/48; G07F 11/24
(Continued)

(56) References Cited

U.S. PATENT DOCUMENTS 4,542,834 A * 9/1985 Kurosawa ............... G07F 11/16 221/116
4,565,300 A * 1/1986 Kokubun ................ G07F 11/10 221/116
(Continued)

FOREIGN PATENT DOCUMENTS

JP 2749917 B2 5/1998
JP 11283096 A * 10/1999
(Continued)

OTHER PUBLICATIONS

PCT, "International Search Report for International Application No. PCT/JP2015/050382".
(Continued)

*Primary Examiner* — Rakesh Kumar
(74) *Attorney, Agent, or Firm* — Manabu Kanesaka

(57) ABSTRACT

A product discharging device includes: a lower pedal swingably arranged with a base in such a manner that a distal end thereof advances into and retreats from a product storage passage storing therein, along an up-and-down direction, products that are input thereto; an upper pedal swingably arranged with the base in a region above the lower pedal, in such a manner that a distal end thereof advances into and retreats from the product storage passage; and a sold-out detection switch configured to detect whether there is any product in the product storage passage by going into an ON state or an OFF state when the lower pedal is in a first standby posture and going into the OFF state or the ON state when the lower pedal is in a second standby posture.

4 Claims, 35 Drawing Sheets

(30) Foreign Application Priority Data

Jul. 18, 2014 (JP) ................................. 2014-148213
Jul. 18, 2014 (JP) ................................. 2014-148214

(51) Int. Cl.

| | |
|---|---|
| ***B65G 59/00*** | (2006.01) |
| ***B65H 3/00*** | (2006.01) |
| ***G07F 11/24*** | (2006.01) |
| ***G07F 11/34*** | (2006.01) |
| ***G07F 9/02*** | (2006.01) |

(58) Field of Classification Search
USPC .... 221/288, 277, 1, 116, 115, 298, 281, 301
See application file for complete search history.

(56) References Cited

U.S. PATENT DOCUMENTS 4,574,980 A * 3/1986 Kurosawa ............... G07F 11/24 221/116
4,673,105 A * 6/1987 Kurosawa ............... G07F 11/16 221/281
4,776,487 A * 10/1988 Kurosawa ............... G07F 11/24 221/116
4,854,477 A * 8/1989 Kurosawa ............... G07F 11/24 221/1
5,791,516 A * 8/1998 Wittern, Jr. ............. G07F 11/42 221/114
5,799,824 A * 9/1998 Gasiel ..................... G07F 11/16 221/112
6,467,648 B1 * 10/2002 Nishiyama .............. G07F 11/06 221/289
6,902,084 B2 * 6/2005 Bauman .................... A47F 1/10 221/115
7,431,176 B2 * 10/2008 Bauman .................... A47F 1/10 221/115
7,882,980 B1 * 2/2011 Horn ....................... G07F 11/14 221/2
2014/0175116 A1 * 6/2014 Chen ....................... G07F 11/48 221/277

FOREIGN PATENT DOCUMENTS

JP H11-283096 A 10/1999
JP 2001-155235 A 6/2001
JP 2001-188953 A 7/2001
JP 2002-251656 A 9/2002
JP 2002-288732 A 10/2002

OTHER PUBLICATIONS

Japan Patent Office, “Office Action for Japanese Patent Application No. 2015-556833,” Nov. 1, 2016.

* cited by examiner

PRODUCT DISCHARGING DEVICE

CROSS-REFERENCE TO RELATED APPLICATION(S)

This application is a continuation of PCT international application Ser. No. PCT/JP2015/050382 filed on Jan. 8, 2015 which designates the United States, incorporated herein by reference, and which claims the benefit of priority from Japanese Patent Application No. 2014-003754 filed on Jan. 10, 2014, Japanese Patent Application No. 2014-003766 filed on Jan. 10, 2014, Japanese Patent Application No. 2014-148213 filed on Jul. 18, 2014, and Japanese Patent Application No. 2014-148214 filed on Jul. 18, 2014, incorporated herein by reference.

BACKGROUND

1. Technical Field

The disclosure is related to a product discharging device and, more specifically, to a product discharging device that is, for example, applied to a vending machine selling products such as canned beverages, plastic-bottled-beverages, and the like and is configured to deliver the products stored in a product storage passage, as necessary.

2. Related Art

Conventionally, in a vending machine selling products such as canned beverages, plastic-bottled-beverages, and the like, for example, a product storage chamber on the inside of a main body cabinet serving as the main body of the vending machine is provided with a product storage rack. The product storage rack includes a product storage passage extending in the up-and-down direction and a product discharging device provided in a lower part of the product storage passage.

The product discharging device is configured so as to include a lower pedal and an upper pedal. The lower pedal and the upper pedal are linked, via links, to an Alternating Current (AC) solenoid, which is an actuator. When the AC solenoid has an electric current flowing therethrough (hereinafter, "current flowing state"), the lower pedal and the upper pedal each advance into and retreat from the product storage passage, as necessary.

In the product discharging device configured in this manner, in a standby state, the upper pedal is in the state of having retreated from the product storage passage, whereas the lower pedal is in the state of having advanced into the product storage passage. Accordingly, the lower pedal abuts against the product in the lowest position stored in the product storage passage, so that the downward moves of the products stored in the product storage passage are regulated.

Further, when a product discharge instruction is issued, in the product discharging device positioned in the lower part of the product storage passage storing the corresponding product, the upper pedal advances into the product storage passage via the link and abuts against the product in the second lowest position, because the AC solenoid goes into the current-flowing state. Accordingly, the downward moves of the product in the second lowest position and the products stored above the product are regulated. Further, because the AC solenoid goes into the current-flowing state, the lower pedal retreats from the product storage passage, and when the product in the lowest position alone is discharged downward and passes by the lower pedal, the lower pedal advances into the product storage passage due to an urging force of a spring. After that, when the current-flowing state of the AC solenoid is cancelled so that no electric current flows in the AC solenoid, the standby state described above is resumed where the lower pedal has advanced into the product storage passage, while the retreating move thereof is regulated, whereas the upper pedal is in the state of having retreated from the product storage passage.

Further, in addition to the pedals, the product discharging device includes a sold-out detection lever and a sold-out detection switch. The sold-out detection lever is swingably provided in a region above the upper pedal, so as to advance into and retreat from the product storage passage. The sold-out detection lever is urged by an urging means so as to advance into the product storage passage. When there is at least one product in the product storage passage, the sold-out detection lever retreats from the product storage passage due to the product, against the urging force of the urging means.

The sold-out detection switch is linked to the sold-out detection lever. When the sold-out detection lever has retreated from the product storage passage, the sold-out detection switch is in an OFF state. On the contrary, when the sold-out detection lever has advanced into the product storage passage, the sold-out detection switch is in an ON state. While in the ON state, the sold-out detection switch outputs a sold-out signal indicating that the products in the corresponding product storage passage have been sold out (see, for example, Japanese Laid-open Patent Publication No. 2001-188953).

SUMMARY

In some embodiments, a product discharging device includes: a lower pedal swingably arranged with a base in such a manner that a distal end thereof advances into and retreats from a product storage passage storing therein, along an up-and-down direction, products that are input thereto; and an upper pedal swingably arranged with the base in a region above the lower pedal, in such a manner that a distal end thereof advances into and retreats from the product storage passage. while in a standby state, by causing the upper pedal to retreat from the product storage passage and causing the lower pedal to advance into the product storage passage, a product in a lowest position is placed on a top face of the lower pedal, so that the lower pedal goes into a first standby posture and restrains the product from moving downward, whereas, while in a driven state, by causing the upper pedal to advance into the product storage passage so as to abut against a product in a second lowest position and causing the lower pedal to retreat from the product storage passage, the product in the lowest position is discharged downward. When no product is placed on the top face of the lower pedal in the standby state, the lower pedal goes into a second standby posture in which the distal end thereof is positioned higher than in the first standby posture. The product discharging device includes a sold-out detection switch configured to detect whether there is any product in the product storage passage by going into an ON state or an OFF state when the lower pedal is in the first standby posture and going into the OFF state or the ON state when the lower pedal is in the second standby posture.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of a product discharging device of the present invention will be explained in detail, with reference to the accompanying drawings.

Figure 1:
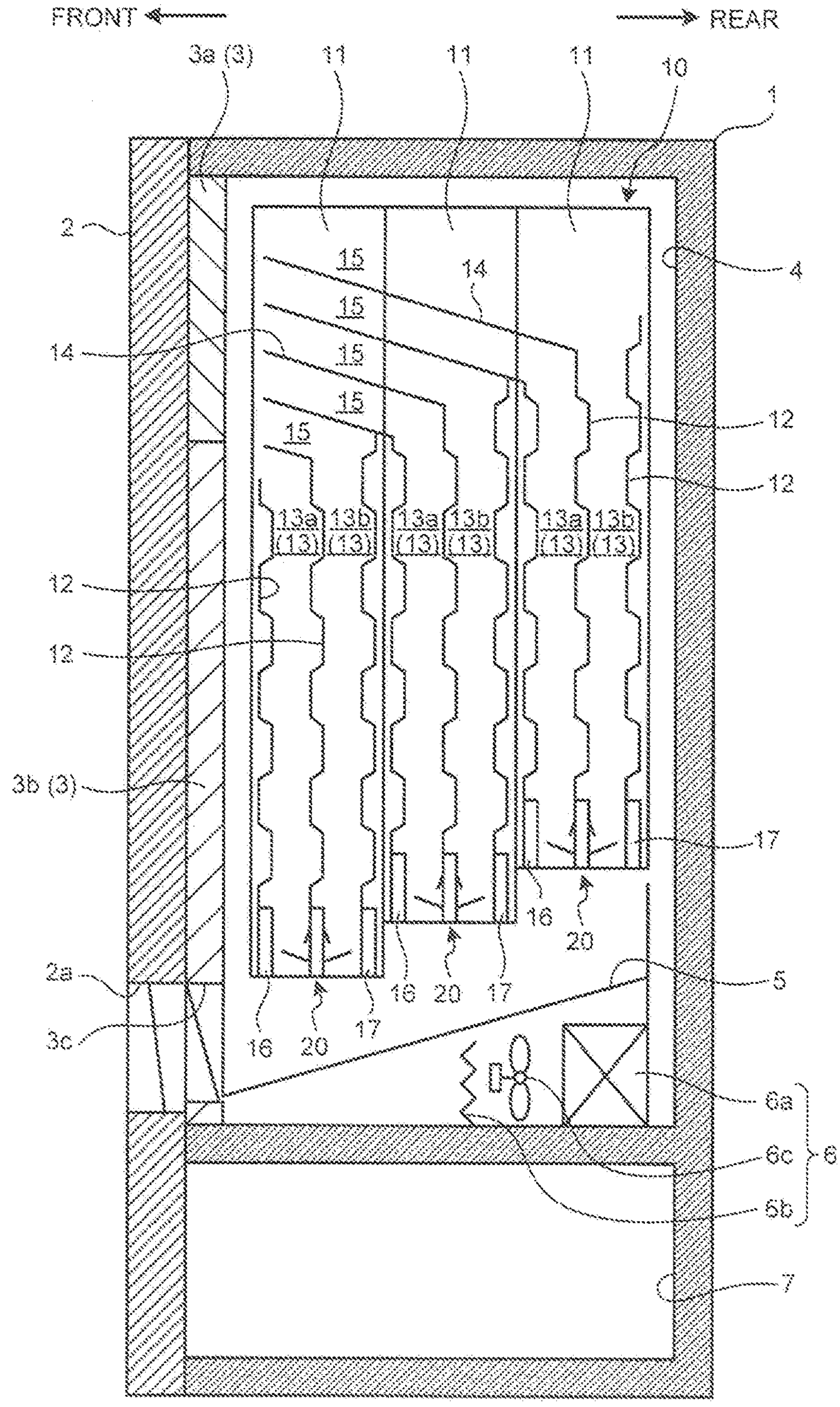
FIG. 1 is a cross-sectional side view from the right side illustrating an internal structure of a vending machine to which a product discharging device according to an embodiment of the present invention is applied.

FIG. 1 is a cross-sectional side view from the right side illustrating an internal structure of a vending machine to which a product discharging device according to an embodiment of the present invention is applied. The vending machine in the present example is configured to sell products in a cooled or heated state and includes a main body cabinet 1, an external door 2, and an internal door 3.

The main body cabinet 1 is structured by combining a plurality of steel plates as appropriate in the shape of a rectangular parallelepiped having an open front face. The main body cabinet 1 has, on the inside thereof, a product storage chamber 4 having a thermally-insulated structure. The external door 2 is configured to cover the front-face opening of the main body cabinet 1 and is provided in a lateral edge part of the main body cabinet 1 so as to be able to open and close. On the front face of the external door 2, elements that are required by the sales of the products such as the following are provided: a display window, product selection buttons, a banknote insertion opening, a coin input slot, a return lever, an integrated display device, a coin return outlet, and a product access outlet 2*a*. The internal door 3 is a thermally-insulating door that is for covering the front-face opening of the product storage chamber 4 and is divided in two sections in upper and lower positions. In positions on the inside of the external door 2, an upper thermally-insulating door 3*a* is provided in a lateral edge part of the external door 2 so as to be able to open and close, whereas a lower thermally-insulating door 3*b* is provided in a lateral edge part of the main body cabinet 1 so as to be able to open and close. In a lower part of the lower thermally-insulating door 3*b* of the internal door 3, a product discharge outlet 3*c* used for delivering the products to the outside of the product storage chamber 4 is provided.

Further, the vending machine is provided with a product chute 5 positioned inside the product storage chamber 4. A temperature adjusting unit 6 is provided in a region (which hereinafter may be referred to as "heat exchange region") positioned below the product chute 5, whereas product storage racks 10 is provided in a region (which hereinafter may be referred to as "product storage region") positioned above the product chute 5.

The product chute 5 is a plate-like member used for guiding a product discharged from any of the product storage racks 10 to the product discharge outlet 3*c* of the internal door 3. The product chute 5 is provided so as to be gradually sloped downward toward the front. Although not illustrated, the product chute 5 has formed therein a large number of ventilation holes (not illustrated) that allow communication between the heat exchange region and the product storage region.

The temperature adjusting unit 6 is provided for maintaining the internal ambient of the product storage chamber 4 at a desired temperature level and is configured so as to include an evaporator 6*a*, an electric heater 6*b*, and an air blowing fan 6*c* for a refrigeration cycle. In the temperature adjusting unit 6, when the air blowing fan 6*c* is driven while the refrigeration cycle is being operated, for example, because the air cooled by the evaporator 6*a* is sent upward through the ventilation holes formed in the product chute 5, it is possible to maintain the product storage region in a low-temperature state. In contrast, when the air blowing fan 6*c* is driven while an electric current is flowing through the electric heater 6*b*, because the air heated by the electric heater 6*b* is sent upward through the ventilation holes formed in the product chute 5, it is possible to maintain the product storage region in a high-temperature state. In this situation, although not illustrated, a compressor, a condenser, and an expansion valve for the refrigeration cycle are all provided in a machine chamber 7, which is provided on the outside of the product storage chamber 4.

The product storage racks 10 are three columns arranged in the front-and-back direction. Each of the product storage racks 10 includes a plurality of (two, in the illustrated example) product storage passages 13 that are formed so as to meander along the up-and-down direction by passage structuring elements 12 provided between a pair of base lateral boards 11. On the inside of each of the product storage passages 13, a plurality of products can be stored along the up-and-down-direction, while each product is in a laid-down posture extending sideways. More specifically, the passage structuring elements 12 are provided so as to face each other on the front side and the rear side of each of the product storage passages 13 and are fixed to the base lateral boards 11. With these arrangements, in each of the product storage racks 10, the two product storage passages 13 are provided so as to be positioned adjacent to each other in the front-and-back direction. In the following sections, in each of the product storage racks 10, the product storage passage 13 on the front side may be referred to as a first product storage passage 13*a*, whereas the product storage passage 13 on the rear side may be referred to as a second product storage passage 13*b*.

Further, the passage structuring elements 12 are provided with flappers (not illustrated). The flappers are swingably arranged with the passage structuring elements 12 so as to advance into and retreat from the product storage passages 13. The flappers are urged by coil springs (not illustrated) so as to be in the posture of having advanced into the product storage passages 13 in a normal state. Further, as a result of abutting against a product passing through any of the product storage passages 13, the flappers correct the posture of the passing product by making a retreating move so as to fit along the meandering product storage passage 13, against the urging force of the coil springs.

Each of the product storage racks 10 is provided with top trays 14 positioned in an upper part of the product storage passages 13 and with a product dispensing device 20 positioned in a lower part of the product storage passages 13.

Each of the top trays 14 is structured by bending a flat metal sheet and is provided between the base lateral boards 11 so as to be gradually sloped downward from the front toward the rear. The top face of each of the top trays 14 structures a product guiding passage 15 that guides the products that are input through an input slot to the corresponding product storage passage 13.

Figure 2:
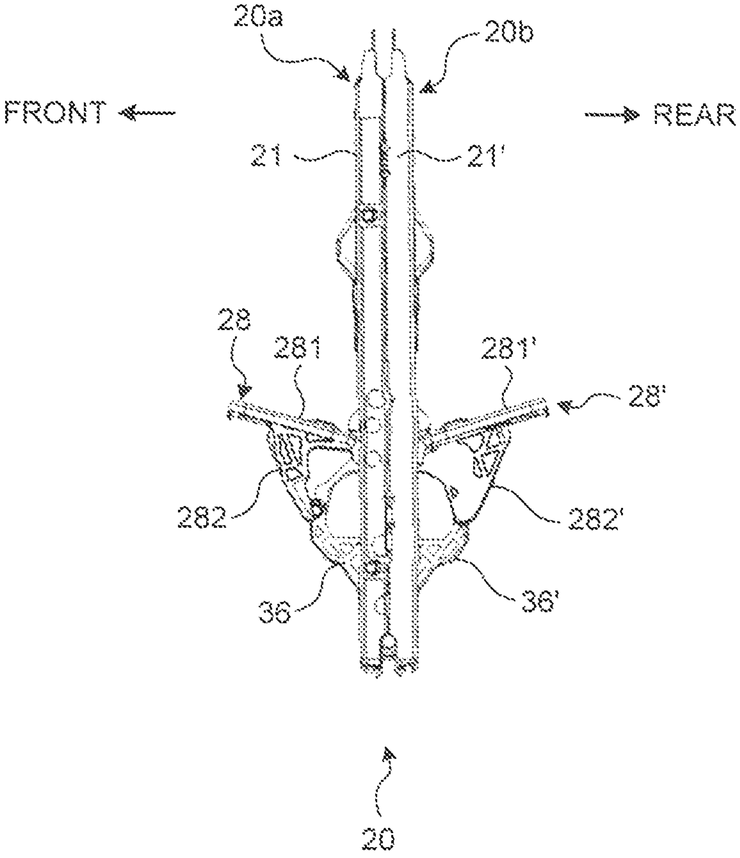
FIG. 2 is a side view from the right side of product dispensing devices illustrated in FIG. 1.
Figure 3:
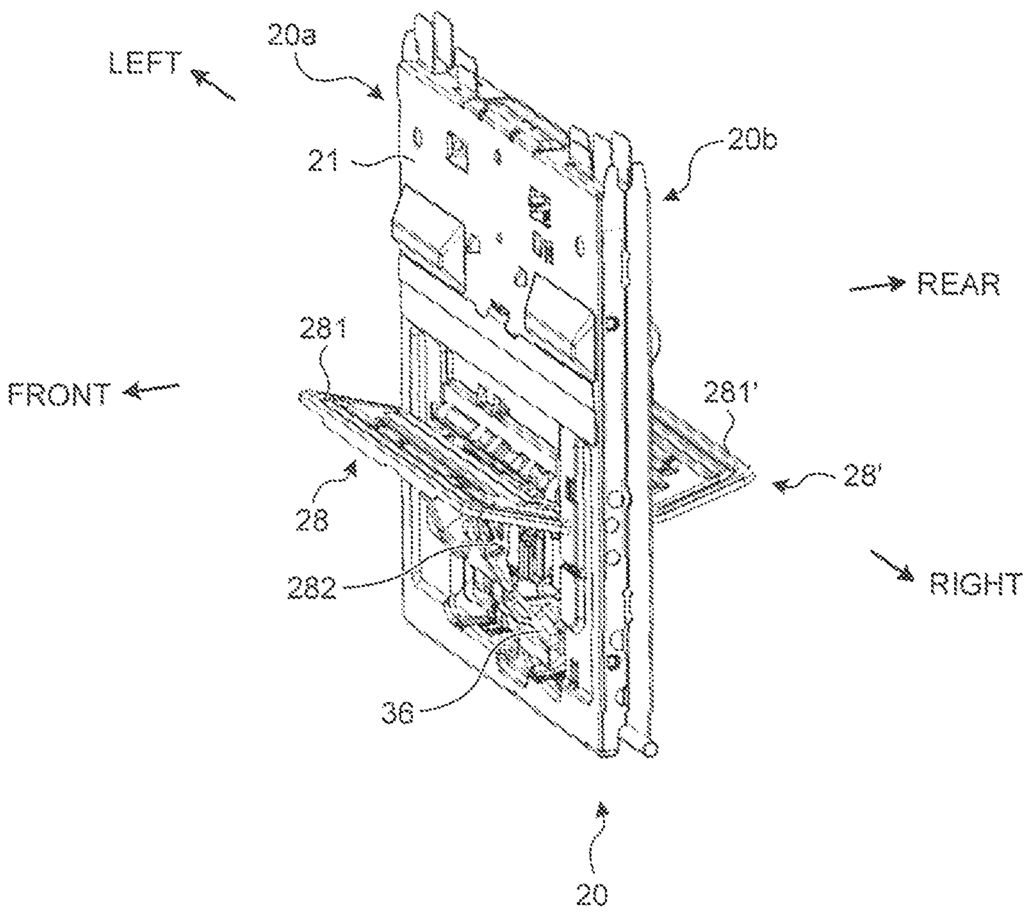
FIG. 3 is a perspective view from the right front side of the product dispensing devices illustrated in FIG. 1.
Figure 4:
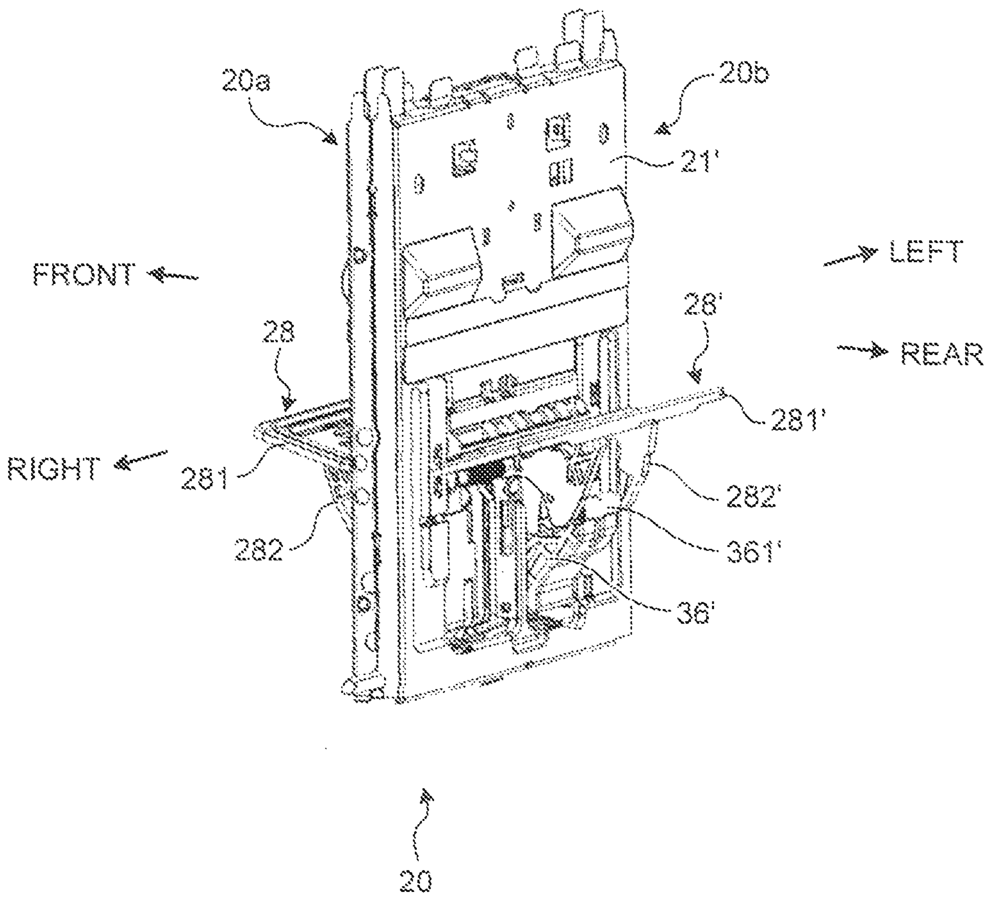
FIG. 4 is a perspective view from the right rear side of the product dispensing devices illustrated in FIG. 1.

FIGS. 2 to 4 each illustrate any of the product dispensing devices 20 illustrated in FIG. 1. FIG. 2 is a side view from the right side. FIG. 3 is a perspective view from the right front side. FIG. 4 is a perspective view from the right rear side.

As illustrated in FIGS. 2 to 4, the product dispensing device 20 includes one product discharging device (which hereinafter may be referred to as "first product discharging device") 20*a* and the other product discharging device (which hereinafter may be referred to as "second product discharging device") 20*b*. The first product discharging device 20*a* and the second product discharging device 20*b* are combined together and are positioned back to back with each other. FIGS. 2 to 4 each illustrate a situation where no products are stored for the first and the second product discharging devices 20*a* and 20*b* structuring the product dispensing device 20.

Figure 5:
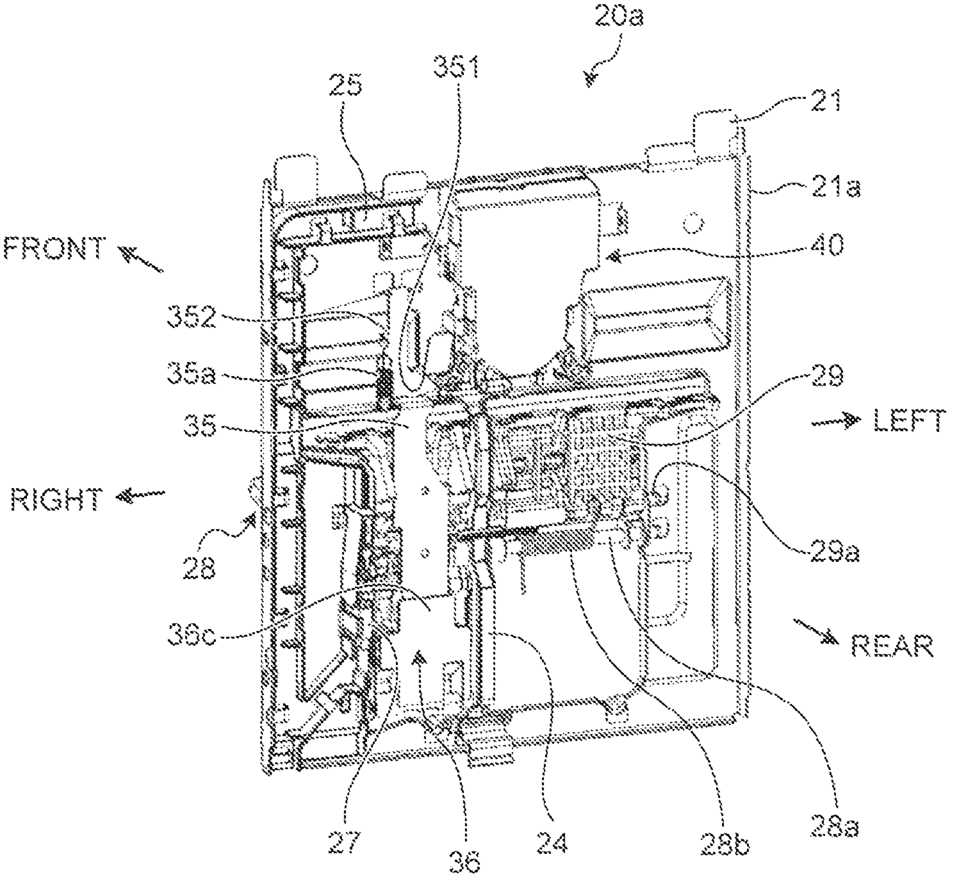
FIG. 5 is a perspective view from the right rear side of a first product discharging device illustrated in FIGS. 2 to 4.

FIG. 5 is a perspective view from the right rear side of the first product discharging device 20*a* illustrated in FIGS. 2 to 4. In the following sections, a configuration of the first product discharging device 20*a* will be explained. After that, the second product discharging device 20*b* will be explained.

Figure 6:
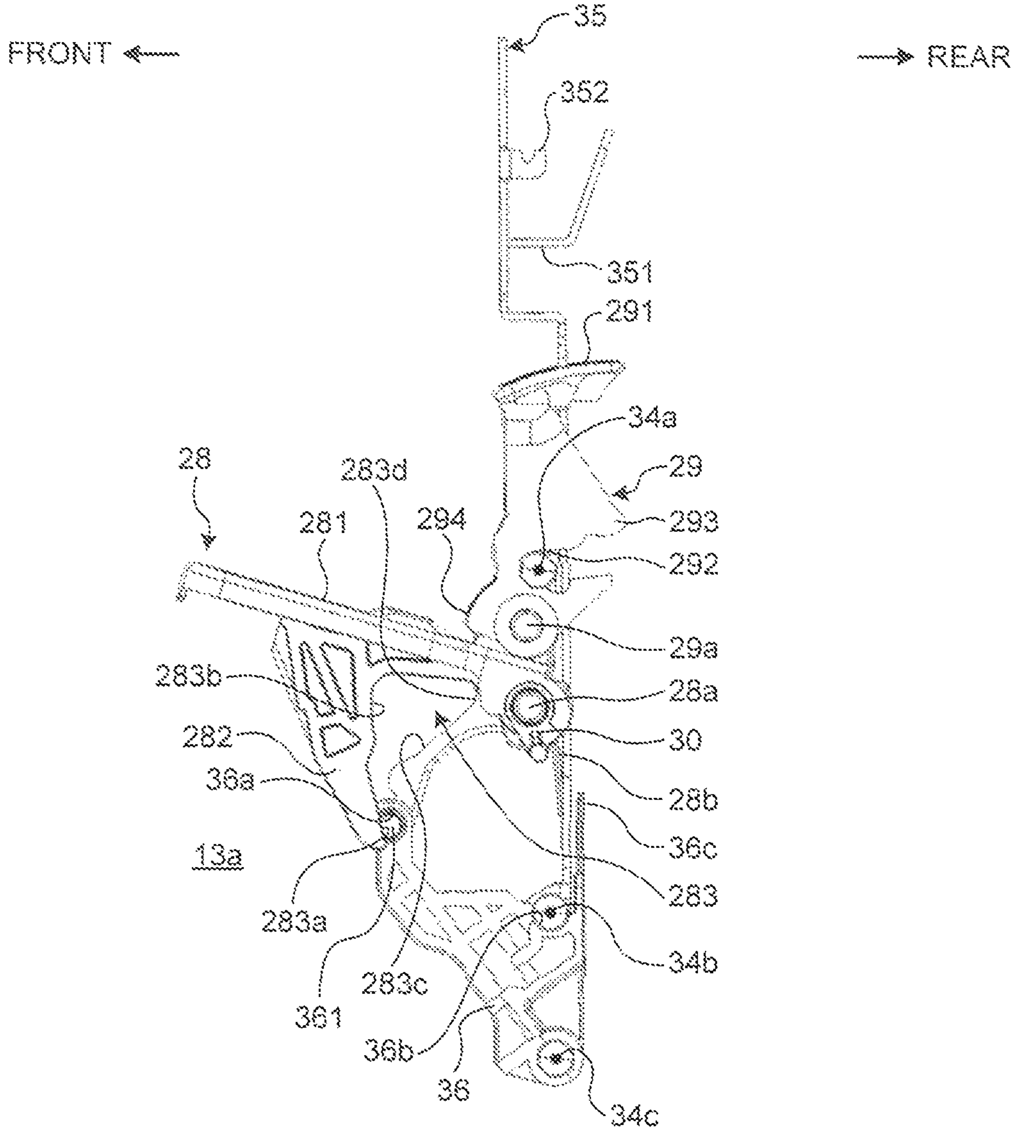
FIG. 6 is a schematic drawing for explaining a right side view of a relevant part of the first product discharging device illustrated in FIGS. 2 to 5.
Figure 7:
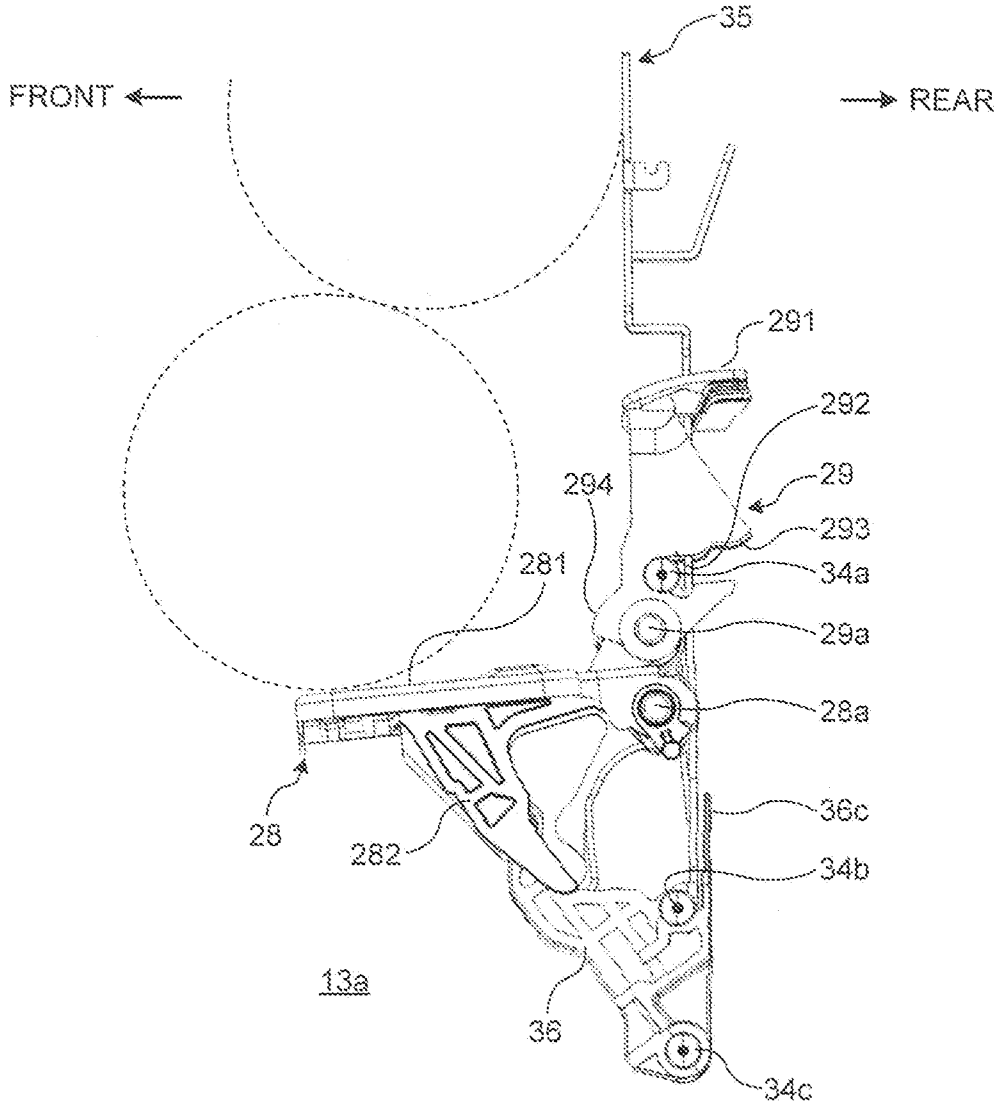
FIG. 7 is a schematic drawing for explaining the right side view of the relevant part of the first product discharging device illustrated in FIGS. 2 to 5.
Figure 8:
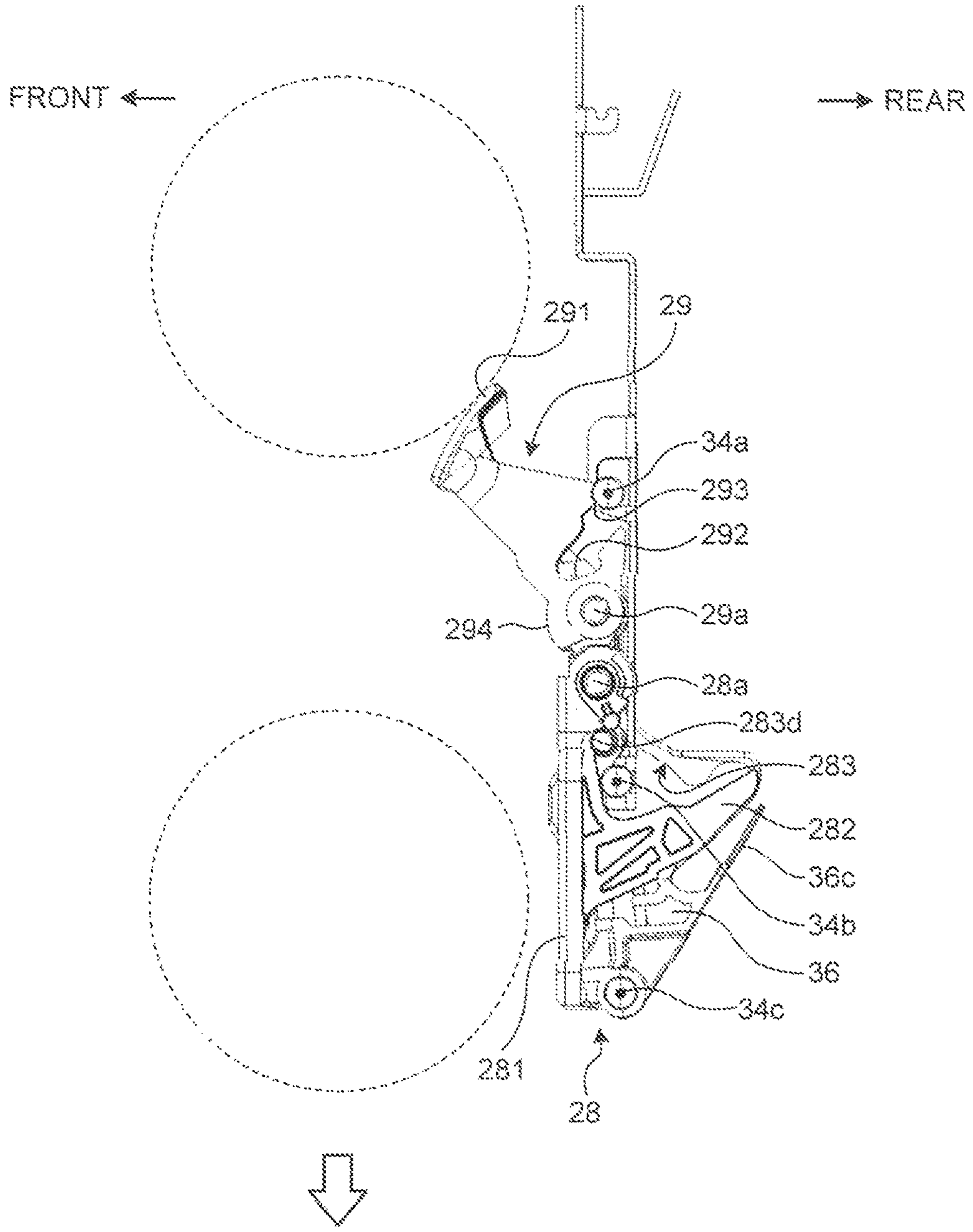
FIG. 8 is a schematic drawing for explaining the right side view of the relevant part of the first product discharging device illustrated in FIGS. 2 to 5.

FIGS. 6 to 8 are schematic drawings for explaining the right side view of a relevant part of the first product discharging device 20*a* illustrated in FIGS. 2 to 5. In the following sections, the configuration of the first product discharging device 20*a* will be explained, with reference to also FIGS. 6 to 8 as necessary.

The first product discharging device 20*a* is applied to the first product storage passage 13*a* and is provided in a lower part of the first product storage passage 13*a*. The first product discharging device 20*a* includes a base 21 and functions so as to store products in the first product storage passage 13*a* in a standby state and so as to deliver corresponding products to the product chute 5 one by one in a driven state, by controlling behaviors of the products in the space formed thereby with a passage width regulating board 16 opposing thereto.

Figure 9:
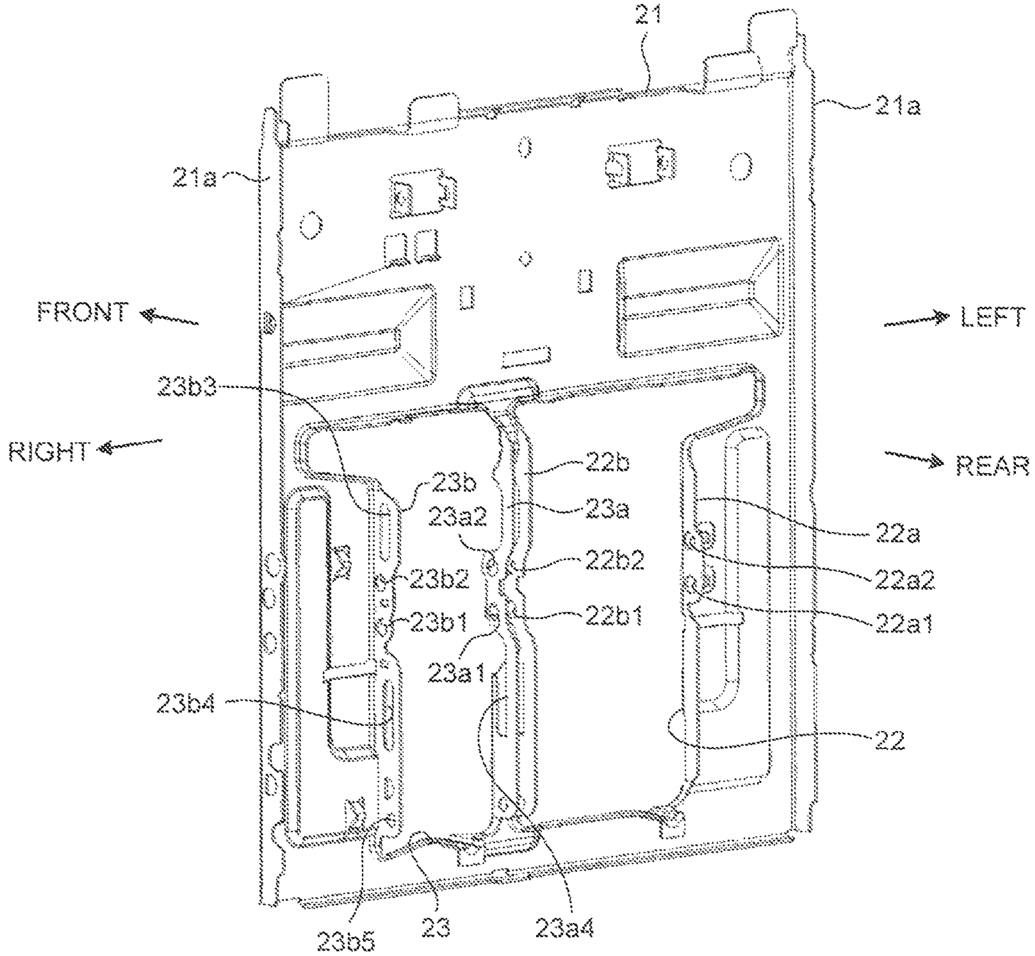
FIG. 9 is a perspective view of a base of the first product discharging device illustrated in FIGS. 2 to 5.

As illustrated in FIG. 9, the base 21 is configured by applying cutting processing and bending processing to a steel plate. The base 21 is positioned so that a surface thereof faces the passage width regulating board 16. The two lateral parts of the base 21 are bent so as to form side walls 21*a*. The base 21 also has a first insertion hole 22 and a second insertion hole 23 formed in a middle part thereof. The perimeters of the first insertion hole 22 and the second insertion hole 23 are bent so as to form flanges, similarly to the side walls 21*a*.

The first insertion hole 22 and the second insertion hole 23 are formed so as to be positioned side by side in the left-and-right direction and so as to have the same dimension as each other in the up-and-down direction. To describe the first insertion hole 22 and the second insertion hole 23 more specifically, the first insertion hole 22 is positioned on the left side of the second insertion hole 23, and the width of the first insertion hole 22 in the left-and-right direction is larger than the width of the second insertion hole 23 in the left-and-right direction. Further, the first insertion hole 22 and the second insertion hole 23 are each a through opening (a recess that allows a lower pedal 28 and an upper pedal 29 (explained later) to retreat to the inside of the base 21), and the two holes, as a whole, substantially form the shape of a rectangle. An upper end part of the first insertion hole 22 projects toward the left, whereas an upper end part of the second insertion hole 23 projects toward the right. A first left bearing piece 22*a* is provided in a left edge part of the first insertion hole 22, whereas a first right bearing piece 22*b* is provided in a right edge part of the first insertion hole 22. Further, a second left bearing piece 23*a* is provided in a left edge part of the second insertion hole 23, whereas a second right bearing piece 23*b* is provided in a right edge part of the second insertion hole 23. In this situation, the first left bearing piece 22*a* and the second right bearing piece 23*b* correspond to the flanges formed in the perimeters of the first insertion hole 22 and the second insertion hole 23. Further, the first right bearing piece 22*b* and the second left bearing piece 23*a* are formed as shaft insertion flanges serving as U-shaped two leg pieces of a bearing holding section that is configured to hold a bearing section 24 (explained later) in a fitted manner and that is integrally formed with the base 21 so as to have a U-shaped (discontinuous) cross section. Further, the bearing holding section has a function of maintaining the strength of the base 21, even when the base 21 has formed therein the large through opening structured by the first insertion hole 22 and the second insertion hole 23 that, as a whole, substantially form the shape of a rectangle.

Figure 10:
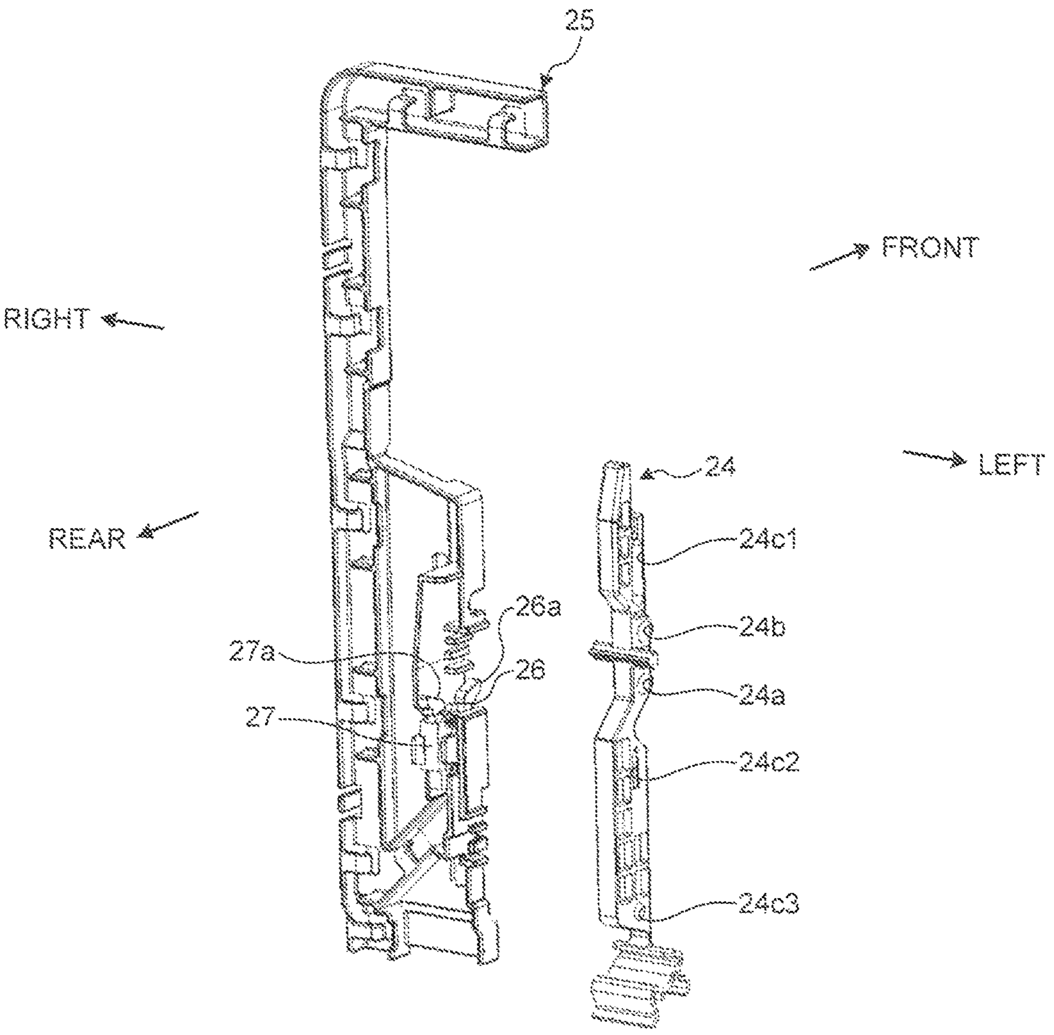
FIG. 10 is a perspective view of a bearing section and a harness guide attached to the base illustrated in FIG. 9.

The base 21 configured as described above has the bearing section 24 and a harness guide 25 attached thereto, as illustrated in FIG. 10. The bearing section 24 is formed by using a resin material and the like and is fitted between the first right bearing piece 22*b* and the second left bearing piece 23*a*.

The harness guide 25 is formed by using a resin material and the like, similarly to the bearing section 24. The harness guide 25 is fitted along the right side wall 21*a* of the base 21, so as to be positioned adjacent to the second right bearing piece 23*b*. The harness guide 25 is provided for the purpose of allowing a harness to extend along therewith, the harness being an electrical component attached to the first product discharging device 20*a*. Also, the harness guide 25 serves as a guiding member when the first product discharging device 20*a* and the second product discharging device 20*b* are combined together while being positioned back to back with each other.

The harness guide 25 is provided with a first sold-out detection switch 26 and a second sold-out detection switch 27.

The first sold-out detection switch 26 is arranged to be positioned next to the second sold-out detection switch 27 in the front-and-back direction and is positioned on the front side of the second sold-out detection switch 27. The first sold-out detection switch 26 is a so-called push-type switch and includes a contact element 26*a* that is urged by a spring (not illustrated) to stand upright. While the contact element 26*a* is not pressed, the first sold-out detection switch 26 is in an OFF state and sends an OFF signal to a dispensation controlling unit 110 (explained later). In contrast, while the contact element 26*a* is being pressed and displaced against the urging force of the spring, the first sold-out detection switch 26 is in an ON state and sends an ON signal to the dispensation controlling unit 110.

In the present embodiment, the first sold-out detection switch 26 is configured so as to be in the OFF state while the contact element 26*a* is not pressed and so as to be in the ON state while the contact element 26*a* is being pressed and displaced. However, in some embodiments, the first sold-out detection switch 26 may be configured so as to be in the ON state while the contact element 26*a* is not pressed and so as to be in the OFF state while the contact element 26*a* is being pressed and displaced.

The second sold-out detection switch 27 is positioned on the rear side of the first sold-out detection switch 26. The second sold-out detection switch 27 is a so-called push-type switch and includes a contact element 27*a* that is urged by a spring (not illustrated) to stand upright. While the contact element 27*a* is not pressed, the second sold-out detection switch 27 is in an OFF state and sends an OFF signal to the dispensation controlling unit 110 (explained later). In contrast, while the contact element 27*a* is being pressed and displaced against the urging force of the spring, the second sold-out detection switch 27 is in an ON state and sends an ON signal to the dispensation controlling unit 110.

In the present embodiment, the second sold-out detection switch 27 is configured so as to be in the OFF state while the contact element 27*a* is not pressed and so as to be in the ON state while the contact element 27*a* is being pressed and displaced. However, in some embodiments, the second sold-out detection switch 27 may be configured so as to be in the ON state while the contact element 27*a* is not pressed and so as to be in the OFF state while the contact element 27*a* is being pressed and displaced.

The base 21 is provided with a first swing support shaft 28*a* and a second swing support shaft 29*a*. The first swing support shaft 28*a* is a shaft-like member that is installed to span across through the through holes 22*a*1, 22*b*1, 23*a*1, 23*b*1, and 24*a* formed in the first left bearing piece 22*a*, the first right bearing piece 22*b*, the second left bearing piece 23*a*, the second right bearing piece 23*b*, and the bearing section 24, in such a manner that the first swing support shaft 28*a* extends substantially in the horizontal direction. The first swing support shaft 28*a* supports the lower pedal 28 in a middle part thereof.

Figure 11:
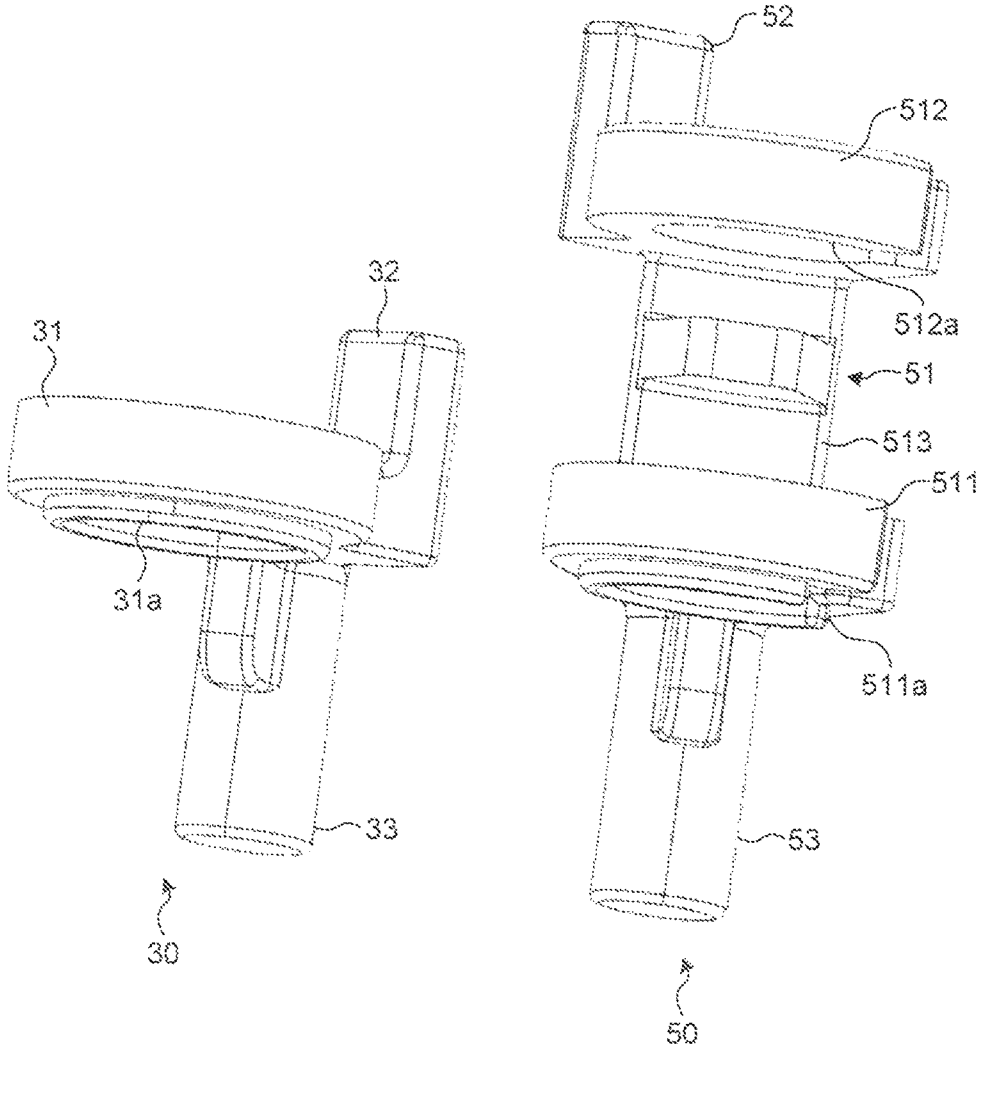
FIG. 11 is a perspective view of a first sold-out link and a second sold-out link.

Further, a first sold-out link 30 is provided at the right end of the first swing support shaft 28*a*. As illustrated in FIG. 11, the first sold-out link 30 is configured so as to include a first sold-out base section 31, a first sold-out abutting section 32, and a first sold-out pressing section 33. The first sold-out base section 31 is substantially in the shape of a disc and has formed therein a through hole 31*a* through which the right end of the first swing support shaft 28*a* penetrates. The first sold-out abutting section 32 extends from a rear part of the first sold-out base section 31 toward the left side. The first sold-out pressing section 33 is formed so as to protrude from a lower part of the first sold-out base section 31 toward the right side. The through hole 31*a* formed in the first sold-out base section 31 is arranged to be larger than the first swing support shaft 28*a*, so that the first sold-out link 30 is able to move freely with respect to the first swing support shaft 28*a*.

The second swing support shaft 29*a* is a shaft-like member that is installed to span across through the through holes 22*a*2, 22*b*2, 23*a*2, 23*b*2, and 24*b* formed in the first left bearing piece 22*a*, the first right bearing piece 22*b*, the second left bearing piece 23*a*, the second right bearing piece 23*b*, and the bearing section 24, in such a manner that the second swing support shaft 29*a* extends substantially in the horizontal direction, in a region above the first swing support shaft 28*a*. The second swing support shaft 29*a* supports the upper pedal 29 in a middle part thereof.

The lower pedal 28 is a plate-like member and is provided so as to be swingable on the central axis of the first swing support shaft 28*a*, as a result of having the first swing support shaft 28*a* inserted through the basal end thereof.

The distal end of the lower pedal 28 extends outward in the radial direction of the first swing support shaft 28*a*. When swinging around on the central axis of the first swing support shaft 28*a*, the distal end of the lower pedal 28 is able to advance into and retreat from the first product storage passage 13*a* via the first insertion hole 22 and the second insertion hole 23. In other words, the lower pedal 28 is configured so as to be swingable to advance into and retreat from the first product storage passage 13*a*.

A lower pedal spring 28*b* is interposed between the lower pedal 28 and the base 21. The lower pedal spring 28*b* is configured to urge the lower pedal 28 at all times in such a direction that the lower pedal 28 advances into the first product storage passage 13*a*. More specifically, as illustrated in FIG. 6, the lower pedal spring 28*b* is configured to arrange the lower pedal 28 to be in a standby posture (which hereinafter may be referred to as "standby-without-product posture") where the distal end of the lower pedal 28 is positioned higher than the first swing support shaft 28*a*. Further, when a product is placed on the top face of the lower pedal 28, as illustrated in FIG. 7, the lower pedal spring 28*b* is configured to arrange the lower pedal 28 in another standby posture (which hereinafter may be referred to as "standby-with-product posture") where the distal end of the lower pedal 28 is positioned at the same height as the first swing support shaft 28*a*.

In this configuration, when the lower pedal 28 is in the standby-without-product posture, the distal end of the lower pedal 28 is positioned higher than when the lower pedal 28 is in the standby-with-product posture.

Figure 12:
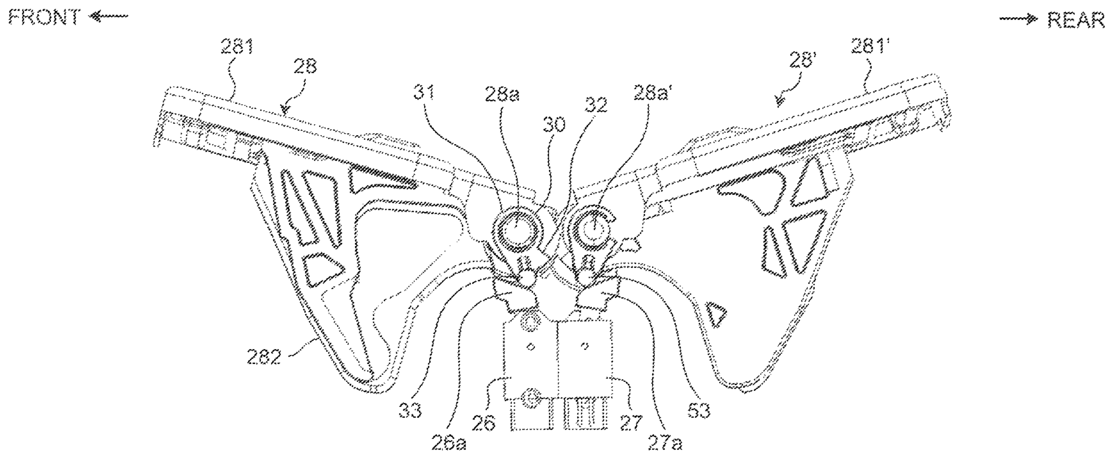
FIG. 12 is a side view of a relevant part of the product dispensing device illustrated in FIGS. 2 to 4.

Further, when the lower pedal 28 is in the standby-without-product posture as illustrated in FIG. 12, as a result of the basal end of the lower pedal 28 abutting against the first sold-out abutting section 32 of the first sold-out link 30, the first sold-out link 30 rotates by using the first swing support shaft 28*a* as the rotation center, which causes the first sold-out pressing section 33 to press the contact element 26*a* of the first sold-out detection switch 26. Accordingly, the first sold-out detection switch 26 goes into the ON state, as a result of the contact element 26*a* being pressed and being displaced forward against the urging force of the spring and thus sends the ON signal to the dispensation controlling unit 110.

Figure 13:
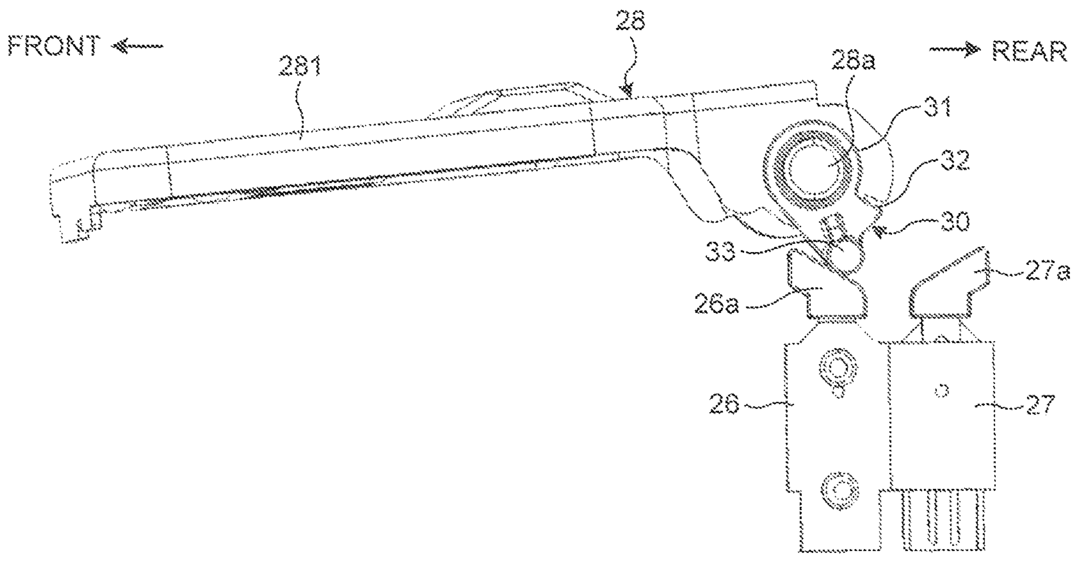
FIG. 13 is a side view illustrating a relationship between the first sold-out link and a first sold-out detection switch observed when a lower pedal is in a standby-with-product posture.

When the lower pedal 28 is in the standby-with-product posture, in contrast, as a result of the basal end of the lower pedal 28 being positioned apart from the first sold-out abutting section 32 of the first sold-out link 30 as illustrated in FIG. 13, the first sold-out link 30 goes into a free state. Accordingly, the first sold-out detection switch 26 goes into the OFF state, as a result of the contact element 26*a* being urged by the spring so as to be in an upright posture, and thus sends the OFF signal to the dispensation controlling unit 110. In other words, the first sold-out link 30 that is in the free state rotates by using the first swing support shaft 28*a* as the rotation center, as a result of the first sold-out pressing section 33 being pressed by the contact element 26*a*.

The lower pedal 28 described above includes a plate-like pedal main body 281 and a pair of guiding sections 282. The pair of guiding sections 282 is provided on the rear surface side of the pedal main body 281. The guiding sections 282 are each a plate-like member extending in the up-and-down direction and are formed so as to oppose each other. A guiding groove 283 is formed on each of the opposing surfaces of the guiding sections 282.

The guiding groove 283 includes: a fitted section 283*a* which is in the lowest position when the lower pedal 28 is in an advance position (the state illustrated in FIG. 6) where the lower pedal 28 has advanced, to the maximum, into the first product storage passage 13*a* and into which a pedal operation shaft 361 of a rotation stopper 36 (explained later) is fitted; an abutted section 283*d* which is in the highest position when the lower pedal 28 is in a retreat position (the state illustrated in FIG. 8) where the lower pedal 28 has retreated, to the maximum, from the first product storage passage 13*a* and against which the pedal operation shaft 361 of the rotation stopper 36 abuts; and a first guiding section 283*b* and a second guiding section 283*c* that connect the fitted section 283*a* and the abutted section 283*d* together so as to be contiguous.

The first guiding section 283*b* is formed in the guiding section 282 in such a manner that, when the lower pedal 28 has advanced, to the maximum, into the first product storage passage 13*a* (i.e., the advance position), the first guiding section 283*b* is sloped diagonally upward so as to extend from the fitted section 283*a* to be positioned away from the base 21, and is then sloped diagonally upward so as to approach the base 21 and to reach the abutted section 283*d*.

The second guiding section 283*c* is formed in the guiding section 282 in such a manner that, when the lower pedal 28 has advanced, to the maximum, into the first product storage passage 13*a* (i.e., the advance position), the second guiding section 283*c* is sloped diagonally downward so as to extend from the abutted section 283*d* to be positioned away from the base 21 and to reach the fitted section 283*a*.

The length of the lower pedal 28 from the first swing support shaft 28*a* outward in the radial direction is arranged so as to ensure that a gap smaller than the maximum width of a product having a small maximum width is formed between the lower pedal 28 and the passage width regulating board 16, when the lower pedal 28 has advanced, to the maximum, into the first product storage passage 13*a* (i.e., the advance position).

The upper pedal 29 is a plate-like member and is arranged with the base 21 so as to be swingable on the central axis of the second swing support shaft 29*a*, as a result of having the second swing support shaft 29*a* inserted through the basal end thereof.

The distal end of the upper pedal 29 extends outward in the radial direction of the second swing support shaft 29*a*. When swinging around on the central axis of the second swing support shaft 29*a*, the distal end of the upper pedal 29 is able to advance into and retreat from the first product storage passage 13*a* via the first insertion hole 22 and the second insertion hole 23. In other words, the upper pedal 29 is configured so as to be swingable to advance into and retreat from the first product storage passage 13*a*.

An upper pedal spring (not illustrated) is interposed between the upper pedal 29 and the base 21. The upper pedal spring is configured to urge the upper pedal 29 at all times in such a direction that the upper pedal 29 retreats from the first product storage passage 13*a*.

The upper pedal 29 is provided with a pressed sloped face 291, a recess 292, a stopper abutting section 293, and a projection 294. The pressed sloped face 291 is a curved sloped face that is provided at the distal end of the upper pedal 29 and that is gradually sloped downward toward the first product storage passage 13*a* when the upper pedal 29 is caused to retreat from the first product storage passage 13*a*. The recess 292 is one strip of recessed section that is provided on the rear surface side of the upper pedal 29 and that extends substantially in the horizontal direction so as to have openings on the two lateral faces of the upper pedal 29. The stopper abutting section 293 is a section against which a stopper pin 34*a* (explained later) abuts and is formed to be sloped above the recess 292 on the rear surface of the upper pedal 29.

The projection 294 is provided at the basal end of the upper pedal 29 so as to project toward the first product storage passage 13*a*.

The upper pedal 29 is urged by the urging force of the upper pedal spring so as to retreat from the first product storage passage 13*a*. However, an initial position is set to a state in which the upper pedal 29 has retreated from the first product storage passage 13*a*, as a result of the stopper pin 34*a* abutting against the recess 292.

The upper pedal 29 configured as described above is in the state of leaning forward with respect to a vertical plane passing through the second swing support shaft 29*a*, while in the state (illustrated in FIG. 8) of having advanced, to the maximum, into the first product storage passage 13*a* (i.e., the advance position). Further, the length of the upper pedal 29 from the second swing support shaft 29*a* outward in the radial direction is arranged so as to ensure that a gap smaller than the maximum width of a product having a small maximum width is formed between the upper pedal 29 and the passage width regulating board 16, when the upper pedal 29 is in the leaning-forward state described above.

With the base 21 described above, a stopper pin 34*a*, a pedal stopper pin 34*b*, and a stopper shaft 34*c* are installed to span across between the bearing section 24 and the second right bearing piece 23*b*.

The stopper pin 34*a* is a shaft-like member that is provided between the bearing section 24 and the second right bearing piece 23*b* so as to extend substantially in the horizontal direction. One end of the stopper pin 34*a* is inserted through a stopper pin insertion hole 23*b*3 formed in the second right bearing piece 23*b*, whereas the other end thereof is inserted through a stopper pin insertion hole 24*c*1 formed in the bearing section 24 exposed from the second left bearing piece 23*a*. The stopper pin 34*a* is connected to a pedal link 35 and is capable of moving in up-and-down directions on the inside of the stopper pin insertion holes 23*b*3 and 24*c*1, in conjunction with moves of the pedal link 35 in up-and-down directions. Further, the stopper pin 34*a* abuts against the recess 292 of the upper pedal 29 placed in the initial position.

The pedal stopper pin 34*b* is a shaft-like member provided between the bearing section 24 and the second right bearing piece 23*b* so as to extend substantially in the horizontal direction. One end of the pedal stopper pin 34*b* is inserted through a pedal stopper pin supporting groove 24*c*2 (which is a long groove extending in up-and-down directions similarly to the stopper pin insertion hole 24*c*1, is closed by the groove bottom from which the reference character 24*c*1 is drawn, and is not visible in FIG. 6) formed in the bearing section 24, whereas the other end thereof is inserted through a pedal stopper pin supporting groove 23*b*4 formed in the second right bearing piece 23*b*. The second left bearing piece 23*a* is provided with an insertion groove 23*a*4 so that the pedal stopper pin supporting groove 24*c*2 is exposed. The pedal stopper pin 34*b* is connected to the pedal link 35 and is capable of moving in up-and-down directions on the inside of the pedal stopper pin supporting grooves 23*b*4 and 24*c*2, in conjunction with moves of the pedal link 35 in up-and-down directions. When the pedal link 35 is moved in the up-and-down directions, the circumferential surface of the pedal stopper pin 34*b* slides in the grooves of the pedal stopper pin supporting grooves 23*b*4 and 24*c*2.

The stopper shaft 34*c* is a shaft-like member that is provided between the bearing section 24 and the second right bearing piece 23*b* so as to extend substantially in the horizontal direction. One end of the stopper shaft 34*c* is inserted through a stopper shaft insertion hole 24*c*3 formed in the bearing section 24, whereas the other end thereof is inserted through an insertion hole 23*b*5 formed in the second right bearing piece 23*b*. The second left bearing piece 23*a* has formed therein an insertion hole for the stopper shaft 34*c*. The stopper shaft 34*c* supports, in a middle part thereof, the rotation stopper 36.

The rotation stopper 36 is provided between the bearing section 24 and the second right bearing piece 23*b*, in such a manner that the stopper shaft 34*c* is inserted through an insertion hole formed at the basal end thereof and so as to be swingable on the central axis of the stopper shaft 34*c*.

The distal end of the rotation stopper 36 extends outward in the radial direction of the stopper shaft 34*c* and is able to advance into and retreat from the first product storage passage 13*a* via the second insertion hole 23, when swinging around on the central axis of the stopper shaft 34*c*.

The rotation stopper 36 includes the pedal operation shaft 361 by having the pedal operation shaft 361 penetrate through the through hole 36*a* formed at the distal end thereof. The pedal operation shaft 361 is a shaft-like member provided to extend substantially in the horizontal direction, and the two ends thereof are fitted in the guiding grooves 283 formed in the lower pedal 28 described above.

A pedal operation spring (not illustrated) is interposed between the rotation stopper 36 and the base 21. The pedal operation spring urges the rotation stopper 36 at all times in such a direction that the rotation stopper 36 advances into the first product storage passage 13*a*.

The rotation stopper 36 is urged by the pedal operation spring in such a direction that the rotation stopper 36 advances into the first product storage passage 13*a*. As a result of the pedal stopper pin 34*b* entering a depression 36*b* of the rotation stopper 36, so that the rotation stopper 36 abuts against the pedal stopper pin 34*b*, the move of the rotation stopper 36 in the retreating direction is restrained. The initial position of the rotation stopper 36 is set in the state where the rotation stopper 36 has advanced into the first product storage passage 13*a*. Further, because the lower pedal 28 is urged by the lower pedal spring 28*b*, the initial position of the rotation stopper 36 is set so that the two ends of the pedal operation shaft 361 are positioned at the fitted section 283*a* of the guiding grooves 283, whereas the lower pedal 28 has advanced into the first product storage passage 13*a*.

Figure 14:
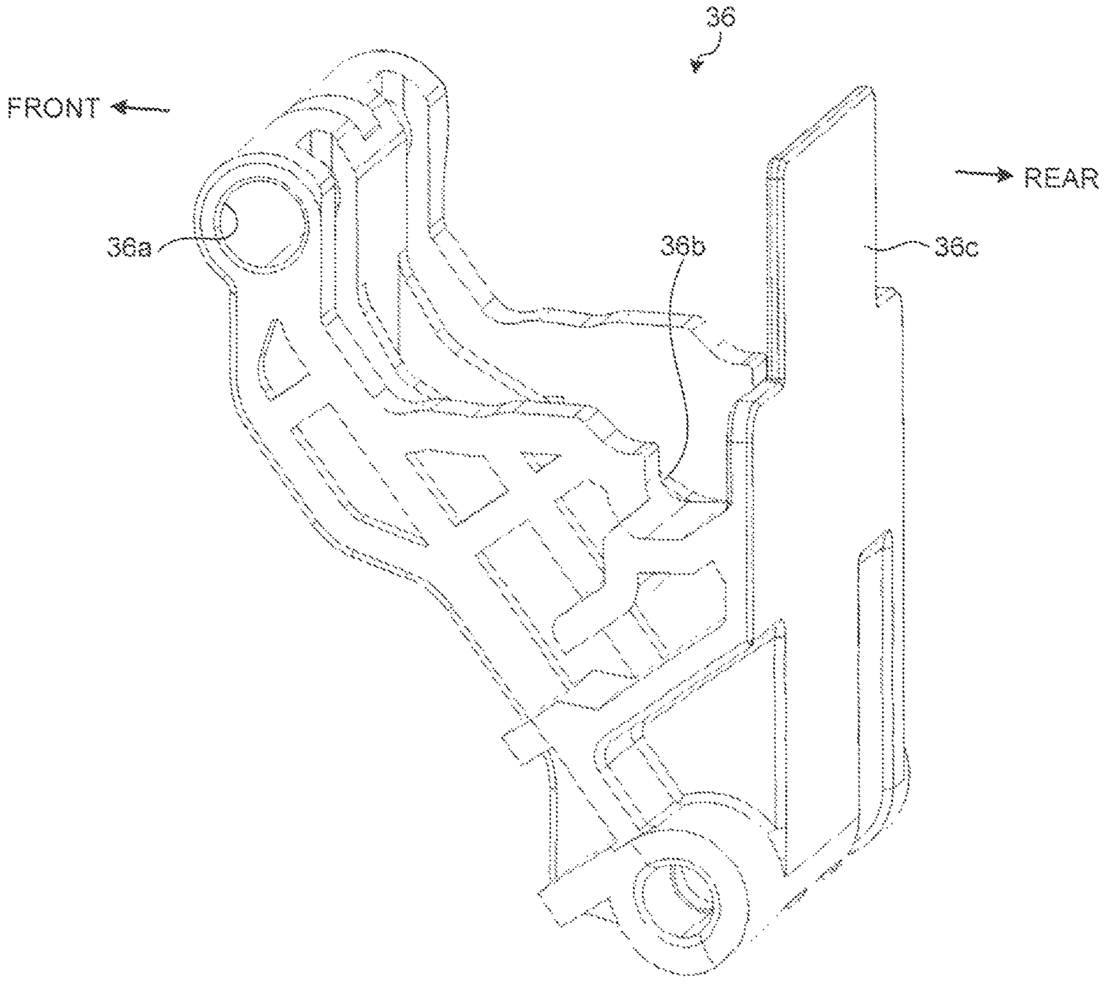
FIG. 14 is a perspective view of a rotation stopper structuring the first product discharging device illustrated in FIGS. 2 to 5.
Figure 15:
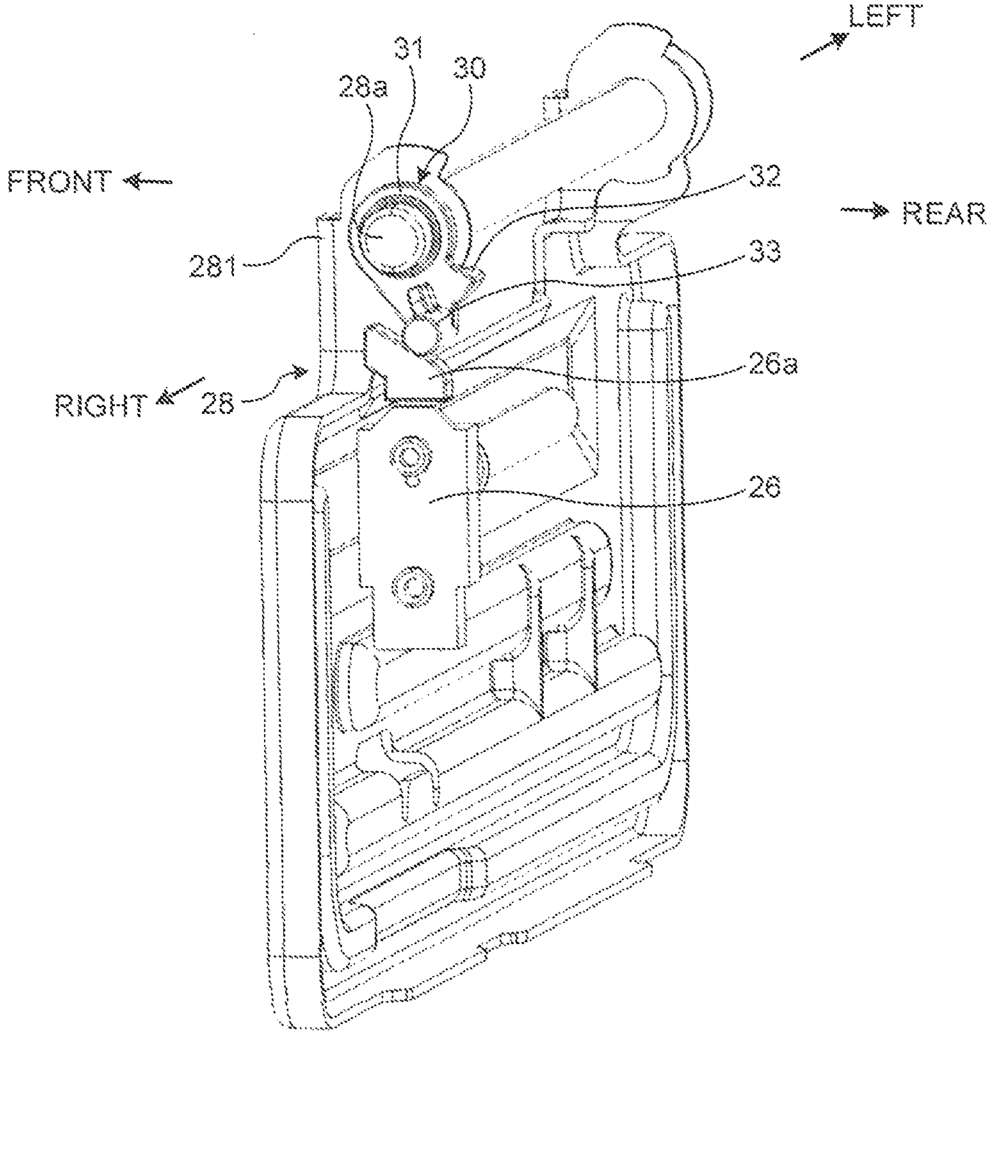
FIG. 15 is a perspective view illustrating a relationship between the first sold-out link and the first sold-out detection switch observed when the lower pedal has made a retreating move.

Further, as illustrated in FIG. 14, the rotation stopper 36 is provided with a plate-like blindfold section 36*c* that extends upward on the rear surface side thereof, i.e., on the rear surface side of the depression 36*b*. The blindfold section 36*c* is arranged to cover such a part of the pedal stopper pin 34*b* that is positioned opposite from the first product storage passage 13*a*. More specifically, the blindfold section 36*c* is arranged to cover such a part of the pedal stopper pin 34*b* moving in the up-and-down directions that is positioned opposite from the first product storage passage 13*a*.

The pedal link 35 described above is a longitudinal plate-like member that extends in an up-and-down direction, and an upper part thereof is bent toward the front and is then extended upward. The upper part of the pedal link 35 is provided with an abutting piece 351 that is extended toward the rear and is then extended diagonally upward. The upper part of the pedal link 35 is also provided with a locking section 352 that locks a link spring 35*a*. The link spring 35*a* is interposed between the pedal link 35 and the base 21 and is configured to urge the pedal link 35 downward at all times.

In the state where the pedal link 35 is positioned in the lower position by being urged by the link spring 35*a*, the stopper pin 34*a* is positioned at the lower ends of the stopper pin insertion holes 23*b*3 and 24*c*1. In addition, the pedal stopper pin 34*b* is positioned at the lower ends of the pedal stopper pin supporting grooves 23*b*4 and 24*c*2. In this state, the recess 292 of the upper pedal 29 positioned in the retreat position abuts against the stopper pin 34*a*. Furthermore, the rotation stopper 36 positioned in the advance position abuts against the pedal stopper pin 34*b*, so as to restrain the retreating move of the rotation stopper 36. Further, the pedal operation shaft 361 of the rotation stopper 36 positioned in the advance position is fitted in the fitted section 283*a* of the lower pedal 28, and the retreating move of the lower pedal 28 positioned in the advance position is thereby restrained.

In contrast, in the state where the pedal link 35 is positioned in the upper position against the urging force of the link spring 35*a*, the stopper pin 34*a* is positioned at the upper ends of the stopper pin insertion holes 23*b*3 and 24*c*1, as illustrated in FIG. 8. In addition, the pedal stopper pin 34*b* is positioned at the upper ends of the pedal stopper pin supporting grooves 23*b*4 and 24*c*2. In this state, as a result of the stopper abutting section 293 of the upper pedal 29 abutting against the stopper pin 34*a*, the retreating move of the upper pedal 29 is restrained, so that the upper pedal 29 is positioned in the advance position as a result of making an advancing move against the urging force of the upper pedal spring.

Further, because the restraining for the retreating move imposed by the pedal stopper pin 34*b* is cancelled, the rotation stopper 36 is released from the restraining for the retreating move centered on the stopper shaft 34*c*. In this situation, the weight of the product abutting against the lower pedal 28 that is maintained in the advance position by the rotation stopper 36 is applied to the rotation stopper 36. Accordingly, as a result of the rotation stopper 36 being released from the restraining for the retreating move, the rotation stopper 36 starts a retreating move. As the retreating move of the rotation stopper 36 is started, because the pedal operation shaft 361 comes out of the fitted section 283*a* of the lower pedal 28, the lower pedal 28 is permitted to make a retreating move centered on the first swing support shaft 28*a* and thus makes the retreating move due to the weight of the product, against the elastic urging force of the lower pedal spring 28*b* (see FIG. 8).

Further, when the lower pedal 28 makes the retreating move in this manner, as a result of the basal end of the lower pedal 28 being positioned apart from the first sold-out abutting section 32 of the first sold-out link 30, the first sold-out link 30 goes into a free state.

Accordingly, because the contact element 26*a* of the first sold-out detection switch 26 is in an upright posture by being urged by the spring, the OFF state is maintained. In other words, also when the lower pedal 28 has retreated, the first sold-out link 30 does not press the contact element 26*a* of the first sold-out detection switch 26, similarly to when the lower pedal 28 is in the standby-with-product posture.

The first product discharging device 20*a* configured as described above also includes a driving unit 40, in addition to the constituent elements described above.

Figure 16:
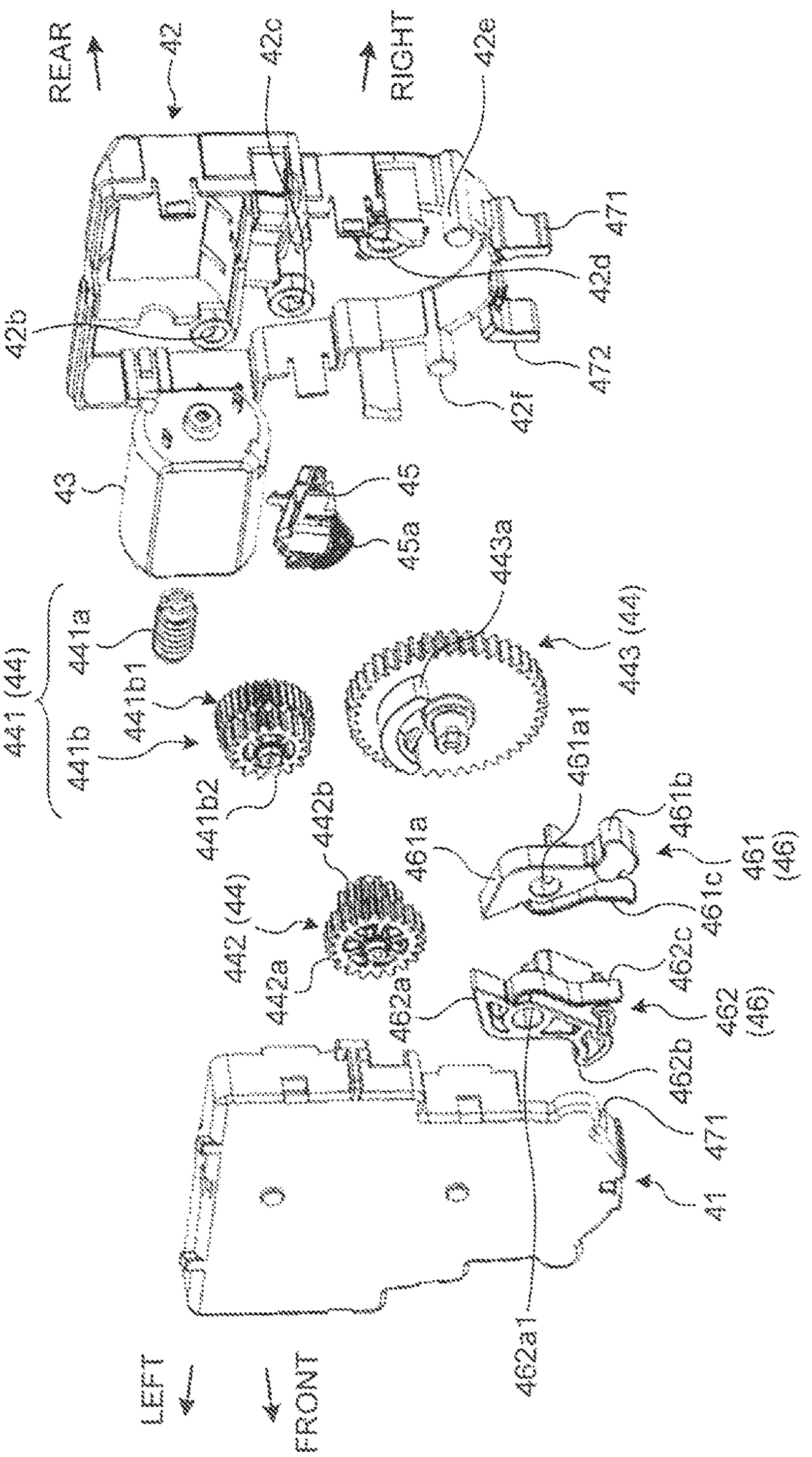
FIG. 16 is an exploded perspective view from the right front side of a relevant part of a driving unit in the first product discharging device.
Figure 17:
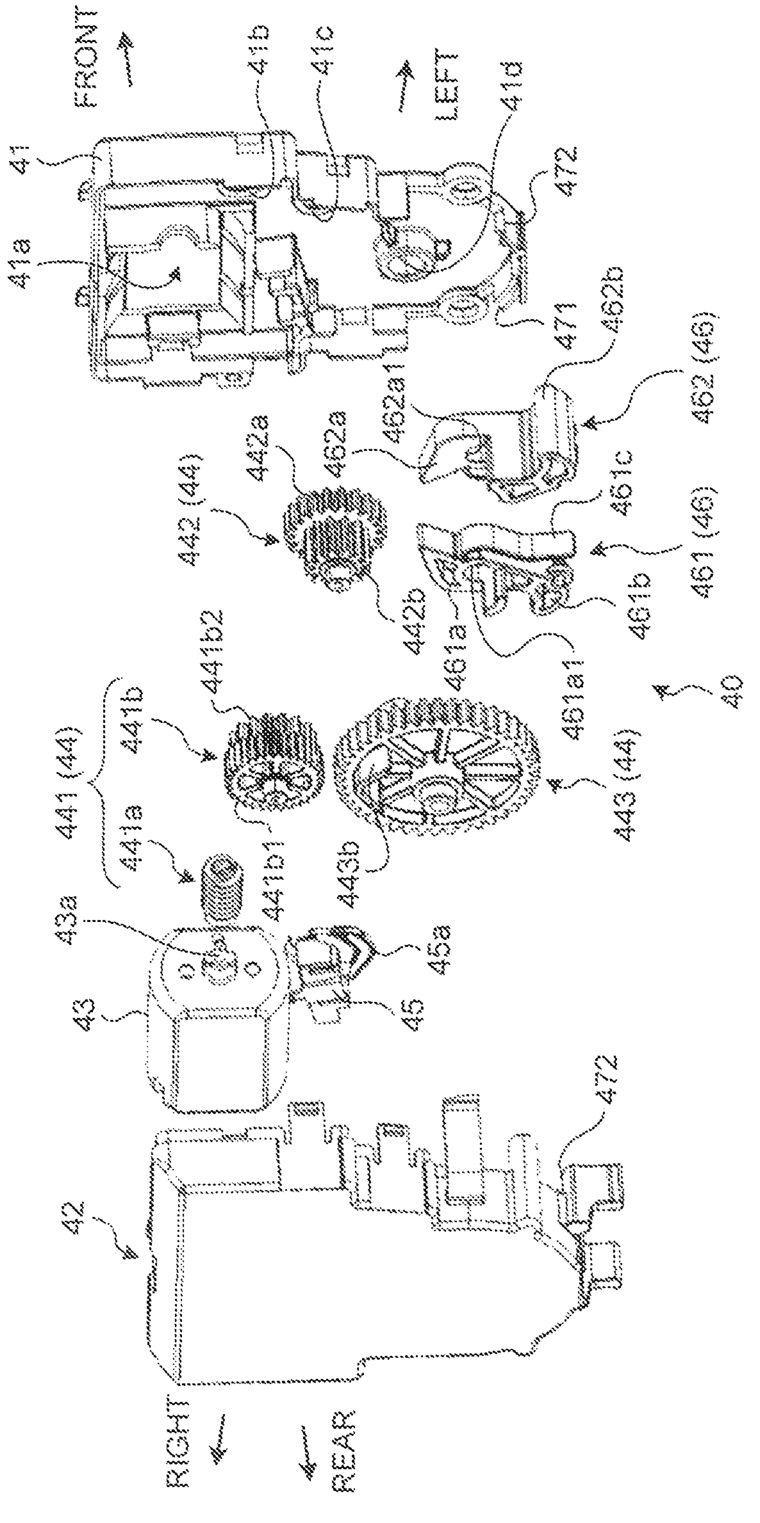
FIG. 17 is an exploded perspective view from the left rear side of a relevant part of the driving unit in the first product discharging device.

FIGS. 16 and 17 each illustrate a relevant part of the driving unit 40 included in the first product discharging device 20*a*. FIG. 16 is an exploded perspective view from the right front side, whereas FIG. 17 is an exploded perspective view from the left rear side.

The driving unit 40 is provided in a central region in an upper part on the rear surface side of the base 21. The driving unit 40 includes a unit base 41 attached to the rear surface of the base 21.

The unit base 41 is formed by using, for example, a resin material and the like and is formed in the shape of a box of which the rear face is open. The opening on the rear face of the unit base 41 is closed by attaching thereto a unit cover 42 made of resin, so as to form an accommodating space between the unit base 41 and the unit cover 42. The accommodating space formed by the unit base 41 and the unit cover 42 in this manner has stored therein a motor 43, gear members 44, a carrier switch 45, and link levers 46.

The motor 43 serves as a driving source and is a direct-current motor that is capable of rotating in forward and reverse directions and that performs a driving operation in response to an instruction given thereto by the dispensation controlling unit 110 (explained later). The motor 43 is provided while being held by a motor holding section 41*a* of the unit base 41.

The gear members 44 are structured so as to include worm gears 441, intermediate gears 442, and an output gear 443. The worm gears 441 include a worm 441*a* and worm wheels 441*b*.

The worm 441*a* is in the shape of a circular cylinder and is attached to an output shaft 43*a* of the motor 43. The worm wheels 441*b* include a disc-shaped first worm wheel 441*b*1 and a disc-shaped second worm wheel 441*b*2.

The first worm wheel 441*b*1 has formed therewith, in a central part thereof, a shaft-like section protruding toward the rear and has further formed therewith, on the circumferential surface thereof, a gear section including a plurality of teeth.

The second worm wheel 441*b*2 is positioned on the front face side of the first worm wheel 441*b*1 and has formed therewith a shaft-like section which protrudes toward the front and of which the central axis is aligned with the central axis of the shaft-like section of the first worm wheel 441*b*1. The second worm wheel 441*b*2 also has formed therewith, on the circumferential surface thereof, a gear section including a plurality of teeth.

The worm wheels 441*b* configured as described above are provided so as to be rotatable on the central axis of the shaft-like section, as a result of the shaft-like section being inserted through recesses 41*b* and 42*b* formed in the unit base 41 and the unit cover 42, while the gear section of the first worm wheel 441*b*1 is engaged with the worm 441*a*.

The intermediate gears 442 include a disc-shaped first intermediate gear 442*a* and a disc-shaped second intermediate gear 442*b*. The first intermediate gear 442*a* has formed therewith, in a central part thereof, a shaft-like section protruding toward the rear and has further formed therewith, on the circumferential surface thereof, a gear section including a plurality of teeth.

The second intermediate gear 442*b* is positioned on the rear face side of the first intermediate gear 442*a* and has formed therewith a shaft-like section which protrudes toward the front and of which the central axis is aligned with the central axis of the shaft-like section of the first intermediate gear 442*a*. The second intermediate gear 442*b* also has formed therewith, on the circumferential surface thereof, a gear section including a plurality of teeth.

The intermediate gears 442 configured as described above are provided so as to be rotatable on the central axis of the shaft-like section, as a result of the shaft-like section being inserted through recesses 41*c* and 42*c* formed in the unit base 41 and the unit cover 42, while the gear section of the first intermediate gear 442*a* is engaged with the gear section of the second worm wheel 441*b*2.

The output gear 443 is in the shape of a disc having a larger diameter than the worm wheels 441*b* and the intermediate gears 442. The output gear 443 also has formed therewith, on the circumferential surface thereof, a gear section including a plurality of teeth. Further, the output gear 443 also has formed therewith, in a central part thereof, a shaft-like section protruding toward the front and the rear. Further, the output gear 443 has a cam section 443*a* formed on the front face thereof and has a pressing piece 443*b* formed on the rear face thereof.

The cam section 443*a* is arc-shaped and is formed so as to protrude toward the front. The arc of the cam section 443*a* is formed so as to have a sufficient length for moving the pedal link 35 upward and holding the pedal link 35 in that state.

The pressing piece 443*b* is substantially V-shaped and is formed so as to protrude toward the rear on the rear face, which is the face positioned opposite from the face on which the cam section 443*a* is formed.

The output gear 443 configured as described above is provided so as to be rotatable on the central axis of the shaft-like section, as a result of the shaft-like section being inserted through recesses 41*d* and 42*d* formed in the unit base 41 and the unit cover 42, while the gear section thereof is engaged with the gear section of the second intermediate gear 442*b*.

The carrier switch 45 is a so-called push-type switch and includes a contact element 45*a*. The carrier switch 45 is arranged with the unit base 41 so as to be held slightly above the region where the output gear 443 is provided. When the contact element 45*a* is pressed, the carrier switch 45 goes into an ON state and so indicates to the dispensation controlling unit 110 by sending an ON signal thereto. On the contrary, when the contact element 45*a* is not pressed, the carrier switch 45 goes into an OFF state and so indicates to the dispensation controlling unit 110 by sending an OFF signal thereto.

The link levers 46 are configured so as to include a first link lever 461 and a second link lever 462. The first link lever 461 is formed by using, for example, a resin material and has a through hole 461*a*1 formed at a basal end 461*a* thereof. The first link lever 461 is formed in the shape of a hook where a distal end 461*b* is extended downward diagonally to the right from the basal end 461*a* and is then curved upward diagonally to the right. Further, a locking section 461*c* is provided at the basal end 461*a* of the first link lever 461. The locking section 461*c* is a plate-like elastic member that is elastically deformable and is extended downward from the left end of the basal end 461*a*.

The first link lever 461 configured as described above is provided so as to be rotatable on the central axis of a first link shaft 42*e* on the front side of the output gear 443, as a result of the first link shaft 42*e* provided for the unit cover 42 being inserted through the through hole 461*a*1 formed at the basal end 461*a*. In this situation, the first link lever 461 penetrates through a right opening (not illustrated) formed by the unit base 41 and the unit cover 42 so that the distal end 461*b* is positioned on the outside of the unit base 41 and the unit cover 42. Further, the posture of the first link lever 461 in a normal state is determined by the locking section 461*c* abutting against a left edge part 471 of the right opening.

The second link lever 462 is formed by using, for example, a resin material and has a through hole 462*a*1 formed at a basal end 462*a* thereof. The second link lever 462 is formed in the shape of a hook where a distal end 462*b* is extended downward diagonally to the left from the basal end 462*a* and is then curved upward diagonally to the left. Further, the distal end 462*b* of the second link lever 462 is formed to have a width in the front-and-back direction that is larger than that of the distal end 461*b* of the first link lever 461. Further, a locking section 462*c* is provided at the basal end 462*a* of the second link lever 462. The locking section 462*c* is a plate-like elastic member that is elastically deformable and is extended downward from the right end of the basal end 462*a*.

The second link lever 462 configured as described above is provided so as to be rotatable on the central axis of a second link shaft 42*f* on the front side of the output gear 443, as a result of the second link shaft 42*f* provided for the unit cover 42 being inserted through the through hole 462*a*1 formed at the basal end 462*a*. In this situation, the second link lever 462 penetrates through a left opening (not illustrated) formed by the unit base 41 and the unit cover 42 so that the distal end 462*b* is positioned on the outside of the unit base 41 and the unit cover 42. Further, the posture of the second link lever 462 in a normal state is determined by the locking section 462*c* abutting against a right edge part 472 of the left opening.

Figure 18:
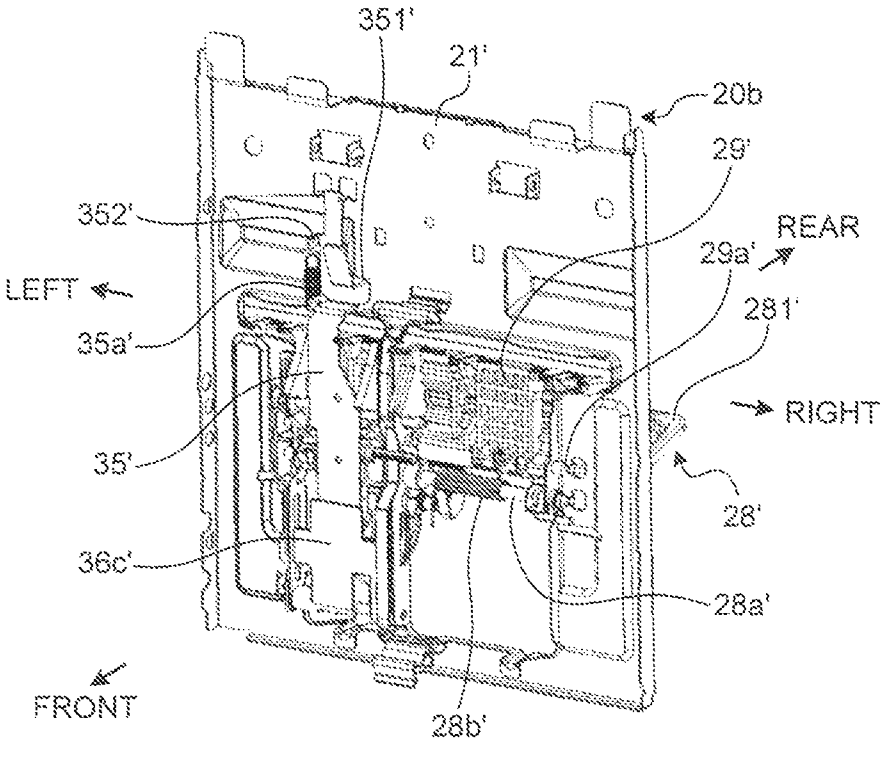
FIG. 18 is a perspective view from the right front side of a second product discharging device illustrated in FIGS. 2 to 4.
Figure 19:
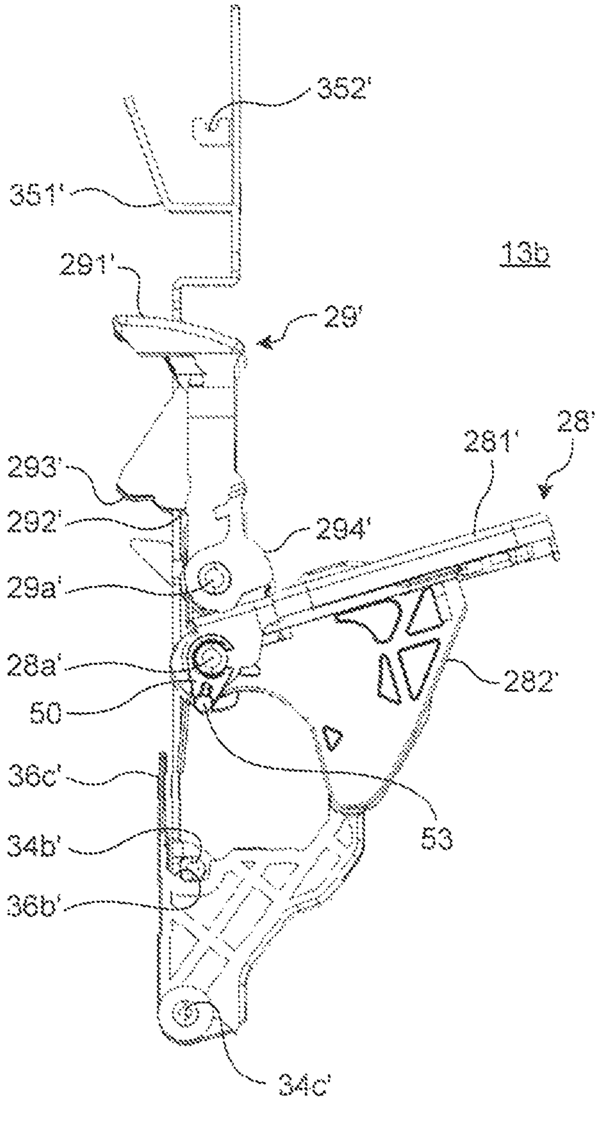
FIG. 19 is a schematic drawing for explaining a right side view of a relevant part of the second product discharging device illustrated in FIGS. 2 to 4 and 18.

FIG. 18 is a perspective view from the right front side of the second product discharging device 20*b* illustrated in FIGS. 2 to 4. FIG. 19 is a schematic drawing for explaining a right side view of a relevant part of the second product discharging device 20*b* illustrated in FIGS. 2 to 4 and 18. Most of the constituent elements of the second product discharging device 20*b* are the same as the constituent elements of the first product discharging device 20*a* and are reversed in the left-and-right direction because the constituent elements of the second product discharging device 20*b* are positioned differently in the front-and-back direction from the constituent elements of the first product discharging device 20*a*. Accordingly, to explain the second product discharging device 20*b*, illustration with drawings is omitted as appropriate, and some of the constituent elements of the second product discharging device 20*b* that are the same as the constituent elements of the first product discharging device 20*a* will briefly be explained, while ['] is added to the reference characters used for the first product discharging device 20*a*.

The second product discharging device 20*b* is applied to the second product storage passage 13*b* and is provided in a lower part of the second product storage passage 13*b*. The second product discharging device 20*b* includes a base 21' and functions so as to store products in the second product storage passage 13*b* in the standby state and so as to deliver corresponding products to the product chute 5 one by one in a driven state, by controlling behaviors of the products in the space formed thereby with a passage width regulating board 17 opposing thereto.

Figure 20:
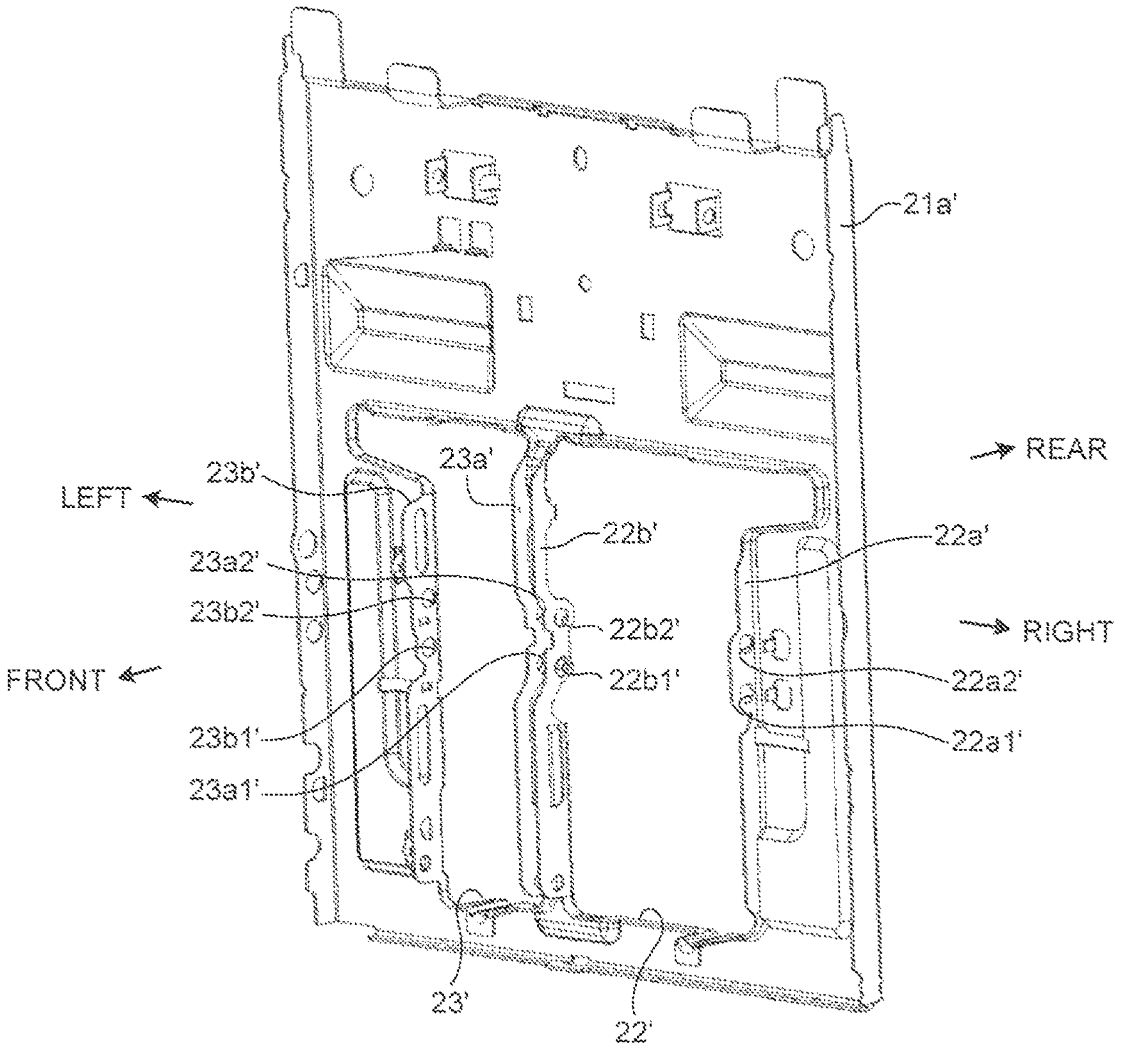
FIG. 20 is a perspective view of a base of the second product discharging device illustrated in FIG. 18.

As illustrated in FIG. 20, the base 21' is configured by applying cutting processing and bending processing to a steel plate. The base 21' is positioned so that a surface thereof faces the passage width regulating board 17. The two lateral parts of the base 21' are bent so as to form side walls 21*a'*. The base 21' also has a first insertion hole 22' and a second insertion hole 23' formed in a middle part thereof. The perimeters of the first insertion hole 22' and the second insertion hole 23' are bent so as to form flanges, similarly to the side walls 21*a'*.

The first insertion hole 22' and the second insertion hole 23' are formed so as to be positioned side by side in the left-and-right direction and so as to have the same dimension as each other in the up-and-down direction. To describe the first insertion hole 22' and the second insertion hole 23' more specifically, the first insertion hole 22' is positioned on the right side of the second insertion hole 23', and the width of the first insertion hole 22' in the left-and-right direction is larger than the width of the second insertion hole 23' in the left-and-right direction. Further, the first insertion hole 22' and the second insertion hole 23' are each a through opening (a recess that allows a lower pedal 28' and an upper pedal 29' (explained later) to retreat to the inside of the base 21'), and the two holes, as a whole, substantially form the shape of a rectangle. An upper end part of the first insertion hole 22' projects toward the right, whereas an upper end part of the second insertion hole 23' projects toward the left. A first right bearing piece **22*a*' is provided in a right edge part of the first insertion hole 22', whereas a first left bearing piece 22*b*' is provided in a left edge part of the first insertion hole 22'. Further, a second right bearing piece 23*a*' is provided in a right edge part of the second insertion hole 23', whereas a second left bearing piece 23*b*' is provided in a left edge part of the second insertion hole 23'. In this situation, the first left bearing piece 22*b*' and the second right bearing piece 23*a*' correspond to the flanges formed in the perimeters of the first insertion hole 22' and the second insertion hole 23'. Further, the first left bearing piece 22*b*' and the second right bearing piece 23*a*' are formed as shaft insertion flanges serving as U-shaped two leg pieces of a bearing holding section that is configured to hold a bearing section 24' (explained later) in a fitted manner and that is integrally formed with the base 21' so as to have a U-shaped (discontinuous) cross section. Further, the bearing holding section has a function of maintaining the strength of the base 21', even when the base 21' has formed therein the large through opening structured by the first insertion hole 22' and the second insertion hole 23'** that, as a whole, substantially form the shape of a rectangle.

Figure 21:
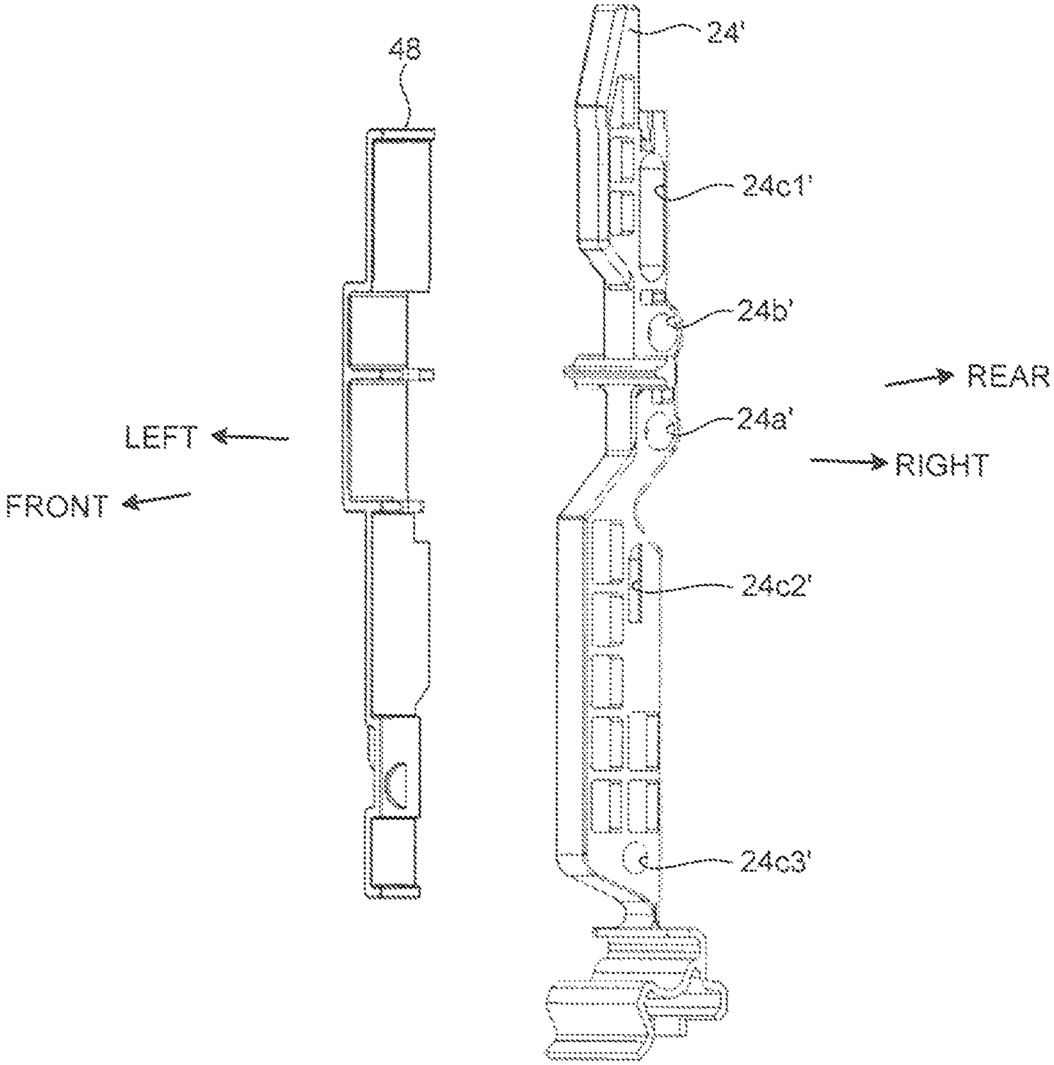
FIG. 21 is a perspective view of a bearing section and a guide attached to the base illustrated in FIG. 20.

The base 21' configured as described above has the bearing section 24' and a guide 48 attached thereto, as illustrated in FIG. 21. The bearing section 24' is formed by using a resin material and the like and is fitted between the first left bearing piece **22*b*' and the second right bearing piece 23*a*'. The guide 48 is formed by using a resin material and the like, similarly to the bearing section 24'. The guide 48 is fitted and attached to the base 21' so as to be positioned adjacent to the second left bearing piece 23*b*'**.

The base 21' is provided with a first swing support shaft **28*a*' and a second swing support shaft 29*a*'. The first swing support shaft 28*a*' is a shaft-like member that is installed to span across through the through holes 22*a*1', 22*b*1', 23*a*1', 23*b*1', and 24*a*' formed in the first right bearing piece 22*a*', the first left bearing piece 22*b*', the second right bearing piece 23*a*', the second left bearing piece 23*b*', and the bearing section 24', in such a manner that the first swing support shaft 28*a*' extends substantially in the horizontal direction. The first swing support shaft 28*a*' supports the lower pedal 28'** in a middle part thereof.

Further, a second sold-out link 50 is provided at the right end of the first swing support shaft **28*a*'. As illustrated in FIG. 11, the second sold-out link 50 is configured so as to include a second sold-out base section 51, a second sold-out abutting section 52, and a second sold-out pressing section 53. The second sold-out base section 51 is formed by, for example, connecting lower ends of two disc-shaped sections 511 and 512 that are each C-shaped to each other with a connecting section 513. The disc-shaped sections 511 and 512 have formed therein through holes 511*a* and 512*a*, respectively, through which the right end of the first swing support shaft 28*a*' penetrates. The second sold-out abutting section 52 extends toward the left side from a front part of the disc-shaped section 512, which is the one positioned on the left side in the second sold-out base section 51. The second sold-out abutting section 52 is positioned farther to the left than the first sold-out abutting section 32 included in the first sold-out link 30 so that no interference is caused therebetween. The second sold-out pressing section 53 is formed so as to protrude toward the right side from a lower part of the disc-shaped section 511, which is the one positioned on the right side in the second sold-out base section 51. The through holes 511*a* and 512*a* formed in the second sold-out base section 51 are arranged to be larger than the first swing support shaft 28*a*', so that the second sold-out link 50 is able to move freely with respect to the first swing support shaft 28*a*'**.

The second swing support shaft **29*a*' is a shaft-like member that is installed to span across through the through holes 22*a*2', 22*b*2', 23*a*2', 23*b*2', and 24*b*' formed in the first right bearing piece 22*a*', the first left bearing piece 22*b*', the second right bearing piece 23*a*', the second left bearing piece 23*b*', and the bearing section 24', in such a manner that the second swing support shaft 29*a*' extends substantially in the horizontal direction, in a region above the first swing support shaft 28*a*'. The second swing support shaft 29*a*' supports the upper pedal 29'** in a middle part thereof.

The lower pedal 28' is a plate-like member and is provided so as to be swingable on the central axis of the first swing support shaft **28*a*', as a result of having the first swing support shaft 28*a*'** inserted through the basal end thereof.

The distal end of the lower pedal 28' extends outward in the radial direction of the first swing support shaft **28*a*'. When swinging around on the central axis of the first swing support shaft 28*a*', the distal end of the lower pedal 28' is able to advance into and retreat from the second product storage passage 13*b* via the first insertion hole 22' and the second insertion hole 23'. In other words, the lower pedal 28' is configured so as to be swingable to advance into and retreat from the second product storage passage 13*b***.

A lower pedal spring **28*b*' is interposed between the lower pedal 28' and the base 21'. The lower pedal spring 28*b*' is configured to urge the lower pedal 28' at all times in such a direction that the lower pedal 28' advances into the second product storage passage 13*b*. More specifically, as illustrated in FIG. 19, the lower pedal spring 28*b*' is configured to arrange the lower pedal 28' to be in a standby posture (which hereinafter may be referred to as "standby-without-product posture") where the distal end of the lower pedal 28' is positioned higher than the first swing support shaft 28*a*'. Further, when a product is placed on the top face of the lower pedal 28', the lower pedal spring 28*b*' is configured to arrange the lower pedal 28' in another standby posture (which hereinafter may be referred to as "standby-with-product posture") where the distal end of the lower pedal 28' is positioned at the same height as the first swing support shaft 28*a*'**.

In this configuration, when the lower pedal 28' is in the standby-without-product posture, the distal end of the lower pedal 28' is positioned higher than when the lower pedal 28' is in the standby-with-product posture.

Further, when the lower pedal 28' is in the standby-without-product posture as illustrated in FIG. 12, as a result of the basal end of the lower pedal 28' abutting against the second sold-out abutting section 52 of the second sold-out link 50, the second sold-out link 50 rotates by using the first swing support shaft 28*a*' as the rotation center, which causes the second sold-out pressing section 53 to press the contact element 27*a* of the second sold-out detection switch 27. Accordingly, the second sold-out detection switch 27 goes into the ON state, as a result of the contact element 27*a* being pressed and being displaced rearward against the urging force of the spring and thus sends the ON signal to the dispensation controlling unit 110.

When the lower pedal 28' is in the standby-with-product posture, in contrast, as a result of the basal end of the lower pedal 28' being positioned apart from the second sold-out abutting section 52 of the second sold-out link 50, the second sold-out link 50 goes into a free state. Accordingly, the second sold-out detection switch 27 goes into the OFF state, as a result of the contact element 27*a* being urged by the spring so as to be in an upright posture, and thus sends the OFF signal to the dispensation controlling unit 110. In other words, the second sold-out link 50 that is in the free state rotates by using the first swing support shaft 28*a*' as the rotation center, as a result of the second sold-out pressing section 53 being pressed by the contact element 27*a*.

The lower pedal 28' described above includes a plate-like pedal main body 281' and a pair of guiding sections 282'. The pair of guiding sections 282 is provided on the rear surface side of the pedal main body 281'. The guiding sections 282' are each a plate-like member extending in the up-and-down direction and are formed so as to oppose each other. A guiding groove (not illustrated) is formed on each of the opposing surfaces of the guiding sections 282'.

The guiding groove includes: a fitted section which is in the lowest position when the lower pedal 28' is in an advance position where the lower pedal 28' has advanced, to the maximum, into the second product storage passage 13*b* and into which a pedal operation shaft (not illustrated) of a rotation stopper 36' (explained later) is fitted; an abutted section which is in the highest position when the lower pedal 28' is in a retreat position where the lower pedal 28' has retreated, to the maximum, from the second product storage passage 13*b* and against which the pedal operation shaft of the rotation stopper 36' abuts; and a first guiding section and a second guiding section that connect the fitted section and the abutted section together so as to be contiguous.

The first guiding section is formed in the guiding section 282' in such a manner that, when the lower pedal 28' has advanced, to the maximum, into the second product storage passage 13*b* (i.e., the advance position), the first guiding section is sloped diagonally upward so as to extend from the fitted section to be positioned away from the base 21', and is then sloped diagonally upward so as to approach the base 21' and to reach the abutted section.

The second guiding section is formed in the guiding section 282' in such a manner that, when the lower pedal 28' has advanced, to the maximum, into the second product storage passage 13*b* (i.e., the advance position), the second guiding section is sloped diagonally downward so as to extend from the abutted section to be positioned away from the base 21' and to reach the fitted section.

The length of the lower pedal 28' from the first swing support shaft 28*a*' outward in the radial direction is arranged so as to ensure that a gap smaller than the maximum width of a product having a small maximum width is formed between the lower pedal 28' and the passage width regulating board 17, when the lower pedal 28' has advanced, to the maximum, into the second product storage passage 13*b* (i.e., the advance position).

The upper pedal 29' is a plate-like member and is arranged with the base 21' so as to be swingable on the central axis of the second swing support shaft 29*a*', as a result of having the second swing support shaft 29*a*' inserted through the basal end thereof.

The distal end of the upper pedal 29' extends outward in the radial direction of the second swing support shaft 29*a*'. When swinging around on the central axis of the second swing support shaft 29*a*', the distal end of the upper pedal 29' is able to advance into and retreat from the second product storage passage 13*b* via the first insertion hole 22' and the second insertion hole 23'. In other words, the upper pedal 29' is configured so as to be swingable to advance into and retreat from the second product storage passage 13*b*.

An upper pedal spring (not illustrated) is interposed between the upper pedal 29' and the base 21'. The upper pedal spring is configured to urge the upper pedal 29' at all times in such a direction that the upper pedal 29' retreats from the second product storage passage 13*b*.

The upper pedal 29' is provided with a pressed sloped face 291', a recess 292', a stopper abutting section 293', and a projection 294'. The pressed sloped face 291' is a curved sloped face that is provided at the distal end of the upper pedal 29' and that is gradually sloped downward toward the second product storage passage 13*b* when the upper pedal 29' is caused to retreat from the second product storage passage 13*b*. The recess 292' is one strip of recessed section that is provided on the rear surface side of the upper pedal 29' and that extends substantially in the horizontal direction so as to have openings on the two lateral faces of the upper pedal 29'. The stopper abutting section 293' is a section against which a stopper pin (explained later) abuts and is formed to be sloped above the recess 292' on the rear surface of the upper pedal 29'.

The projection 294' is provided at the basal end of the upper pedal 29' so as to project toward the second product storage passage 13*b*.

The upper pedal 29' is urged by the urging force of the upper pedal spring so as to retreat from the second product storage passage 13*b*. However, an initial position is set to a state in which the upper pedal 29' has retreated from the second product storage passage 13*b*, as a result of the stopper pin abutting against the recess 292'.

The upper pedal 29' configured as described above is in the state of leaning forward with respect to a vertical plane passing through the second swing support shaft 29*a*', while in the state of having advanced, to the maximum, into the second product storage passage 13*b* (i.e., the advance position). Further, the length of the upper pedal 29' from the second swing support shaft 29*a*' outward in the radial direction is arranged so as to ensure that a gap smaller than the maximum width of a product having a small maximum width is formed between the upper pedal 29' and the passage width regulating board 17, when the upper pedal 29' is in the leaning-forward state described above.

With the base 21' described above, a stopper pin (not illustrated), a pedal stopper pin 34*b*', and a stopper shaft 34*c*' are installed to span across between the bearing section 24' and the second left bearing piece 23*b*'.

The stopper pin is a shaft-like member that is provided between the bearing section 24' and the second left bearing piece 23*b*' so as to extend substantially in the horizontal direction. The stopper pin is connected to the pedal link 35' and is capable of moving in up-and-down directions, in conjunction with moves of the pedal link 35' in up-and-down directions. Further, the stopper pin abuts against the recess 292' of the upper pedal 29' placed in the initial position.

The pedal stopper pin 34*b*' is a shaft-like member provided between the bearing section 24' and the second left bearing piece 23*b*' so as to extend substantially in the horizontal direction. The pedal stopper pin 34*b*' is connected to the pedal link 35' and is capable of moving in up-and-down directions, in conjunction with moves of the pedal link 35' in up-and-down directions.

The stopper shaft 34*c*' is a shaft-like member that is provided between the bearing section 24' and the second left bearing piece 23*b*' so as to extend substantially in the horizontal direction. The stopper shaft 34*c*' supports, in a middle part thereof, a rotation stopper 36'.

The rotation stopper 36' is provided between the bearing section 24' and the second left bearing piece 23*b*', in such a manner that the stopper shaft 34*c*' is inserted through an insertion hole formed at the basal end thereof and so as to be swingable on the central axis of the stopper shaft 34*c*'.

The distal end of the rotation stopper 36' extends outward in the radial direction of the stopper shaft 34*c*' and is able to advance into and retreat from the second product storage passage 13*b* via the second insertion hole 23', when swinging around on the central axis of the stopper shaft 34*c*'.

The rotation stopper 36' includes a pedal operation shaft 361' (see FIG. 4) by having the pedal operation shaft 361' penetrate through the through hole (not illustrated) formed at the distal end thereof. The pedal operation shaft 361' is a shaft-like member provided to extend substantially in the horizontal direction, and the two ends thereof are fitted in the guiding grooves formed in the lower pedal 28' described above.

A pedal operation spring (not illustrated) is interposed between the rotation stopper 36' and the base 21'. The pedal operation spring urges the rotation stopper 36' at all times in such a direction that the rotation stopper 36' advances into the second product storage passage 13*b*.

The rotation stopper 36' is urged by the pedal operation spring in such a direction that the rotation stopper 36' advances into the second product storage passage 13*b*. As a result of the pedal stopper pin 34*b*' entering a depression 36*b*' of the rotation stopper 36', so that the rotation stopper 36' abuts against the pedal stopper pin 34*b*', the move of the rotation stopper 36' in the retreating direction is restrained. The initial position of the rotation stopper 36' is set in the state where the rotation stopper 36' has advanced into the second product storage passage 13*b*. Further, because the lower pedal 28' is urged by the lower pedal spring 28*b*', the initial position of the rotation stopper 36' is set so that the two ends of the pedal operation shaft 361' are positioned at the fitted section of the guiding grooves, whereas the lower pedal 28' has advanced into the second product storage passage 13*b*.

Further, the rotation stopper 36' is provided with a plate-like blindfold section 36*c*' that extends upward on the rear surface side thereof, i.e., on the rear surface side of the depression 36*b*'. The blindfold section 36*c*' is arranged to cover such a part of the pedal stopper pin 34*b*' that is positioned opposite from the second product storage passage 13*b*. More specifically, the blindfold section 36*c*' is arranged to cover such a part of the pedal stopper pin 34*b*' moving in the up-and-down directions that is positioned opposite from the second product storage passage 13*b*.

The pedal link 35' described above is a longitudinal plate-like member that extends in an up-and-down direction, and an upper part thereof is bent toward the rear and is then extended upward. The upper part of the pedal link 35' is provided with an abutting piece 351' that is extended toward the front and is then extended diagonally upward. The upper part of the pedal link 35' is also provided with a locking section 352' that locks a link spring 35*a*'. The link spring 35*a*' is interposed between the pedal link 35' and the base 21' and is configured to urge the pedal link 35' downward at all times.

In the state where the pedal link 35' is positioned in the lower position by being urged by the link spring 35*a*', the recess 292' of the upper pedal 29' positioned in the retreat position abuts against the stopper pin.

Furthermore, the rotation stopper 36' positioned in the advance position abuts against the pedal stopper pin 34*b*', so as to restrain the retreating move of the rotation stopper 36'. Further, the pedal operation shaft 361' of the rotation stopper 36' positioned in the advance position is fitted in the fitted section of the lower pedal 28', and the retreating move of the lower pedal 28' positioned in the advance position is thereby restrained.

In contrast, in the state where the pedal link 35' is positioned in the upper position against the urging force of the link spring 35*a*', as a result of the stopper abutting section 293' of the upper pedal 29' abutting against the stopper pin, the retreating move of the upper pedal 29' is restrained, so that the upper pedal 29' is positioned in the advance position as a result of making an advancing move against the urging force of the upper pedal spring.

Further, because the restraining for the retreating move imposed by the pedal stopper pin 34*b*' is cancelled, the rotation stopper 36' is released from the restraining for the retreating move centered on the stopper shaft 34*c*'. In this situation, the weight of the product abutting against the lower pedal 28' that is maintained in the advance position by the rotation stopper 36' is applied to the rotation stopper 36'. Accordingly, as a result of the rotation stopper 36' being released from the restraining for the retreating move, the rotation stopper 36' starts a retreating move. As the retreating move of the rotation stopper 36' is started, because the pedal operation shaft 361' comes out of the fitted section 283*a* of the lower pedal 28', the lower pedal 28' is permitted to make a retreating move centered on the first swing support shaft 28*a*' and thus makes the retreating move due to the weight of the product, against the elastic urging force of the lower pedal spring 28*b*'.

Further, when the lower pedal 28' makes the retreating move in this manner, as a result of the basal end of the lower pedal 28' being positioned apart from the second sold-out abutting section 52 of the second sold-out link 50, the second sold-out link 50 goes into a free state. Accordingly, because the contact element 27*a* of the second sold-out detection switch 27 is in an upright posture by being urged by the spring, the OFF state is maintained. In other words, also when the lower pedal 28' has retreated, the second sold-out link 50 does not press the contact element 27*a* of the second sold-out detection switch 27, similarly to when the lower pedal 28' is in the standby-with-product posture.

The product dispensing device 20 is structured by combining together the first product discharging device 20*a* and the second product discharging device 20*b* configured as described above and arranged back to back with each other, while using the harness guide 25 as a guiding member. Further, in that situation, the distal end of the first link lever 461 included in the driving unit 40 is positioned in a region beneath the abutting piece 351 of the pedal link 35, whereas the distal end of the second link lever 462 is positioned in a region beneath the abutting piece 351' of the pedal link 35'.

Figure 22:
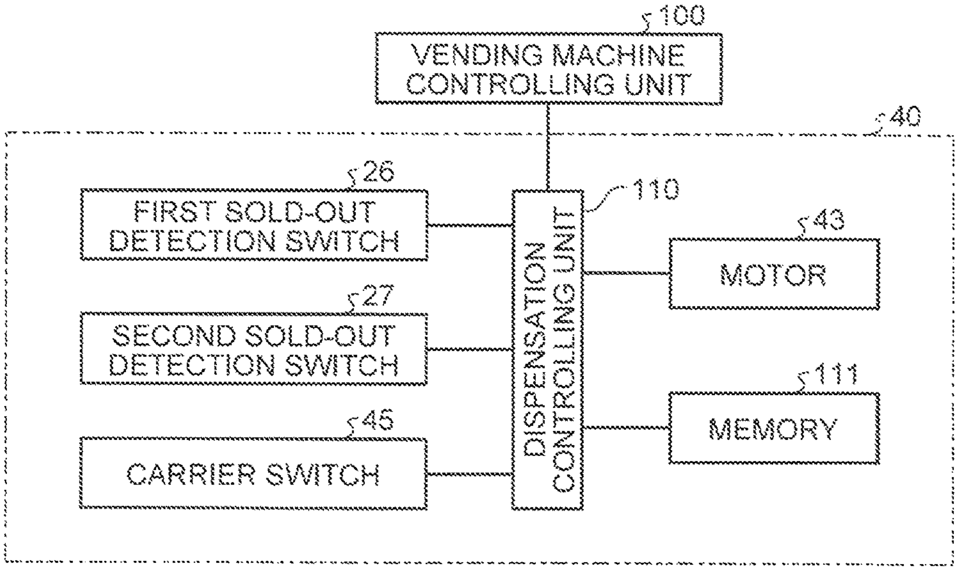
FIG. 22 is a block diagram of a controlling system characterizing a product dispensing device.

FIG. 22 is a block diagram of a controlling system characterizing the product dispensing device 20 described above. As illustrated in FIG. 22, the product dispensing device 20 includes the dispensation controlling unit 110. The dispensation controlling unit 110 is configured to control, in an integrating manner, operations of the product dispensing device 20 according to a computer program and data stored in a memory 111. The dispensation controlling unit 110 is able to communicate with a vending machine controlling unit 100 that integrally controls sales operations of the vending machine.

The product dispensing device 20 configured as described above is arranged as follows in the standby state.

In the driving unit 40 provided in the first product discharging device 20*a*, the cam section 443*a* and the pressing piece 443*b* included in the output gear 443 are in the highest position, while the pressing piece 443*b* is pressing the contact element 45*a* of the carrier switch 45. In that situation, the carrier switch 45 is in an ON state. In the standby state like this, the distal end 461*b* of the first link lever 461 included in the driving unit 40 is positioned apart downward from the abutting piece 351 of the pedal link 35, whereas the distal end 462*b* of the second link lever 462 is positioned apart downward from the abutting piece 351' of the pedal link 35'.

Figure 23:
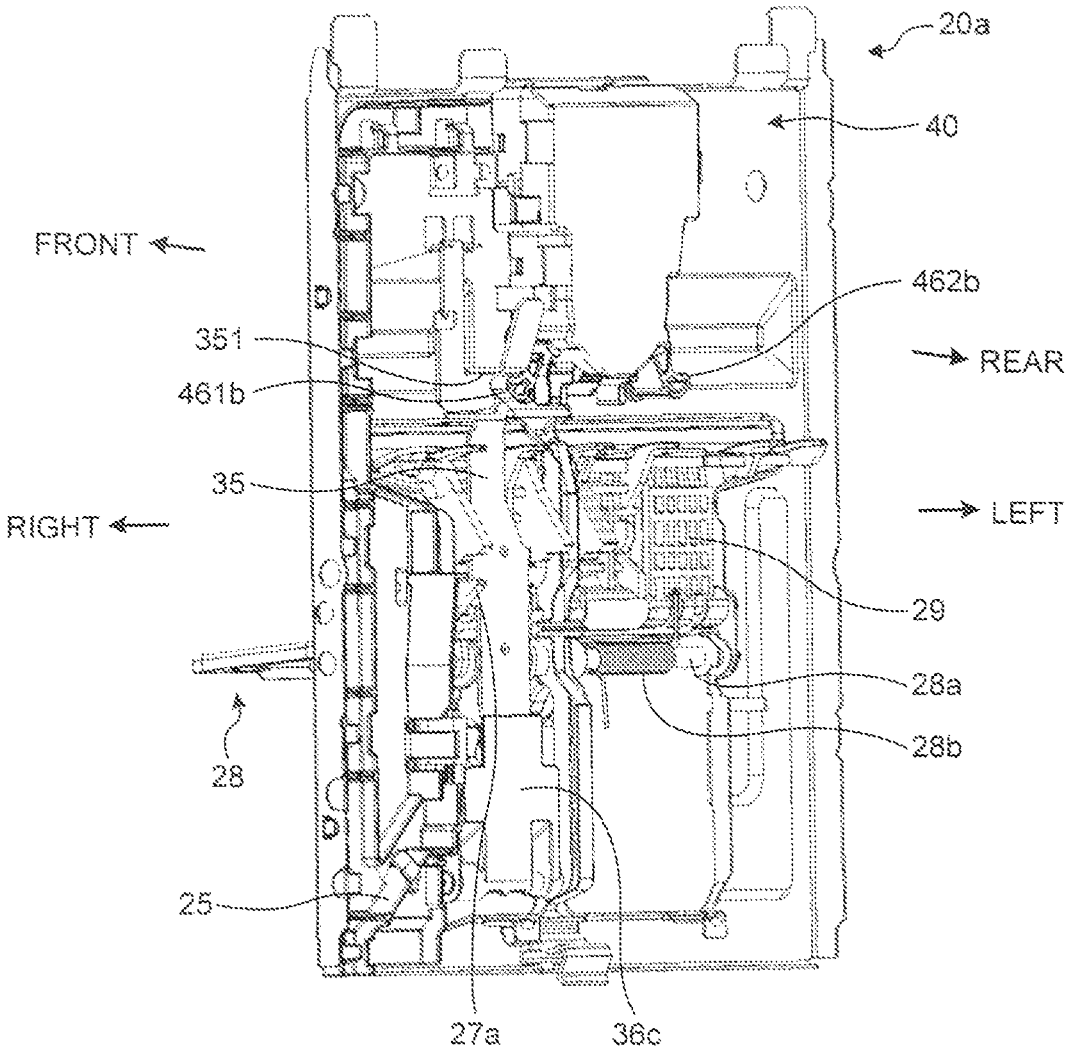
FIG. 23 is a perspective view from the right rear side of the first product discharging device.

For this reason, in the first product discharging device 20*a*, as illustrated in FIG. 5 or FIG. 23, the pedal link 35 is in the state of being in the lower position. Further, because a product is placed on the top face of the lower pedal 28 as a result of products having been input in the first product storage passage 13*a*, the lower pedal 28 is in the standby-with-product posture. Also, the upper pedal 29 is in the posture of having retreated from the first product storage passage 13*a*. As described herein, because the lower pedal 28 is in the standby-with-product posture, the first sold-out detection switch 26 is in the OFF state where the contact element 26*a* is in the upright posture.

Further, in the second product discharging device 20*b*, the pedal link 35' is in the state of being in the lower position. Further, the lower pedal 28' is in the standby-with-product posture. Also, the upper pedal 29' is in the posture of having retreated from the second product storage passage 13*b*. As described herein, because the lower pedal 28' is in the standby-with-product posture, the second sold-out detection switch 27 is in the OFF state where the contact element 27*a* is in the upright posture.

Figure 24:
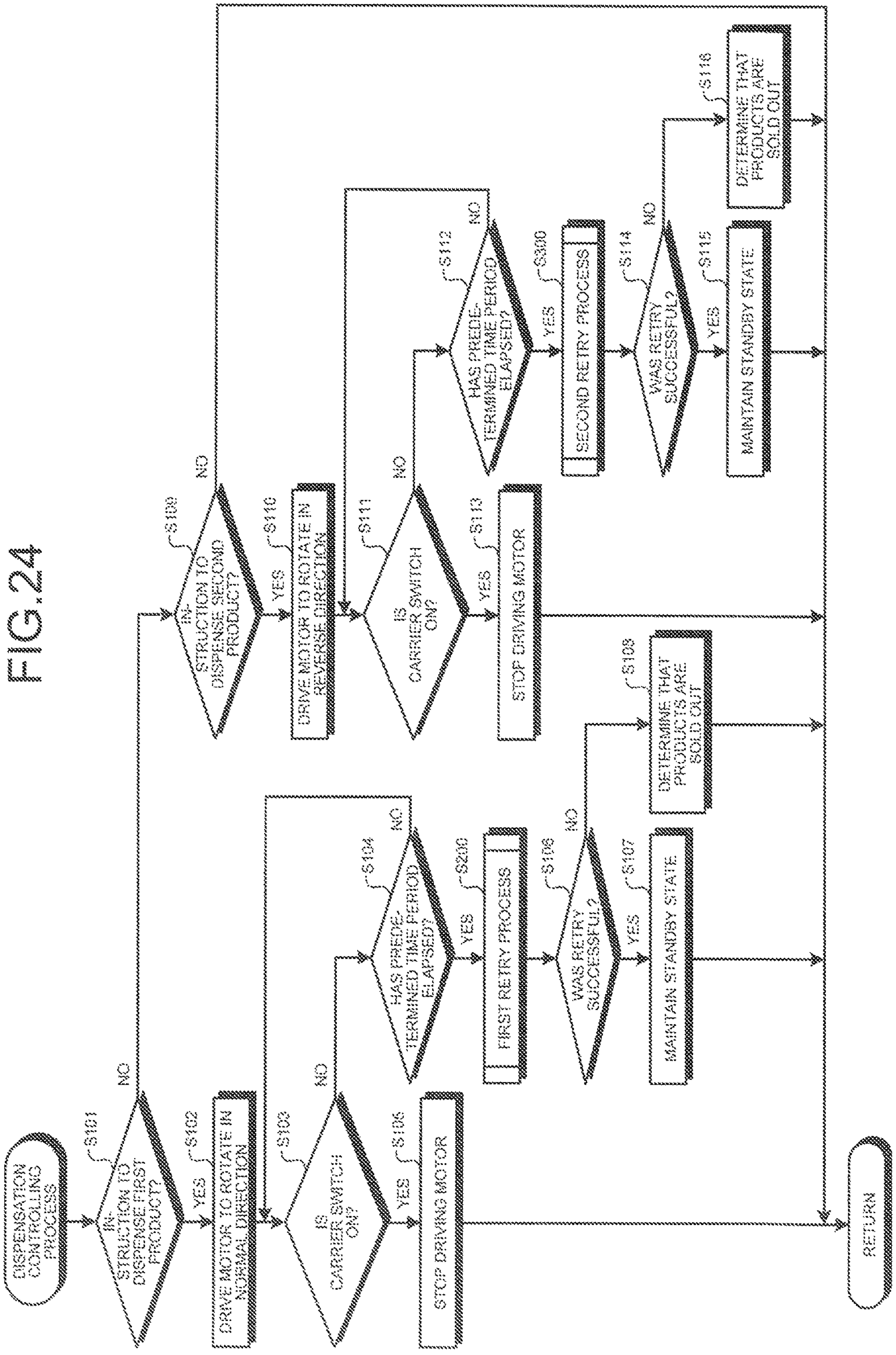
FIG. 24 is a flowchart of specifics of a dispensation controlling process performed by a dispensation controlling unit.

FIG. 24 is a flowchart of specifics of a dispensation controlling process performed by the dispensation controlling unit 110 described above. Operations of the product dispensing device 20 will be explained, while the dispensation controlling process is explained. In the following explanations, the products stored in the first product storage passage 13*a* may be referred to as "first products", whereas the products stored in the second product storage passage 13*b* may be referred to as "second products".

In the dispensation controlling process, when having received a discharge instruction for a first product from the vending machine controlling unit 100 (step S101: Yes), the dispensation controlling unit 110 drives the motor 43 to rotate in the normal direction (step S102).

When the motor 43 is driven to rotate in the normal direction in this manner, the output gear 443 to which the driving force of the motor 43 is transmitted via the worm gears 441 and the intermediate gears 442 rotates clockwise as viewed from the front.

When the output gear 443 rotates clockwise as viewed from the front, the pressing piece 443*b* of the output gear 443 moves away from the contact element 45*a* of the carrier switch 45. As a result, the contact element 45*a* of the carrier switch 45 is released from the pressed state and goes into the OFF state.

Figure 25:
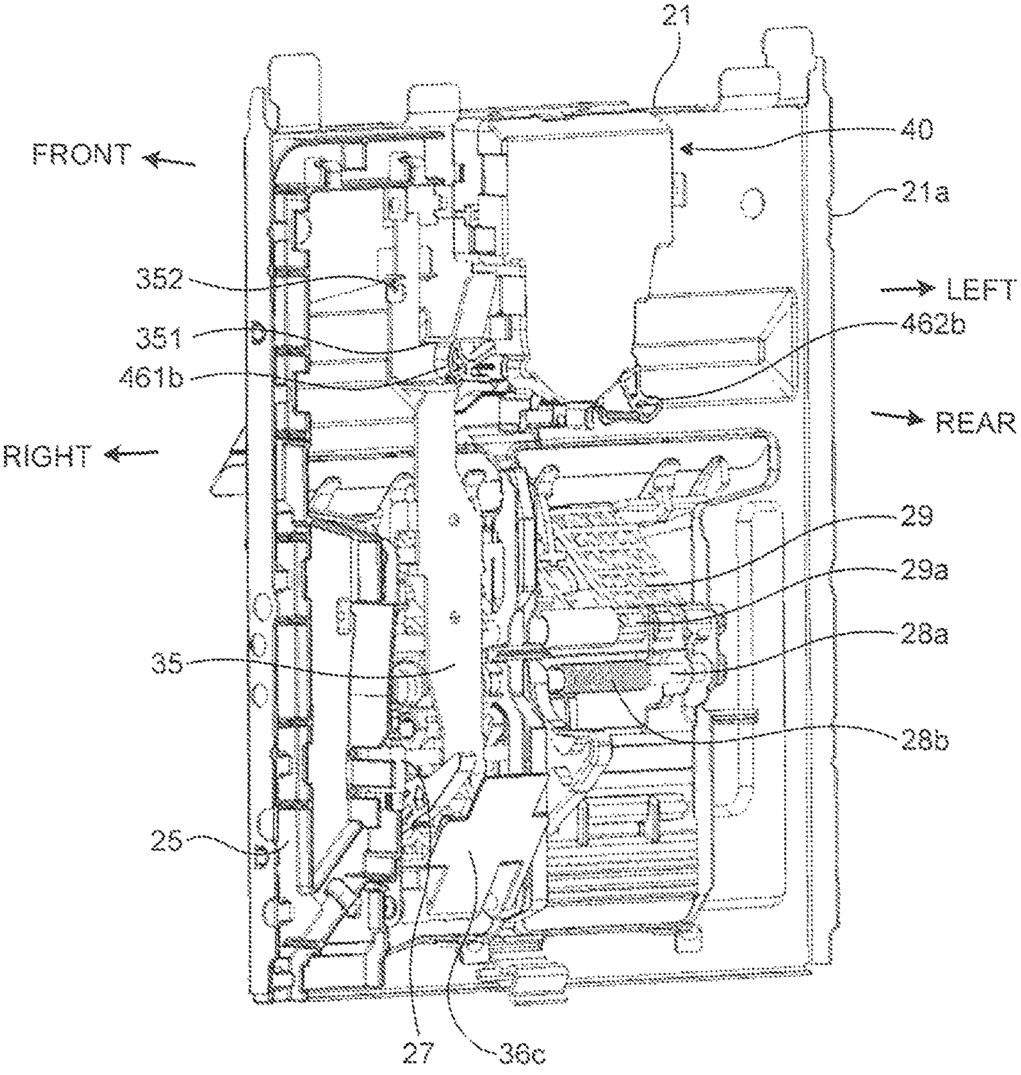
FIG. 25 is a perspective view from the right rear side of the first product discharging device.
Figure 26:
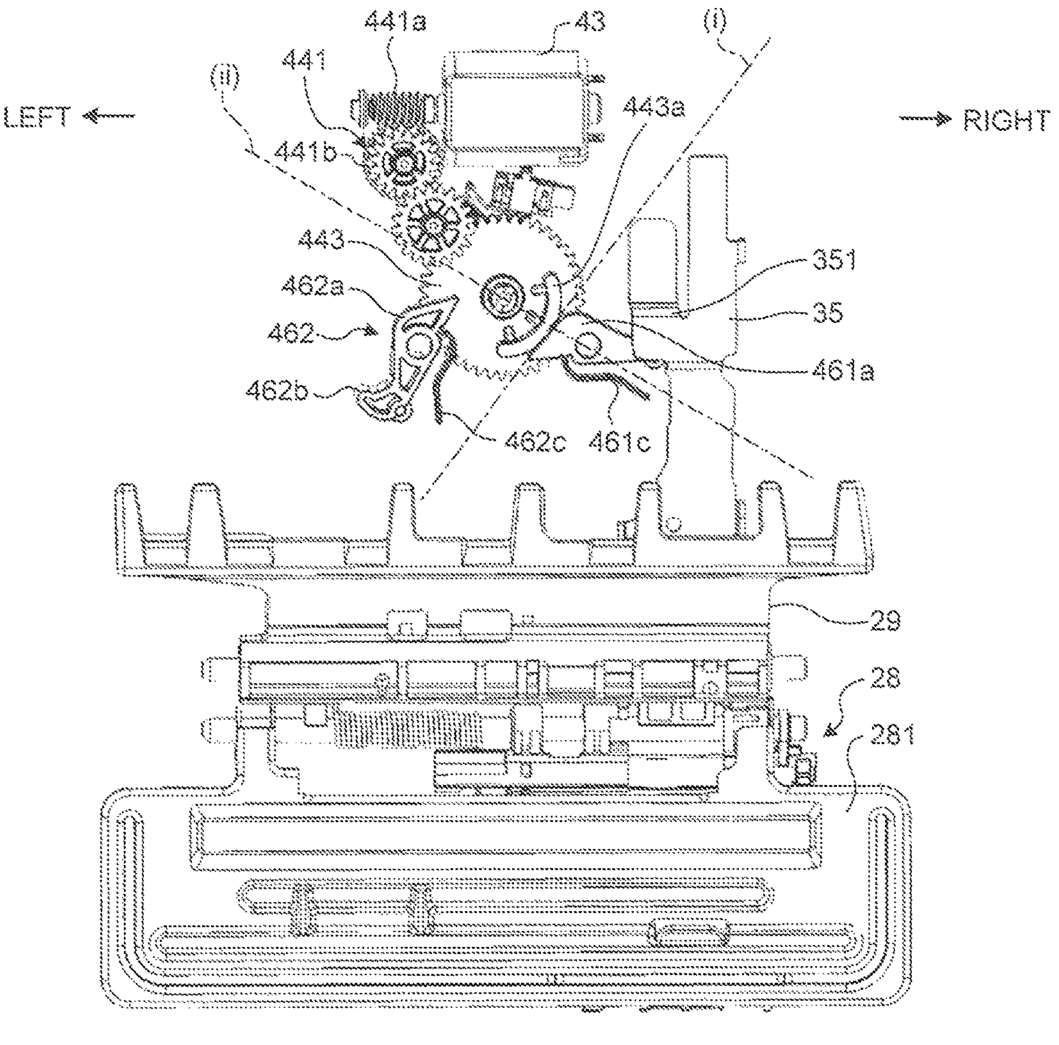
FIG. 26 is a drawing for explaining a front view of operations performed by a relevant part of the driving unit.
Figure 27:
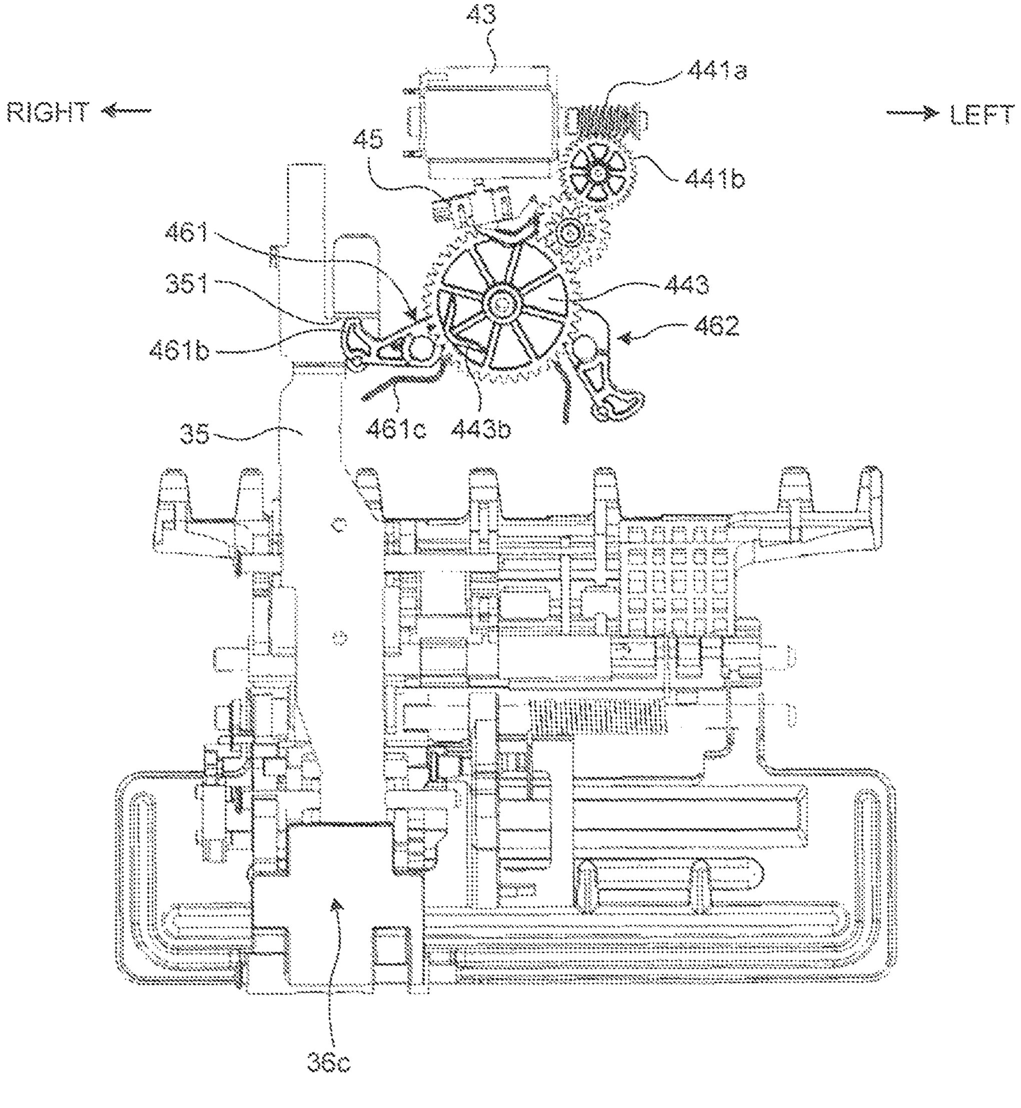
FIG. 27 is a drawing for explaining a rear straight-on view of operations performed by the relevant part of the driving unit.

Due to the rotation of the output gear 443, when the cam section 443*a* abuts against the basal end 461*a* of the first link lever 461 from above, the first link lever 461 rotates counterclockwise as viewed from the front. When the first link lever 461 rotates counterclockwise, it means that the distal end 461*b* moves upward. As a result of the upward move of the distal end 461*b*, as illustrated in FIGS. 25 to 27, the distal end 461*b* abuts against the abutting piece 351 of the pedal link 35 and is able to move the pedal link 35 upward by a predetermined distance against the urging force of the link spring 35*a*. In addition, while the cam section 443*a* is in sliding contact with the basal end 461*a*, it is possible to maintain the state where the pedal link 35 has been moved upward by the predetermined distance.

In that situation, while being in sliding contact with the cam section 443*a*, the first link lever 461 is adjusted in such a manner that plane (i) including the part that is in sliding contact with the cam section 443*a* is substantially orthogonal to plane (ii) including the central axis thereof (i.e., the central axis of the first link shaft 42*e*) and the central axis of the output gear 443.

In conjunction with the upward move of the pedal link 35, the stopper pin 34*a* moves upward from the lower ends of the stopper pin insertion holes 23*b*3 and 24*c*1, and also, the pedal stopper pin 34*b* moves upward from the lower ends of the pedal stopper pin supporting grooves 23*b*4 and 24*c*2.

In this situation, because the stopper pin 34*a* moves upward while abutting against the edge wall of the recess 292 of the upper pedal 29, the upper pedal 29 makes an advancing move from the initial position against the urging force of the upper pedal spring. This advancing move of the upper pedal 29 is made as a result of the stopper pin 34*a* moving upward. Further, at the point in time when the stopper pin 34*a* reaches the upper ends of the stopper pin insertion holes 23*b*3 and 24*c*1, the stopper pin 34*a* abuts against the stopper abutting section 293 and restrains the retreating move of the upper pedal 29.

Further, the upper pedal 29 that has made the advancing move now abuts against the first product in the second lowest position (hereinafter, "next product") and restrains the downward move of the next product.

Further, because the weight of the product abutting against the lower pedal 28 that is maintained in the advance position is applied to the rotation stopper 36, the rotation stopper 36 starts a retreating move as a result of the restraining for the retreating move being cancelled by the upward move of the pedal stopper pin 34*b*.

When the rotation stopper 36 starts the retreating move in this manner, the pedal operation shaft 361 comes out of the fitted section 283*a*, so that the lower pedal 28 starts a retreating move against the urging force of the lower pedal spring 28*b*, due to the self-weight of the product. The pedal operation shaft 361 of the rotation stopper 36 that came out of the fitted section 283*a* moves along the first guiding section 283*b* toward the position where the first guiding section 283*b* intersects the second guiding section 283*c*.

After that, the lower pedal 28 makes a retreating move due to the self-weight of the product in the lowest position so that the product in the lowest position is permitted to move downward and is discharged downward (see FIG. 8). The discharged product is guided to the product discharge outlet 3*c* via the product chute 5 and further becomes accessible via the product access outlet 2*a*.

In this situation, when the product in the lowest position has passed by the lower pedal 28, the lower pedal 28 moves toward the advance position due to the elastic urging force of the lower pedal spring 28*b*. In addition, the rotation stopper 36 also moves toward the advance position due to the elastic urging force of the pedal operation spring. When the lower pedal 28 and the rotation stopper 36 move toward the advance positions, the pedal operation shaft 361 that has been maintained in the position where the first guiding section 283*b* intersects the second guiding section 283*c* moves toward the fitted section 283*a* along the second guiding section 283*c*, so that the lower pedal 28 and the rotation stopper 36 return to the advance positions.

During this period, the pedal link 35 moves upward, while the stopper pin 34*a* is positioned at the upper ends of the stopper pin insertion holes 23*b*3 and 24*c*1, whereas the pedal stopper pin 34*b* is positioned at the upper ends of the pedal stopper pin supporting grooves 23*b*4 and 24*c*2.

After that, when the abutment of the cam section 443*a* and the basal end 462*a* against each other is cancelled due to the rotation of the output gear 443, the pedal link 35 moves downward by being urged by the link spring 35*a*.

As a result of the downward move of the pedal link 35, the stopper pin 34*a* moves downward from the upper ends of the stopper pin insertion holes 23*b*3 and 24*c*1, whereas the pedal stopper pin 34*b* moves downward from the upper ends of the pedal stopper pin supporting grooves 23*b*4 and 24*c*2.

When the pedal stopper pin 34*b* has moved to the lower ends of the pedal stopper pin supporting grooves 23*b*4 and 24*c*2, the pedal stopper pin 34*b* abuts against the depression 36*b* positioned on the rear surface side of the rotation stopper 36 that has returned to the advance position. As a result, because the move in the retreating direction is restrained, the lower pedal 28 returns to the standby-without-product posture by advancing into the first product storage passage 13*a* due to the urging force of the lower pedal spring 28*b*.

In contrast, the upper pedal 29 is urged by the upper pedal spring and makes a retreating move in conjunction with the downward move of the stopper pin 34*a*. As a result, the next product is permitted to move downward so as to subsequently abut against the lower pedal 28 which has advanced, and thereby the downward move thereof is restrained. Further, the lower pedal 28 returns to the standby state by shifting into the standby-with-product posture.

In the driving unit 40, due to the clockwise rotation of the output gear 443 as viewed from the front, the cam section 443*a* subsequently abuts against the basal end 462*a* of the second link lever 462. In that situation, the rotation of the second link lever 462 on the central axis thereof is restrained by the locking section 462*c* abutting against the right edge part 472 of the left opening. Consequently, the locking section 462*c* is elastically deformed in such a manner that the basal end 462*a* is permitted to approach the locking section 462*c*, so that the moving of the cam section 443*a* due to the rotation of the output gear 443 is not hindered.

Further, when the cam section 443*a* subsequently returns to the standby state position due to the rotation of the output gear 443, the pressing piece 443*b* presses the contact element 45*a* of the carrier switch 45, so that the carrier switch 45 goes into the ON state. In this situation, immediately after the pressing piece 443*b* presses the contact element 45*a* of the carrier switch 45, the cam section 443*a* comes off the basal end 462*a* of the second link lever 462, so that the second link lever 462 is returned to the original state by the locking section 462*c*.

When the motor 43 is driven to rotate in the normal direction at step S102 as described above, the dispensation controlling unit 110 monitors whether or not the carrier switch 45 goes into the ON state within a predetermined time period (steps S103 and S104). In other words, the dispensation controlling unit 110 monitors whether or not the output gear 443 makes one turn within the predetermined time period.

As a result, if the carrier switch 45 goes into the ON state within the predetermined time period (step S103: Yes; step S104: No), the dispensation controlling unit 110 stops the normal-direction driving of the motor 43 (step S105), causes the procedure to return to the start, and ends the process in the current session. With these arrangements, it is possible to deliver, in an excellent manner, the first product for which the discharge instruction was issued, as described above.

On the contrary, if the carrier switch 45 has not gone into the ON state within the predetermined time period, i.e., if no ON signal is issued from the carrier switch 45 within the predetermined time period (step S103: No; step S104: Yes), the dispensation controlling unit 110 performs a first retry process (step S200).

Figure 28:
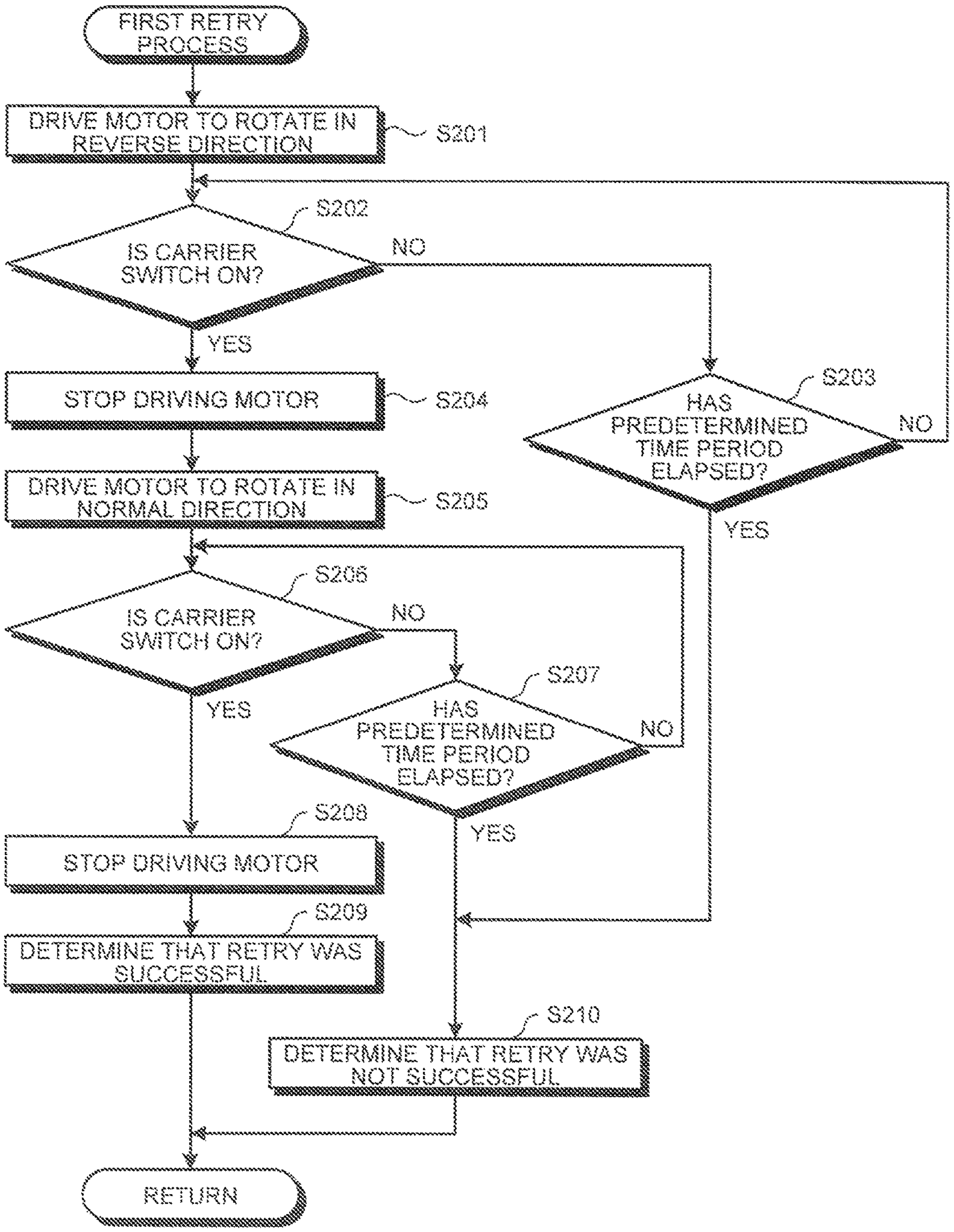
FIG. 28 is a flowchart of specifics of a first retry process in the dispensation controlling process illustrated in FIG. 24.

FIG. 28 is a flowchart of specifics of the first retry process in the dispensation controlling process illustrated in FIG. 24.

In the first retry process, the dispensation controlling unit 110 drives the motor 43 to rotate in the reverse direction and monitors whether or not the carrier switch 45 goes into the ON state within a predetermined time period (steps S201, S202, and S203). When the motor 43 is driven to rotate in the reverse direction in this manner, the output gear 443 to which the driving force of the motor 43 is transmitted via the worm gears 441 and the intermediate gears 442 rotates counterclockwise as viewed from the front. In this situation, when the motor 43 is driven to rotate in the reverse direction, because at least the cam section 443*a* of the output gear 443 is abutting against the basal end 462*a* of the second link lever 462, i.e., because there is no possibility that the cam section 443*a* passes by the basal end 462*a*, the driving of the motor 43 in the reverse direction cannot cause an adverse effect (i.e., a second product being discharged from the second product discharging device 20*b*) on the second link lever 462.

As a result, if the carrier switch 45 goes into the ON state within the predetermined time period (step S202: Yes; step S203: No), the dispensation controlling unit 110 stops the reverse-direction driving of the motor 43 (step S204) and drives the motor 43 to rotate in the normal direction again (step S205). Further, the dispensation controlling unit 110 monitors whether or not the carrier switch 45 goes into the ON state within a predetermined time period (steps S206 and S207).

After that, if the carrier switch 45 goes into the ON state within the predetermined time period (step S206: Yes; step S207: No), i.e., if the output gear 443 makes one clockwise turn as viewed from the front within the predetermined time period, it is understood that the first product is discharged as described above, and it is determined that the retry was successful after the driving of the motor 43 is stopped (steps S208 and S209). Subsequently, the procedure is caused to return to the start, and the first retry process in the current session is ended.

On the contrary, if the carrier switch 45 has not gone into the ON state within the predetermined time period (step S206: No; step S207: Yes), the dispensation controlling unit 110 determines that a failure has occurred and that the retry was not successful (step S210). Subsequently, the procedure is caused to return to the start, and the first retry process in the current session is ended. Also, if the carrier switch 45 has not gone into the ON state within the predetermined time period in response to the process at step S201 (step S202: No; step S203: Yes), the dispensation controlling unit 110 determines that the retry was not successful (step S210).

Subsequently, the procedure is caused to return to the start, and the first retry process in the current session is ended.

The dispensation controlling unit 110 performs the first retry process in the manner described above, and if the retry was successful (step S106: Yes), the standby state is maintained (step S107). Subsequently, the procedure is caused to return to the start, and the dispensation controlling process in the current session is ended. With these arrangements, when a new dispensation instruction for a first product is issued, it becomes possible to dispense the first product.

On the contrary, if the retry was not successful (step S106: No), it is determined that the first products in the first product storage passage 13*a* have been sold out (step S108). Subsequently, the procedure is caused to return to the start, and the process in the current session is ended. With these arrangements, it is understood that the first products have been sold out, so that a sold-out lamp or the like is turned on, and it is possible to suspend the sales of the first products.

In contrast, when having received a discharge instruction for a second product from the vending machine controlling unit 100 (step S101: No; step S109: Yes), the dispensation controlling unit 110 drives the motor 43 to rotate in the reverse direction (step S110).

When the motor 43 is driven to rotate in the reverse direction in this manner, the output gear 443 to which the driving force of the motor 43 is transmitted via the worm gears 441 and the intermediate gears 442 rotates counterclockwise as viewed from the front.

When the output gear 443 rotates counterclockwise as viewed from the front, the pressing piece 443*b* of the output gear 443 moves away from the contact element 45*a* of the carrier switch 45. As a result, the contact element 45*a* of the carrier switch 45 is released from the pressed state and goes into the OFF state.

Due to the rotation of the output gear 443, when the cam section 443*a* abuts against the basal end 462*a* of the second link lever 462 from above, the second link lever 462 rotates clockwise as viewed from the front. When the second link lever 462 rotates clockwise, it means that the distal end 462*b* moves upward. As a result of the upward move of the distal end 462*b*, the distal end 462*b* abuts against the abutting piece 351' of the pedal link 35' and is able to move the pedal link 35' upward by a predetermined distance against the urging force of the link spring 35*a*'. In addition, while the cam section 443*a* is in sliding contact with the basal end 462*a*, it is possible to maintain the state where the pedal link 35' has been moved upward by the predetermined distance.

In that situation, although not illustrated, while being in sliding contact with the cam section 443*a*, the second link lever 462 is adjusted in such a manner that a plane including the part that is in sliding contact with the cam section 443*a* is substantially orthogonal to another plane including the central axis thereof (i.e., the central axis of the second link shaft 42*f*) and the central axis of the output gear 443.

In conjunction with the upward move of the pedal link 35', the stopper pin moves upward, and the pedal stopper pin 34*b*' also moves upward.

In this situation, because the stopper pin moves upward while abutting against the edge wall of the recess 292' of the upper pedal 29', the upper pedal 29' makes an advancing move from the initial position against the urging force of the upper pedal spring. This advancing move of the upper pedal 29' is made as a result of the stopper pin moving upward. Further, at the point in time when the stopper pin reaches the upper ends of the stopper pin insertion holes, the stopper pin abuts against the stopper abutting section 293' and restrains the retreating move of the upper pedal 29'.

Further, the upper pedal 29' that has made the advancing move now abuts against the second product in the second lowest position (hereinafter, "next product") and restrains the downward move of the next product.

Further, because the weight of the product abutting against the lower pedal 28' that is maintained in the advance position is applied to the rotation stopper 36', the rotation stopper 36' starts a retreating move as a result of the restraining for the retreating move being cancelled by the upward move of the pedal stopper pin 34*b*'.

When the rotation stopper 36' starts the retreating move in this manner, the pedal operation shaft 361' comes out of the fitted section, so that the lower pedal 28' starts a retreating move against the urging force of the lower pedal spring 28*b*', due to the self-weight of the product. The pedal operation shaft 361' of the rotation stopper 36' that came out of the fitted section moves along the first guiding section toward the position where the first guiding section intersects the second guiding section.

After that, the lower pedal 28' makes a retreating move due to the self-weight of the product in the lowest position so that the product in the lowest position is permitted to move downward and is discharged downward. The discharged product is guided to the product discharge outlet 3*c* via the product chute 5 and further becomes accessible via the product access outlet 2*a*.

In this situation, when the product in the lowest position has passed by the lower pedal 28', the lower pedal 28' moves toward the advance position due to the elastic urging force of the lower pedal spring 28*b*'. In addition, the rotation stopper 36' also moves toward the advance position due to the elastic urging force of the pedal operation spring. When the lower pedal 28' and the rotation stopper 36' move toward the advance positions, the pedal operation shaft 361' that has been maintained in the position where the first guiding section intersects the second guiding section moves toward the fitted section along the second guiding section, so that the lower pedal 28' and the rotation stopper 36' return to the advance positions.

After that, when the abutment of the cam section 443*a* and the basal end 462*a* against each other is cancelled due to the rotation of the output gear 443, the pedal link 35' moves downward by being urged by the link spring 35*a*'.

As a result of the downward move of the pedal link 35', the stopper pin moves downward, and the pedal stopper pin 34*b*' also moves downward.

When the pedal stopper pin 34*b*' has moved to the lower ends of the pedal stopper pin supporting grooves, the pedal stopper pin 34*b*' abuts against the depression 36*b*' positioned on the rear surface side of the rotation stopper 36' that has returned to the advance position. As a result, because the move in the retreating direction is restrained, the lower pedal 28' returns to the standby-without-product posture by advancing into the second product storage passage 13*b* due to the urging force of the lower pedal spring 28*b*'.

In contrast, the upper pedal 29' is urged by the upper pedal spring and makes a retreating move in conjunction with the downward move of the stopper pin. As a result, the next product is permitted to move downward so as to subsequently abut against the lower pedal 28' which has advanced, and thereby the downward move thereof is restrained. Further, the lower pedal 28' returns to the standby state by shifting into the standby-with-product posture.

In the driving unit 40, due to the counterclockwise rotation of the output gear 443 as viewed from the front, the cam section 443*a* subsequently abuts against the basal end 461*a* of the first link lever 461. In that situation, the rotation of the first link lever 461 on the central axis thereof is restrained by the locking section 461*c* abutting against the left edge part 471 of the right opening. Consequently, the locking section 461*c* is elastically deformed in such a manner that the basal end 461*a* is permitted to approach the locking section 461*c*, so that the moving of the cam section 443*a* due to the rotation of the output gear 443 is not hindered.

Further, when the cam section 443*a* subsequently returns to the standby state position due to the rotation of the output gear 443, the pressing piece 443*b* presses the contact element 45*a* of the carrier switch 45, so that the carrier switch 45 goes into the ON state.

When the motor 43 is driven to rotate in the reverse direction at step S110 as described above, the dispensation controlling unit 110 monitors whether or not the carrier switch 45 goes into the ON state within a predetermined time period (steps S111 and S112). In other words, the dispensation controlling unit 110 monitors whether or not the output gear 443 makes one turn within the predetermined time period.

As a result, if the carrier switch 45 goes into the ON state within the predetermined time period (step S111: Yes; step S112: No), the dispensation controlling unit 110 stops the reverse-direction driving of the motor 43 (step S113), causes the procedure to return to the start, and ends the process in the current session. With these arrangements, it is possible to deliver, in an excellent manner, the second product for which the discharge instruction was issued, as described above.

On the contrary, if the carrier switch 45 has not gone into the ON state within the predetermined time period, i.e., if no ON signal is issued from the carrier switch 45 within the predetermined time period (step S111: No; step S112: Yes), the dispensation controlling unit 110 performs a second retry process (step S300).

Figure 29:
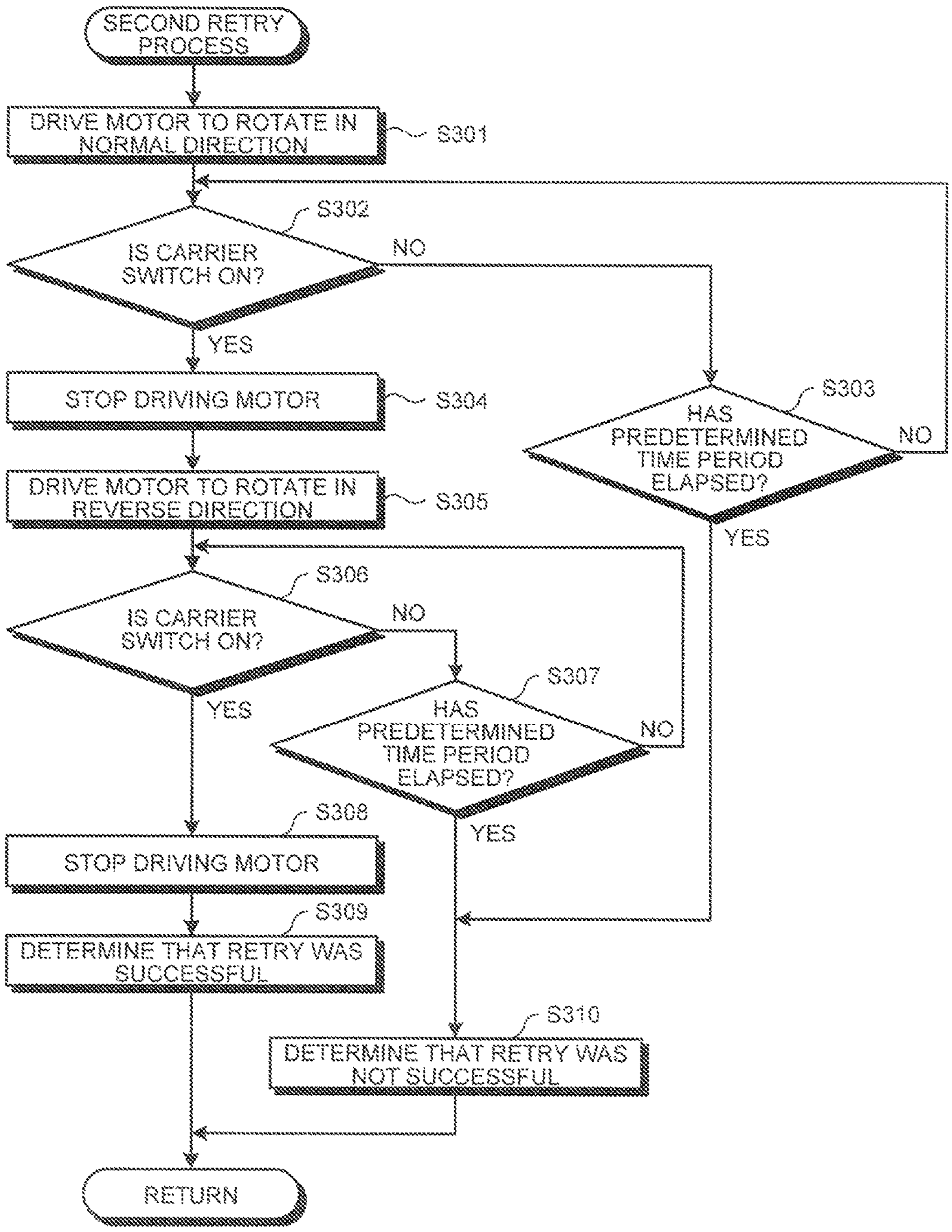
FIG. 29 is a flowchart of specifics of a second retry process in the dispensation controlling process illustrated in FIG. 24.

FIG. 29 is a flowchart of specifics of the second retry process in the dispensation controlling process illustrated in FIG. 24.

In the second retry process, the dispensation controlling unit 110 drives the motor 43 to rotate in the normal direction and monitors whether or not the carrier switch 45 goes into the ON state within a predetermined time period (steps S301, S302, and S303). When the motor 43 is driven to rotate in the normal direction in this manner, the output gear 443 to which the driving force of the motor 43 is transmitted via the worm gears 441 and the intermediate gears 442 rotates clockwise as viewed from the front.

As a result, if the carrier switch 45 goes into the ON state within the predetermined time period (step S302: Yes; step S303: No), the dispensation controlling unit 110 stops the normal-direction driving of the motor 43 (step S304) and drives the motor 43 to rotate in the reverse direction again (step S305). Further, the dispensation controlling unit 110 monitors whether or not the carrier switch 45 goes into the ON state within a predetermined time period (steps S306 and S307).

After that, if the carrier switch 45 goes into the ON state within the predetermined time period (step S306: Yes; step S307: No), i.e., if the output gear 443 makes one counter-clockwise turn as viewed from the front within the predetermined time period, it is understood that the second product is discharged as described above, and it is determined that the retry was successful after the driving of the motor 43 is stopped (steps S308 and S309). Subsequently, the procedure is caused to return to the start, and the second retry process in the current session is ended.

On the contrary, if the carrier switch 45 has not gone into the ON state within the predetermined time period (step S306: No; step S307: Yes), the dispensation controlling unit 110 determines that a failure has occurred and that the retry was not successful (step S310). Subsequently, the procedure is caused to return to the start, and the second retry process in the current session is ended. Also, when the carrier switch 45 has not gone into the ON state within the predetermined time period in response to the process at step S301 (step S302: No; step S303: Yes), the dispensation controlling unit 110 determines that the retry was not successful (step S310). Subsequently, the procedure is caused to return to the start, and the second retry process in the current session is ended.

The dispensation controlling unit 110 performs the second retry process in the manner described above, and if the retry was successful (step S114: Yes), the standby state is maintained (step S115). Subsequently, the procedure is caused to return to the start, and the dispensation controlling process in the current session is ended. With these arrangements, when a new dispensation instruction for a second product is issued, it becomes possible to dispense the second product.

On the contrary, if the retry was not successful (step S114: No), it is determined that the second products in the second product storage passage 13*b* have been sold out (step S116). Subsequently, the procedure is caused to return to the start, and the process in the current session is ended. With these arrangements, it is understood that the second products have been sold out, so that a sold-out lamp or the like is turned on, and it is possible to suspend the sales of the second products.

When, for example, there is no longer any product in the first product storage passage 13*a*, the lower pedal 28 of the first product discharging device 20*a* goes into the standby-without-product posture by being urged by the lower pedal spring 28*b*. In that situation, as illustrated in FIG. 12, as a result of the basal end of the lower pedal 28 abutting against the first sold-out abutting section 32 of the first sold-out link 30, the first sold-out link 30 rotates by using the first swing support shaft 28*a* as the rotation center. Accordingly, the first sold-out pressing section 33 presses the contact element 26*a* of the first sold-out detection switch 26. As a result, the first sold-out detection switch 26 goes into the ON state, as a result of the contact element 26*a* being pressed and being displaced forward, against the urging force of the spring. Thus, an ON signal is sent to the dispensation controlling unit 110. Accordingly, the dispensation controlling unit 110 is able to determine that the first products have been sold out and to turn on the sold-out lamp or the like.

Further, for example, when there is no longer any product in the second product storage passage 13*b*, as a result of the basal end of the lower pedal 28' abutting against the second sold-out abutting section 52 of the second sold-out link 50, the second sold-out link 50 rotates by using the first swing support shaft 28*a*' as the rotation center. Accordingly, the second sold-out pressing section 53 presses the contact element 27*a* of the second sold-out detection switch 27. As a result, the second sold-out detection switch 27 goes into the ON state, as a result of the contact element 27*a* being pressed and being displaced rearward, against the urging force of the spring. Thus, an ON signal is sent to the dispensation controlling unit 110. Accordingly, the dispensation controlling unit 110 is able to determine that the second products have been sold out and to turn on the sold-out lamp or the like.

In this situation, it is desirable to configure the dispensation controlling unit 110 so as to determine that the products are sold out when the ON signal from either the first sold-out detection switch 26 or the second sold-out detection switch 27 is continuously issued for a time period longer than a predetermined length. With this arrangement, it is possible to prevent erroneous operations due to chattering that may be caused by bouncing that occurs when the lower pedal 28 (or 28') returns to the standby-without-product posture every time a product is sold or when the lower pedal 28 returns to the previous position.

The product discharging devices and the product dispensing device 20 described above are able to achieve the following advantageous effects.

In the first product discharging device 20*a*, the first sold-out detection switch 26 changes the state thereof when the lower pedal 28 shifts into the standby-without-product posture and the standby-with-product posture, so as to detect whether there is any first product in the first product storage passage 13*a*, whereas the second sold-out detection switch 27 changes the state thereof when the lower pedal 28' shifts into the standby-without-product posture and the standby-with-product posture, so as to detect whether there is any second product in the second product storage passage 13*b*. Accordingly, it is possible to recognize, without failure, that no product is present in each of the product storage passages 13 and to arrange the number of sales opportunities of the products to match the number of products stored in each of the product storage passages 13. Consequently, by using the first product discharging device 20*a*, it is possible to increase the sales opportunities of the products.

In the first product discharging device 20*a* (the second product discharging device 20*b*), the rotation stopper 36 (36') has the blindfold section 36*c* (36*c*') that covers such a side of the pedal stopper pin 34*b* (34*b*') that is positioned opposite from the product storage passage 13. Accordingly, without the need to provide a blindfold plate used in conventional examples, it is possible to maintain anti-theft characteristics while reducing the number of component parts being used. Consequently, by using the first product discharging device 20*a* and the second product discharging device 20*b*, it is possible to reduce the manufacturing costs while ensuring the excellent anti-theft characteristics.

In the first product discharging device 20*a*, the output gear 443 included in the driving unit 40 is linked to the motor 43 via the worm gears 441 and is rotated by the driving force of the motor 43 that is transmitted thereto via the worm gears 441. Further, while being in the sliding contact with the cam section 443*a* included in the output gear 443, the first link lever 461 (the second link lever 462) included in the driving unit 40 is maintained in the state of having rotated upward, so as to keep the state where the pedal link 35 (35') has been moved upward. Consequently, the upper pedal 29 (29') is caused to advance into the product storage passage 13 so as to abut against the product in the second lowest position, whereas the lower pedal 28 (28') is caused to retreat from the product storage passage 13 so that the product in the lowest position is discharged downward. In contrast, while being out of the sliding contact with the cam section 443*a*, the first link lever 461 (the second link lever 462) permits the pedal link 35 (35') to move downward, so as to cause the upper pedal 29 (29') to retreat from the product storage passage 13 and to cause the lower pedal 28 (28') to advance into the product storage passage 13, so that the downward moves of the products are restrained. When the first product discharging device 20*a* configured in this manner is used, even if the electric power supply is interrupted due to power outage or the like while the motor 43 is being driven, because the worm gears 441 are interposed between the output gear 443 and the motor 43, it is possible to keep the output gear 443 in the same state without rotating in the reverse direction, even if the driving of the motor 43 is stopped. Accordingly, it is possible to keep the state where the pedal link 35 (35') has been moved upward. As a result, it is possible to keep the state where the upper pedal 29 (29') has advanced. Consequently, unlike the conventional example in which an AC solenoid is used, there is no possibility that the pedal links move downward, even if no electric current is flowing through the AC solenoid when the electric power supply is interrupted due to power outage or the like. With these arrangements, by using the first product discharging device 20*a* described above, it is possible to avoid the situation where a plurality of products are discharged, even if the electric power supply is interrupted due to power outage or the like during the product discharge process. In addition, while being in the sliding contact with the cam section 443*a*, the first link lever 461 and the second link lever 462 are each arranged in such a manner that plane (i) including the part that is in the sliding contact with the cam section 443*a* is substantially orthogonal to plane (ii) including the central axis thereof and the central axis of the output gear 443. Consequently, it is possible to keep the state, without failure, where the pedal link 35 (35') has been moved upward, without the output gear 443 receiving the weight in the rotation direction.

When the product dispensing device 20 described above is used, the first product discharging device 20*a* includes the motor 43 serving as the driving source of the first product discharging device 20*a* and the second product discharging device 20*b*, as well as the driving unit 40 that, when receiving a discharge instruction, selects one from between the first product discharging device 20*a* and the second product discharging device 20*b* according to the discharge instruction, so as to supply the driving force from the motor 43 thereto. Accordingly, it is possible to reduce the number of driving sources with respect to the number of discharge mechanisms. It is therefore possible to reduce the manufacturing costs. In addition, because the first product discharging device 20*a* includes the driving unit 40 containing the motor 43, it is also possible to use the first product discharging device 20*a* alone. In other words, the embodiment is applicable not only to the product storage racks 10 in which product storage passages 13 in an even-numbered quantity are arranged next to one another in the front-and-back direction as described above, but also to the product storage racks 10 in which the product storage passages 13 in an odd-numbered quantity are arranged next to one another in the front-and-back direction. Consequently, it is possible to reduce the manufacturing costs, and it is also possible to flexibly address different situations in accordance with the quantity of product storage passages 13 that are positioned adjacent to one another in the front-and-back direction.

When the product dispensing device 20 described above is used, because the motor 43 serving as the driving source is a direct-current motor, it is possible to install the product dispensing device 20 in various locations, because the device is not easily affected by regional voltage differences or frequency fluctuations.

When the product dispensing device 20 described above is used, because the first product discharging device 20*a* is provided with the first sold-out detection switch 26 and the second sold-out detection switch 27, it is possible to use the first product discharging device 20*a* alone. Because of this arrangement also, it is possible to flexibly address different situations in accordance with the quantity of product storage passages 13 that are positioned adjacent to one another in the front-and-back direction. Because the electrical components are provided only in the first product discharging device 20*a*, it is possible to provide the harness in the first product discharging device 20*a* in a concentrated manner.

When the product dispensing device 20 described above is used, it is possible to easily attach the unit cover 42 to the unit base 41, because the postures of the first link lever 461 and the second link lever 462 in the normal state are determined by the locking sections 461*c* and 462*c* abutting against the predetermined sections (471 and 472), the first and the second locking sections 461*c* and 462*c* being formed with the first and the second link levers 461 and 462, respectively, and being elastically deformable.

When the product dispensing device 20 described above is used, if any of the product discharging devices 20*a* and 20*b* cannot be driven within the predetermined time period although the driving force is selectively given thereto by the driving unit 40, the dispensation controlling unit 110 determines that an abnormality has occurred only in the product discharging device 20*a* (or 20*b*) and performs the sold-out process indicating that the products in the product storage passage 13 of the product discharging device 20*a* (or 20*b*) have been sold out. Consequently, even when the sales from one of the first and the second product discharging devices 20*a* and 20*b* are suspended due to the sold-out process, the other of the two product discharging devices is able to continue the discharge of the products. Consequently, it is possible to ensure finely-tuned operations corresponding to each of the product storage passages 13.

When the product dispensing device 20 described above is used, because the first sold-out detection switch 26 and the second sold-out detection switch 27 are arranged with the harness guide 25, it is possible to protect the harness and the sold-out detection switches 26 and 27 in an excellent manner when the first product discharging device 20*a* and the second product discharging device 20*b* are installed and removed.

Although the exemplary embodiments of the present invention have thus been explained, the present invention is not limited to these embodiments. It is possible to apply various modifications thereto.

Figure 30:
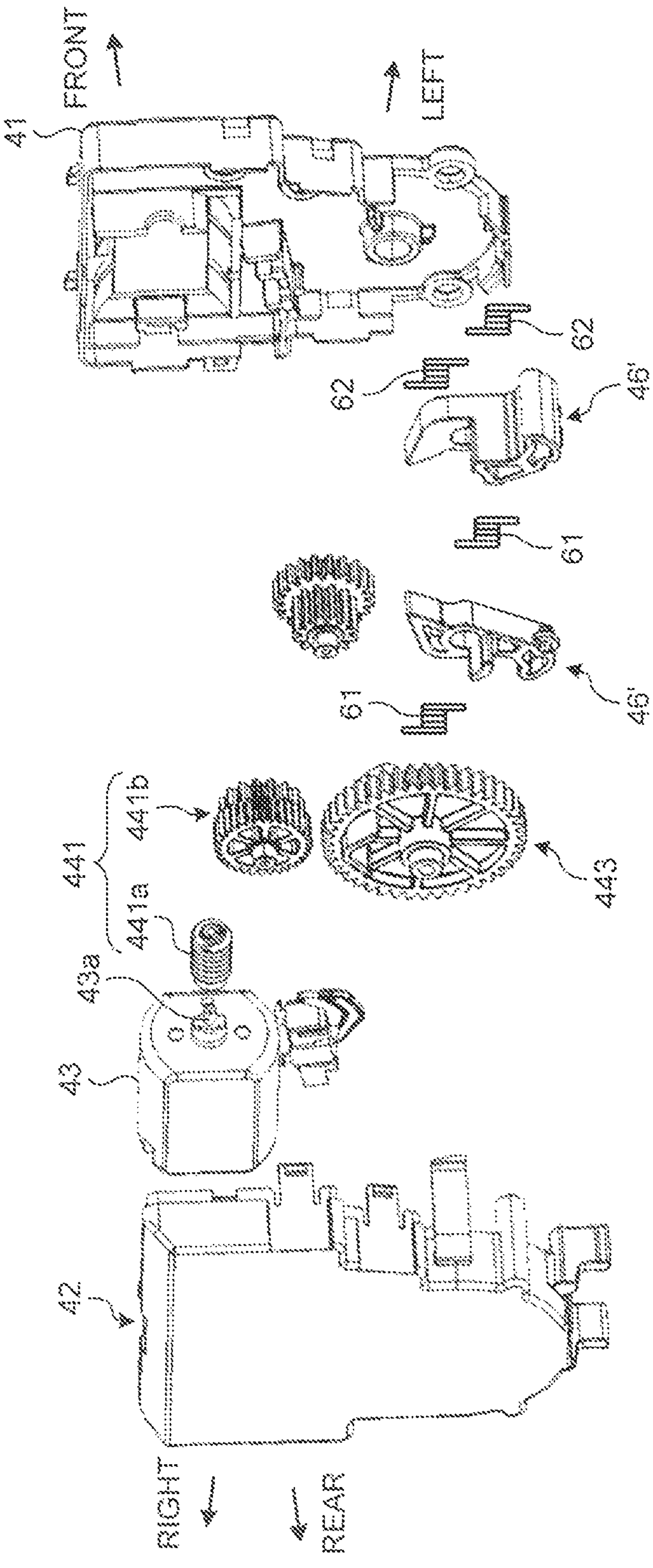
FIG. 30 is an exploded perspective view of a modification example of the driving unit.

In the embodiments described above, the postures of the first link lever 461 and the second link lever 462 in the normal state are determined by the locking section 461*c* and the locking section 462*c* abutting against the predetermined section, the locking section 461*c* being formed with the first link lever 461 and being elastically deformable, the locking section 462*c* being formed with the second link lever 462 and being elastically deformable. However, as illustrated in FIG. 30, some embodiments may be configured so that a spring 61 that urges a link lever 46' in a clockwise direction as viewed from the front and a spring 62 that urges the link lever 46' in a counterclockwise direction as viewed from the front are interposed, in such a manner that the posture of the link lever 46' in the normal state is determined by the urging forces of the springs 61 and 62 working as torsion springs.

Figure 31:
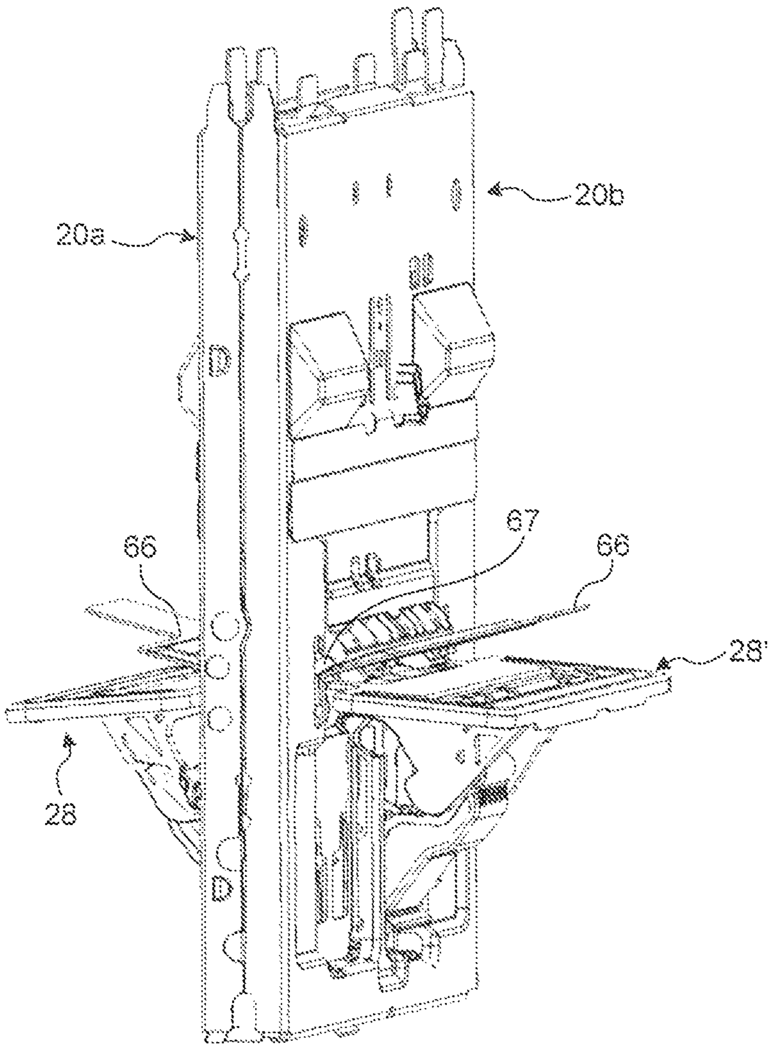
FIG. 31 is a perspective view of a modification example of the product dispensing device.

In the embodiments described above, the first sold-out detection switch 26 (the second sold-out detection switch 27) goes into the ON state, as a result of the lower pedal 28 (28') going into the standby-without-product posture, by providing the first swing support shaft 28*a* (28*a*') of the lower pedal 28 (28') with the first sold-out link 30 (the second sold-out link 50). However, some embodiments may be configured so that, as illustrated in FIG. 31, a lever member 66 is provided in a region above each of the lower pedals 28 and 28', the lever member 66 being swingable so as to advance into and retreat from the product storage passage 13. Similarly to the lower pedals 28 and 28', the lever member 66 is urged by a lever spring (not illustrated) so as to advance into the product storage passage 13. When no product is placed on the top face thereof, the lever member 66 is in the posture of extending upward in such a manner that the distal end thereof is positioned apart from the top face of the lower pedal 28 (28'). As a result of a part of the lever member 66 pressing a contact element 67 (not illustrated) of the sold-out detection switch 27, the sold-out detection switch 27 goes into the ON state. In contrast, when the top face thereof is pressed by a product input in the product storage passage 13, the lever member 66 goes into the posture where the distal end thereof is in contact with the lower pedal 28 (28'). Accordingly, the part that had been pressing the contact element 67 of the sold-out detection switch 27 comes off the contact element 67, so that the sold-out detection switch 27 goes into the OFF state. With this arrangement also, it is possible to recognize, without fail, that no product is present in the product storage passage 13. It is also possible to arrange the number of sales opportunities of the products to match the number of products stored in the product storage passage 13. It is therefore possible to increase the sales opportunities of the products.

In the embodiments described above, the anti-theft characteristics are maintained by providing the rotation stoppers 36 and 36' with the blindfold sections 36*c* and 36*c*', respectively. However, some embodiments may be configured so as to maintain anti-theft characteristics by providing an anti-theft link mechanism that is configured to restrain the upward move of the pedal link in the normal state and to permit the pedal link to move, by moving out of the region above the pedal link when the pedal link is to be moved upward due to the driving of the driving unit.

In the embodiments described above, the first product discharging device 20*a* corresponds to the first product storage passage 13*a*, whereas the second product discharging device 20*b* corresponds to the second product storage passage 13*b*. However, the present invention is not limited to this example. Another arrangement is acceptable in which the one product discharging device corresponds to the other product storage passage, whereas the other product discharging device corresponds to the one product storage passage.

Figure 32:
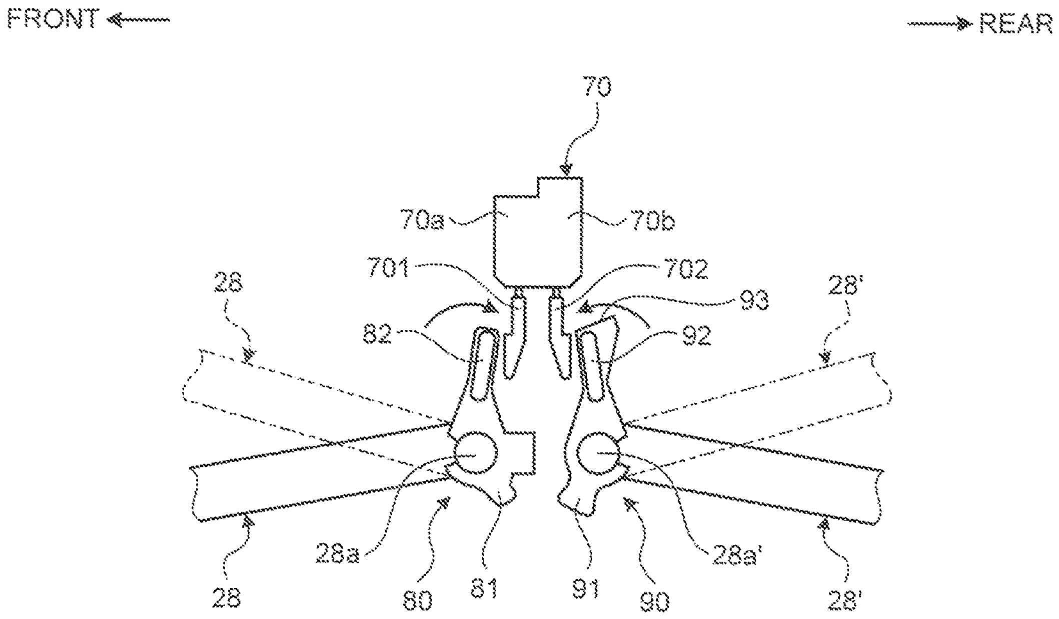
FIG. 32 is a drawing for explaining a relevant part of another modification example of the product dispensing device.
Figure 33A:
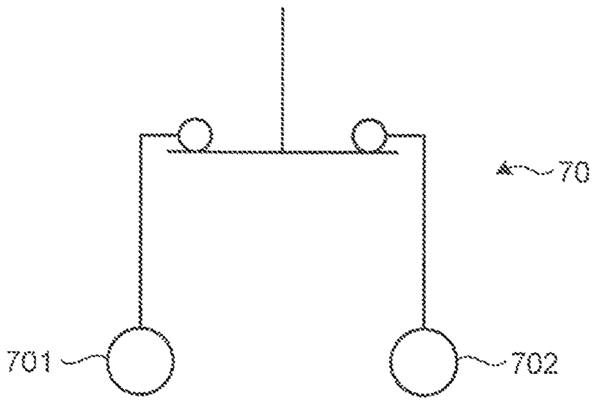
FIGS. 33A-33C are schematic drawings for explaining a configuration of the sold-out detection switch illustrated in FIG. 32.
Figure 33B:
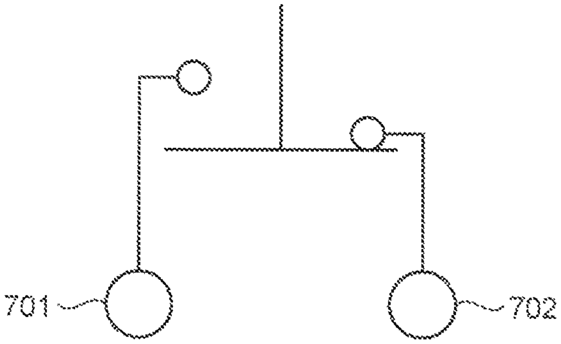
Figure 33C:
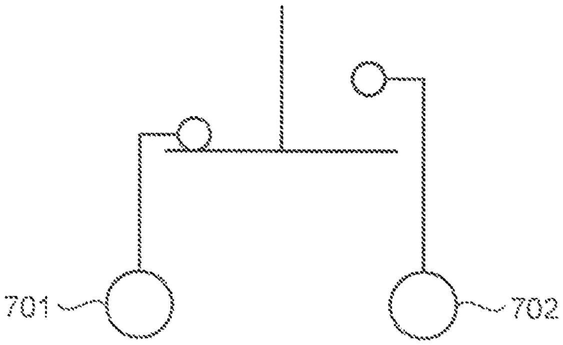

FIG. 32 is a drawing for explaining a relevant part of another modification example of the product dispensing device. As illustrated in FIG. 32, a sold-out detection switch 70 is provided in place of the first sold-out detection switch 26 and the second sold-out detection switch 27. In the sold-out detection switch 70, a first sold-out detecting unit 70*a* and a second sold-out detecting unit 70*b* are integrally structured while being arranged next to each other in the front-and-back direction. The sold-out detection switch 70 is a so-called push-type switch and includes two contact elements 701 and 702 that are urged by springs (not illustrated) so as to stand upright. As illustrated in FIG. 33(*a*), the sold-out detection switch 70 is in the OFF state and sends an OFF signal, while the first contact element 701 and the second contact element 702 are not pressed. In contrast, as illustrated in FIG. 33(*b*) or 33(*c*), the sold-out detection switch 70 goes into the ON state and sends an ON signal, when one of the first and the second contact elements 701 and 702 is pressed and is displaced against the urging force of the spring. Further, in the present example, the sold-out detection switch 70 is in the OFF state while the first contact element 701 and the second contact element 702 are not pressed, whereas the sold-out detection switch 70 goes into the ON state when one of the first and the second contact elements 701 and 702 is pressed and displaced. However, some embodiments may be configured in such a manner that the sold-out detection switch is in the ON state while the first contact element and the second contact element are not pressed, whereas the sold-out detection switch goes into the OFF state when the first contact element and the second contact element are pressed and displaced.

As illustrated in FIG. 32, a first sold-out link 80 is provided at the right end of the first swing support shaft 28*a*. The first sold-out link 80 is configured so as to include a first sold-out base section 81 and a first sold-out pressing section 82. The first sold-out base section 81 is an irregular-shaped section that has formed therein a penetration section through which the right end of the first swing support shaft 28*a* penetrates. The first sold-out pressing section 82 extends upward while protruding to the right from an upper side part of the first sold-out base section 81. The penetration section formed in the first sold-out base section 81 is formed so as to be larger than the first swing support shaft 28*a*, so that the first sold-out link 80 is able to move freely with respect to the first swing support shaft 28*a*.

When the lower pedal 28 is in the standby-without-product posture, as a result of the basal end of the lower pedal 28 abutting against an abutted section (not illustrated) provided in the first sold-out base section 81 of the first sold-out link 80, as indicated with the two-dot chain line in FIG. 32, the first sold-out link 80 rotates by using the first swing support shaft 28*a* as the rotation center. As a result, the first sold-out pressing section 82 presses the first contact element 701 of the sold-out detection switch 70. Accordingly, because the first contact element 701 is pressed and is displaced rearward against the urging force of the spring, the sold-out detection switch 70 goes into the ON state and outputs an ON signal to the dispensation controlling unit 110.

In contrast, when the lower pedal 28 is in the standby-with-product posture, as a result of the basal end of the lower pedal 28 being positioned apart from the abutted section of the first sold-out link 80, as indicated with the solid line in FIG. 32, the first sold-out link 80 goes into a free state. Accordingly, because the first contact element 701 shifts into an upright posture by being urged by the spring, the sold-out detection switch 70 goes into the OFF state and outputs an OFF signal to the dispensation controlling unit 110. In other words, because the first sold-out pressing section 82 is pressed by the first contact element 701, the first sold-out link 80 that shifted into the free state rotates by using the first swing support shaft 28*a* as the rotation center.

Further, when the lower pedal 28 makes a retreating move, as a result of the basal end of the lower pedal 28 being positioned apart from the abutting section of the first sold-out link 80, the first sold-out link 80 goes into a free state. Accordingly, because the first contact element 701 goes into an upright posture by being urged by the spring, the sold-out detection switch 70 maintains the OFF state. In other words, also when the lower pedal 28 makes the retreating move, the first sold-out link 80 does not press the first contact element 701 of the sold-out detection switch 70, similarly to when the lower pedal 28 is in the standby-with-product posture.

A second sold-out link 90 is provided at the right end of the first swing support shaft 28*a*'. As illustrated in FIG. 32, the second sold-out link 90 is configured so as to include a second sold-out base section 91 and a second sold-out pressing section 92. The second sold-out base section 91 is an irregular-shaped section that has formed therein a penetration section through which the right end of the first swing support shaft 28*a*' penetrates. The second sold-out pressing section 92 extends upward while protruding to the right from an upper side part of the second sold-out base section 91. The penetration section formed in the second sold-out base section 91 is formed so as to be larger than the first swing support shaft 28*a*', so that the second sold-out link 90 is able to move freely with respect to the first swing support shaft 28*a*'.

The second sold-out link 90 configured as described above has a sloped guiding surface 93 formed in an upper end part of the second sold-out base section 91. The sloped guiding surface 93 is gradually sloped downward toward the front. In other words, the sloped guiding surface 93 is gradually sloped downward as the distance to the first product discharging device 20*a* decreases.

The second sold-out link 90 configured as described above is positioned so as to have the sold-out detection switch 70 interposed between the second sold-out link 90 and the first sold-out link 80 in the front-and-back direction. In other words, the sold-out detection switch 70 is positioned so as to be interposed between the first sold-out link 80 and the second sold-out link 90 in the front-and-back direction.

When the lower pedal 28' is in the standby-without-product posture, as a result of the basal end of the lower pedal 28' abutting against an abutted section (not illustrated) provided in the second sold-out base section 91 of the second sold-out link 90, as indicated with the two-dot chain line in FIG. 32, the second sold-out link 90 rotates by using the first swing support shaft 28*a*' as the rotation center. As a result, the second sold-out pressing section 92 presses the second contact element 702 of the sold-out detection switch 70. Accordingly, because the second contact element 702 is pressed and is displaced rearward against the urging force of the spring, the sold-out detection switch 70 goes into the ON state and outputs an ON signal to the dispensation controlling unit 110.

In contrast, when the lower pedal 28' is in the standby-with-product posture, as a result of the basal end of the lower pedal 28' being positioned apart from the abutted section of the second sold-out link 90, as indicated with the solid line in FIG. 32, the second sold-out link 90 goes into a free state. Accordingly, because the second contact element 702 shifts into an upright posture by being urged by the spring, the sold-out detection switch 70 goes into the OFF state and outputs an OFF signal to the dispensation controlling unit 110. In other words, because the second sold-out pressing section 92 is pressed by the second contact element 702, the second sold-out link 90 that shifted into the free state rotates by using the first swing support shaft 28*a*' as the rotation center.

Further, when the lower pedal 28' makes a retreating move, as a result of the basal end of the lower pedal 28' being positioned apart from the abutting section of the second sold-out link 90, the second sold-out link 90 goes into a free state. Accordingly, because the second contact element 702 goes into an upright posture by being urged by the spring, the sold-out detection switch 70 maintains the OFF state. In other words, also when the lower pedal 28' makes the retreating move, the second sold-out link 90 does not press the second contact element 702 of the sold-out detection switch 70, similarly to when the lower pedal 28' is in the standby-with-product posture.

When the product dispensing device 20 described above is used, because the sold-out detection switch 70 is positioned so as to be interposed between the first sold-out link 80 and the second sold-out link 90, when removing the second product discharging device 20*b* away from the first product discharging device 20*a*, there is no possibility that the second sold-out link 90 interferes with the second contact element 702 of the sold-out detection switch 70. Accordingly, it is possible to easily remove the second product discharging device 20*b*.

Figure 34:
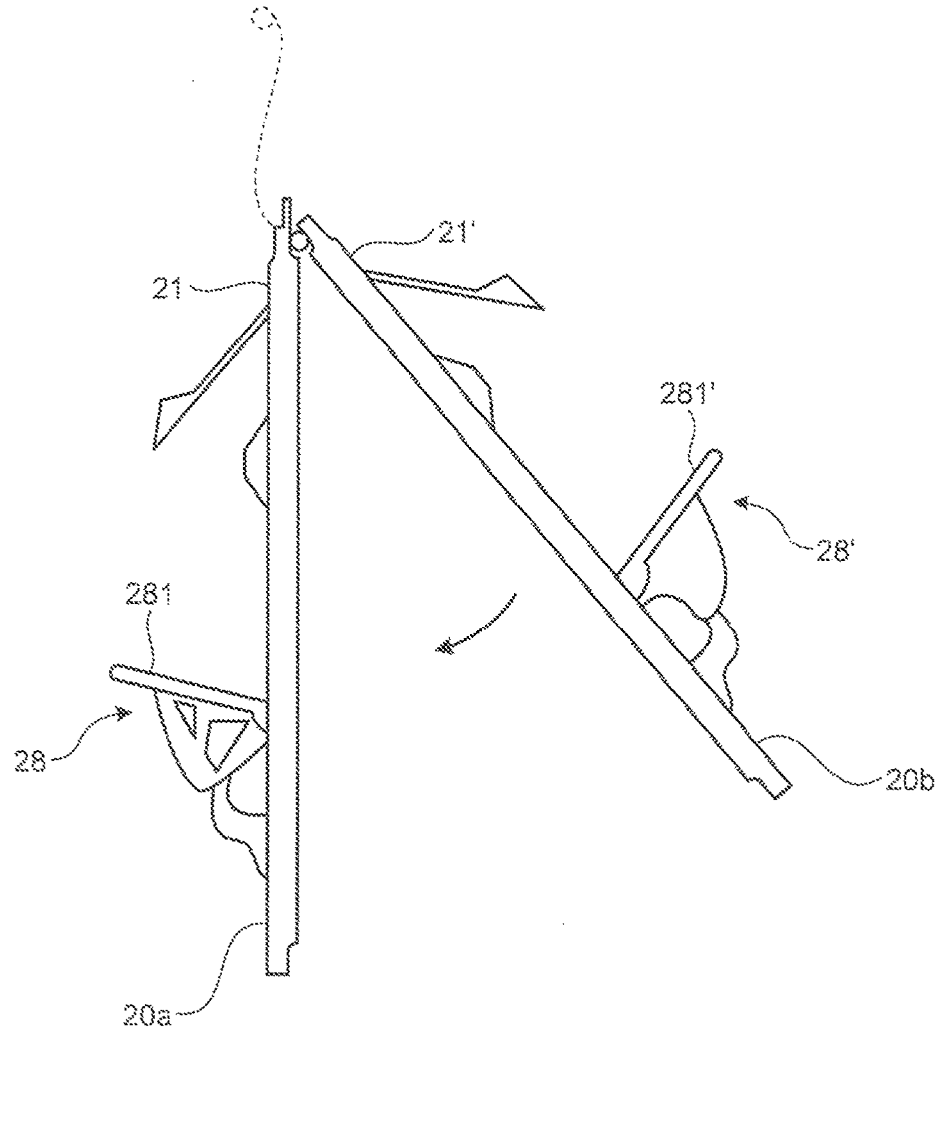
FIG. 34 is a drawing for explaining a manner in which the second product discharging device is attached to the first product discharging device.
Figure 35:
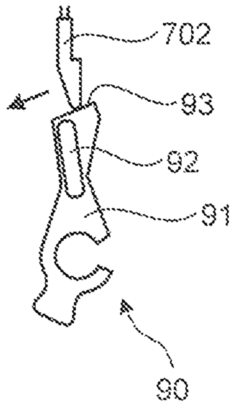
FIG. 35 is a drawing for explaining an action of a sloped guiding surface of the second sold-out link.

When the product dispensing device 20 described above is used, the second sold-out link 90 has formed, in the upper end part thereof, the sloped guiding surface 93 that is gradually sloped downward as the distance to the first product discharging device 20*a* decreases. Accordingly, as illustrated in FIG. 34, when the second product discharging device 20*b* is attached to the first product discharging device 20*a*, even if the second contact element 702 of the sold-out detection switch 70 abuts against the upper end part of the second sold-out link 90 as illustrated in FIG. 35, it is possible to guide the second contact element 702 toward the front along the sloped guiding surface 93. As a result, it is possible to easily attach the second product discharging device 20*b*.

When the product dispensing device 20 described above is used, because the sold-out detection switch 70 is structured by integrally combining the first sold-out detecting unit 70*a* with the second sold-out detecting unit 70*b*, it is possible to use the output wirings in common as illustrated in FIGS. 33(*a*) to 33(*c*). As a result, it is possible to reduce the number of wirings and to minimize variances in the assembly. Consequently, it is possible to reduce the manufacturing costs and to simplify the manufacturing process.

According to some embodiments, when no product is placed on the top face thereof in the standby state, the lower pedal goes into the second standby posture in which the distal end thereof is positioned higher than in the first standby posture. With the arrangement in which the sold-out detection switch is in the ON state or the OFF state while the lower pedal is in the first standby posture and is in the OFF state or the ON state while the lower pedal is in the second standby posture, it is possible to detect whether or not there is any product in the product storage passage. It is therefore possible to recognize, without failure, that no product is present in the product storage passage. In addition, it is possible to arrange the number of sales opportunities of the products to match the number of products stored in the product storage passage. Consequently, an advantageous effect is achieved where it is possible to increase the sales opportunities of the products.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A product dispensing device comprising:

a first product discharging device comprising:

a first lower pedal swingably arranged with a first base in such a manner that a distal end thereof advances into and retreats from a first product storage passage storing therein, along an up-and-down direction, first products that are input thereto;

a first upper pedal swingably arranged with the first base in a region above the first lower pedal, in such a manner that a distal end thereof advances into and retreats from the first product storage passage; and a first pedal link extending in the up-and-down direction and connected to the first lower pedal and the first upper pedal, the first pedal link being configured to move in the up-and-down direction such that when the first pedal link moves downward to a lower position, the first lower pedal advances into the first product storage passage, and the first upper pedal retreats from the first product storage passage, and when the first pedal link moves upward to an upper position, the first lower pedal retreats from the first product storage passage, and the first upper pedal advances into the first product storage passage, wherein while in a standby state of the first product discharging device, by causing the first upper pedal to retreat from the first product storage passage and causing the first lower pedal to advance into the first product storage passage, a product in a lowest position of the first products is placed on a top face of the first lower pedal, so that the first lower pedal goes into a first standby posture and restrains the product in the lowest position from moving downward, whereas, while in a driven state of the first product discharging device, by causing the first upper pedal to advance into the first product storage passage so as to abut against a product in a second lowest position of the first products and causing the first lower pedal to retreat from the first product storage passage, the first product in the lowest position is discharged downward, when no first product is placed on the top face of the first lower pedal in the standby state of the first product discharging device, the first lower pedal goes into a second standby posture in which the distal end thereof is positioned higher than in the first standby posture, and the first product discharging device further includes a first sold-out detection switch configured to detect the first products in the first product storage passage by going into an ON state or an OFF state when the first lower pedal is in the first standby posture and going into the OFF state or the ON state when the first lower pedal is in the second standby posture, and a first sold-out link that is arranged with a first swing support shaft serving as a swing central axis of the first lower pedal, the first sold-out link being configured to bring the first sold-out detection switch into the ON state or OFF state by not pressing a first contact element of the first sold-out detection switch when the first lower pedal is in the first standby posture, and to bring the first sold-out detection switch into the OFF state or ON state by pressing the first contact element when the first lower pedal is in the second standby posture, the first sold-out link further includes:

a first sold-out base section having a through hole for receiving the first swing support shaft, a first sold-out abutting section extending from the first sold-out base section, for abutting the first lower pedal, and a first sold-out pressing section protruding from the first sold-out base section in a direction opposite to the first sold-out abutting section, for pressing the first contact element, and when the first lower pedal is in the second standby posture, the first lower pedal abuts against the first sold-out abutting section to rotate the first sold-out link and the first sold-out pressing section presses the first contact element of the first sold-out detection switch so that the first sold-out detection switch switches into the ON state, and a second product discharging device arranged back to back with the first product discharging device, and comprising:

a second lower pedal swingably arranged with a second base in such a manner that a distal end thereof advances into and retreats from a second product storage passage storing therein, along the up-and-down direction, second products that are input thereto; and a second upper pedal swingably arranged with the second base in a region above the second lower pedal, in such a manner that a distal end thereof advances into and retreats from the second product storage passage, wherein while in a standby state of the second product discharging device, by causing the second upper pedal to retreat from the second product storage passage and causing the second lower pedal to advance into the second product storage passage, a product in a lowest position of the second products is placed on a top face of the second lower pedal, so that the second lower pedal goes into a first standby posture and restrains the product in the lowest position of the second products from moving downward, whereas, while in a driven state of the second product discharging device, by causing the second upper pedal to advance into the second product storage passage so as to abut against a product in a second lowest position of the second products and causing the second lower pedal to retreat from the second product storage passage, the second product in the lowest position is discharged downward, when no second product is placed on the top face of the second lower pedal in the standby state of the second product discharging device, the second lower pedal goes into a second standby posture in which the distal end thereof is positioned higher than in the first standby posture, and the second product discharging device includes a second sold-out detection switch configured to detect the second products in the second product storage passage by going into an ON state or an OFF state when the second lower pedal is in the first standby posture and going into the OFF state or the ON state when the second lower pedal is in the second standby posture.

2. The product dispensing device according to claim 1, wherein the first sold-out detection switch and the second sold-out detection switch are integrally structured.

3. The product dispensing device according to claim 1, wherein the first sold-out detection switch is arranged with a harness guide which is provided for the first base and along which a harness is extended.

4. The product dispensing device according to claim 1, wherein the second product discharging device further includes a second sold-out link that is arranged with a second swing support shaft serving as a swing central axis of the second lower pedal, the second sold-out link being configured to bring the second sold-out detection switch into the ON state or OFF state by not pressing a second contact element of the second sold-out detection switch when the second lower pedal is in the first standby posture, and to bring the second sold-out detection switch into the OFF state or ON state by pressing the second contact element when the second lower pedal is in the second standby posture, and wherein the first sold-out detection switch and the second sold-out detection switch are provided so as to be interposed between the first sold-out link and the second sold-out link.

* * * * *